United States Patent [19]
Langhals et al.

[11] Patent Number: 6,060,601
[45] Date of Patent: May 9, 2000

[54] FLUORESCENCE-DERIVATISATION OF CARBONYL COMPOUNDS-NOVEL CARBONYL REAGENTS

[75] Inventors: Heinz Langhals, Ottobrunn; Wolfgang Jona, Waldkraiburg, both of Germany

[73] Assignee: Ciba Specialty Chemicals Corporation, Tarrytown, N.Y.

[21] Appl. No.: 09/121,584

[22] Filed: Jul. 23, 1998

[30] Foreign Application Priority Data

Jul. 24, 1997 [CH] Switzerland ............................ 1788/97
Jul. 24, 1997 [CH] Switzerland ............................ 1789/97

[51] Int. Cl.$^7$ ................................................. C07D 211/18
[52] U.S. Cl. ................................................. 546/37
[58] Field of Search ................................................. 546/37

[56] References Cited

U.S. PATENT DOCUMENTS

| | | | |
|---|---|---|---|
| 3,697,526 | 10/1972 | Pugin ........................................ | 260/281 |
| 3,871,882 | 3/1975 | Wiedemann ............................... | 96/1.5 |
| 5,319,083 | 6/1994 | Tröster ...................................... | 546/37 |
| 5,359,092 | 10/1994 | Hay et al. .................................. | 546/99 |
| 5,645,965 | 7/1997 | Duff et al. ................................. | 430/59 |
| 5,693,808 | 12/1997 | Langhals ................................... | 546/37 |

FOREIGN PATENT DOCUMENTS

| | | |
|---|---|---|
| 2231523 | 9/1998 | Canada . |
| 0711812 | 5/1996 | European Pat. Off. . |
| 299734 | 5/1992 | Germany . |
| 1220634 | 1/1971 | United Kingdom . |

OTHER PUBLICATIONS

Y. Nagao, Synthesis & Properties of Perylene pigments, Prog. in Org. Coats,31,p 43–49, Feb. 24, 1997.
Heterocycles, vol. 40, No. 1, 1995, pp. 477–500.
Angew. Chem.,(1998), vol. 110, No. 7, pp. 998–1001.
Chem. Ber., vol. 124, (1991), pp. 529–535.
Chem. Abstr. 85:48251q (1976) of Pol. 77,081.
Derwent Abstr. 92–324279/40 for DD 299734.

*Primary Examiner*—Richard L. Raymond
*Assistant Examiner*—Sudhaker Patel
*Attorney, Agent, or Firm*—David R. Crichton

[57] ABSTRACT

Perylene hydrazide imides of the general formula I

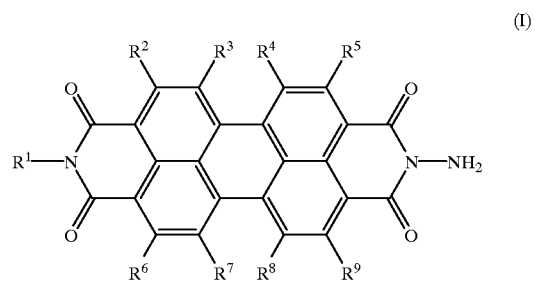

a process for the preparation thereof, the use thereof as detection reagents for carbonyl compounds, protonic acids, acylating agents and metal salts, and also perylene hydrazones II and bi- and tri-fluorophoric perylene bisimides III, the preparation thereof and methods of using them.

11 Claims, No Drawings

FLUORESCENCE-DERIVATISATION OF CARBONYL COMPOUNDS-NOVEL CARBONYL REAGENTS

The present invention relates to perylene hydrazide imides of the general formula I

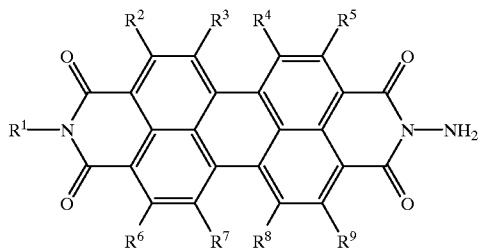

(I)

wherein $R^1$, $R^2$, $R^3$, $R^4$, $R^5$, $R^6$, $R^7$, $R^8$ and $R^9$ are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$-alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —$N{=}NR^{15}$, —$OCOR^{13}$ and —$OCONHR^{13}$, it being possible for two adjacent radicals together to form a carbocyclic or heterocyclic ring,
wherein $R^{13}$ is $C_1$–$C_{18}$alkyl, $C_6$–$C_{10}$aryl, or benzyl that is unsubstituted or substituted by halogen, $C_1$–$C_4$alkyl or $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups; $C_3$- to $C_{24}$-cycloalkyl; $C_6$–$C_{10}$aryl or 5- to 7-membered heteroaryl; or $R^{11}$ and $R^{12}$ together, or, as the case may be, with at least one of the other radicals $R^2$ to $R^9$ form a 5- or 6-membered carbocyclic or heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl,
$R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy; or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy, with the proviso that $R^1$ is not —$NH_2$.

The invention relates also to perylene hydrazones of the general formula II

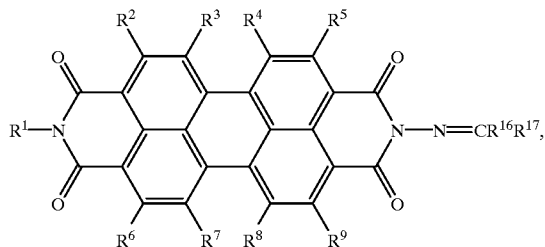

(II)

to perylene-3,4:9,10-tetracarboxylic acid bisimides of formula III

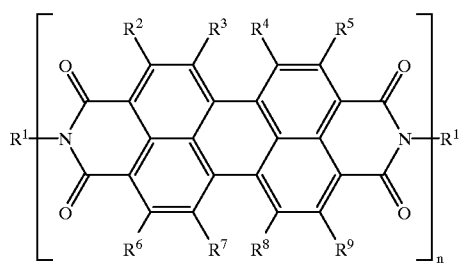

(III)

and to processes for the preparation of compounds I, II and II and to the use thereof as colourants.

A number of established methods are available for the derivatisation of aldehydes and ketones, such as the formation of oximes, semicarbazones or phenylhydrazones, in which the melting point of the derivatives is the characteristic feature. The use of 2,4-dinitrophenyl-hydrazine as a reagent brought a significant advance since, firstly, not only do the 2,4-dinitrophenylhydrazones of aldehydes and ketones have a characteristic melting point, crystallise extremely well and are hence easy to purify, but they also have a typical inherent colour, which in addition varies as a function of the substitution (see Organikum, 5th edition, VEB Berlin 1965). The inherent colour can be used for a simple thin-layer chromatography identification of the derivatives according to their $R_f$ values, representing an additional confirmation of the structure. The colour of the substances also makes it possible for small amounts to be detected—but a further increase in the detection sensitivity would be desirable especially in the investigation of complex mixtures.

Perylene dyes, especially perylene-3,4:9,10-tetracarboxylic acid bisimides, fluoresce in solution with high quantum yields (usually almost 100%), are very lightfast and have high molar extinction coefficients of close to 100 000, so that detection by means of their fluorescence is very sensitive.

Little research has been carried out on perylene dyes having free N-amino groups. The known dye (RN 49546-23-8) (see Organikum, 5th edition, VEB Berlin 1965 and H. Langhals in Heterocycles 40 (1995) 477) of the general formula IV

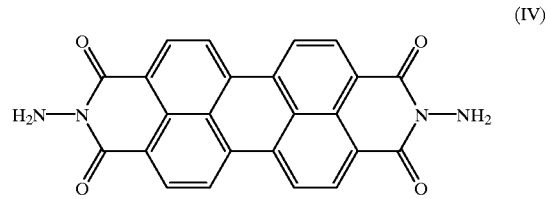

(IV)

is also little suited to the purpose in question because it is extremely difficult to dissolve and has pigment character.

Properties such as the solubility of the colourant can usually be controlled by the substituents on the nitrogen atoms, but the spectral properties, detectable for example by UV/visible spectra, are generally influenced only slightly thereby. It is argued in Heterocycles 40 (1995) 477 that this is attributable to orbital nodes in the highest occupied molecular orbital ("HOMO") and the lowest unoccupied molecular orbital ("LUMO") of the imide nitrogen atoms in question. Long-wave absorption maxima are observed at 526 nm with molar extinction coefficients usually in the range of from 85 000 to 95 000.

The similarity of the UV/visible spectra of different perylene bisimides is generally extremely desirable for many uses, such as in tracer experiments in analytical procedures, but on the other hand the inability to adapt the spectra to special requirements is undesirable.

EP-A 711 812 describes di-, tri- and tetra-chromophoric perylene dyes in which the perylene units are bonded by a carbocyclic or heterocyclic aromatic radical.

The problem underlying the present invention is therefore to prepare perylene derivatives that do not have the above-mentioned disadvantages. In particular, readily soluble and readily available amino derivatives are to be provided that are suitable as reagents for a method of detecting carbonyl compounds. In addition, perylene derivatives having spectral properties that can be clearly differentiated from those of known perylene derivatives are to be made available. Furthermore, it is to be possible for the UV/visible spectra to be modified by coupling several perylene base units directly by way of the relevant imide nitrogen atoms.

Accordingly, the perylene hydrazide imides I according to the invention have been found.

There have also been found the perylene hydrazones II, the perylene-3,4:9,10-tetra-carboxylic acid bisimides III and also processes for the preparation thereof and the use thereof inter alia as colourants.

As unsubstituted or substituted carbocyclic aromatic radical there may be selected preferably a mono- to tetra-cyclic, especially a mono- or bi-cyclic, radical having from five to seven carbon atoms per ring, such as phenyl, diphenyl or naphthyl.

As unsubstituted or substituted heterocyclic aromatic radical there may be selected preferably a mono- to tri-cyclic radical having preferably from five to seven ring atoms. That radical may consist only of at least one heterocyclic ring or the heterocyclic ring(s) may contain at least one fused-on benzene ring. There may be mentioned by way of example pyridyl, pyrimidyl, pyrazinyl, triazinyl, furanyl, pyrrolyl, thiophenyl, quinolyl, isoquinolyl, coumarinyl, benzofuranyl, benzimidazolyl, benzoxazolyl, dibenzofuranyl, benzothiophenyl, dibenzothiophenyl, indolyl, carbazolyl, pyrazolyl, imidazolyl, oxazolyl, isoxazolyl, thiazolyl, indazolyl, benzothiazolyl, pyridazinyl, cinnolyl, quinazolyl, quinoxalyl, phthalazinyl, phthalazinedionyl, phthalimidyl, chromonyl, naphtholactamyl, benzopyridonyl, ortho-sulfobenzimidyl, maleimidyl, naphthyridinyl, benzimidazolonyl, benzoxazolonyl, benzothiazolonyl, benzothiazolinyl, quinazolonyl, pyrimidyl, quinoxalonyl, phthalazonyl, dioxapyrimidinyl, pyridonyl, isoquinolonyl, isothiazolyl, benzisoxazolyl, benzisothiazolyl, indazolonyl, acridinyl, acridonyl, quinazolinedionyl, benzoxazinedionyl, benzoxazinonyl and phthalimidyl.

In a preferred embodiment, the carbocyclic and/or heterocyclic aromatic radicals are mono- or poly-substituted by customary substituents, especially by substituents that do not render the compound soluble in water. There may be mentioned by way of example:

halogen, such as fluorine, chlorine, bromine or iodine, preferably chlorine;

the cyano group —CN;

unsubstituted or substituted $C_1$–$C_{18}$alkyl, such as methyl, ethyl, n-propyl, isopropyl, n-butyl, isobutyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$-alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl, especially $C_1$–$C_8$-alkyl, such as methyl, ethyl, n-propyl, isopropyl, n-butyl, isobutyl, sec-butyl, tert-butyl, tert-amyl, n-hexyl, 1,1,3,3-tetramethylbutyl, n-heptyl, n-octyl, 3-pentyl, 4-heptyl, 3-hexyl or 3-heptyl, more especially $C_1$–$C_4$alkyl, such as methyl, ethyl, n-propyl, isopropyl, n-butyl, isobutyl, sec-butyl or tert-butyl;

it being possible for the mentioned alkyl groups to be substituted by the following groups, which generally do not increase hydrophilicity, such as fluorine, cyano, —OCOR$^{13}$, —OR$^{11}$, —OCOOR$^{13}$, —CON(R$^{11}$)(R$^{12}$) or —OCONHR$^{13}$, wherein R$^{13}$ is $C_1$–$C_{18}$alkyl, such as methyl, ethyl, n-propyl, isopropyl, n-butyl, isobutyl, sec-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl; $C_6$–$C_{10}$aryl, such as phenyl, 2,5-di-tert-butylphenyl or naphthyl, preferably phenyl or naphthyl; or benzyl that is unsubstituted or substituted by halogen, such as chlorine or fluorine, preferably fluorine, $C_1$–$C_4$alkyl or by —O—$C_1$–$C_4$alkyl; or a 5- to 7-membered heterocyclic radical, such as pyridyl, pyrimidyl, pyrazinyl, triazinyl, furanyl, pyrrolyl, thiophenyl, quinolyl, isoquinolyl or coumarinyl, and R$^{11}$ and R$^{12}$ are hydrogen, $C_1$–$C_{18}$alkyl that is unsubstituted or substituted by the cyano group or by the hydroxy group, as already mentioned above, preferably $C_1$–$C_{12}$-alkyl, especially $C_1$–$C_8$alkyl, more especially $C_1$–$C_4$alkyl as already mentioned above, $C_3$- to $C_{24}$-cycloalkyl, preferably $C_5$-, $C_6$-, $C_{12}$-, $C_{15}$-, $C_{16}$-, $C_{20}$- or $C_{24}$-cycloalkyl, aryl or heteroaryl, preferably derived from the above-mentioned carbocyclic and heterocyclic aromatic radicals, especially phenyl that is unsubstituted or substituted by halogen, $C_1$–$C_4$alkyl or by $C_1$–$C_4$alkoxy, or R$^{11}$ and R$^{12}$ together, or, as the case may be, with at least one of the other radicals R$^2$ to R$^9$ form a 5- or 6-membered ring or hetero ring, for example a pyridine, pyrrole, furan or pyran ring; preferred radicals —OR$^{11}$ are hydroxy, —O-methyl, —O-ethyl, —O-isopropyl, —O-isobutyl, —O-phenyl and —O-2,5-di-tert-butylphenyl; and preferred radicals —CON(R$^{11}$)(R$^{12}$) are —CONH$_2$, —CONMe$_2$, —CONEt$_2$, —CON(isoPr)$_2$, —CON(isoBu)$_2$, —CONPh$_2$ and —CON(2,5-di-tert-butylphenyl)$_2$.

In a further preferred embodiment there are used as substituents on the alkyl groups mono- or di-alkylated amino groups, aryl radicals, such as naphthyl or such as, especially, phenyl that is unsubstituted or substituted by halogen, alkyl or by —O-alkyl, or heterocyclic aromatic radicals, such as 2-thienyl, 2-benzoxazolyl, 2-benzothiazolyl, 2-benzimidazolyl, 6-benzimidazolonyl, 2-, 3- or 4-pyridinyl, 2-, 4- or 6-quinolyl or 1-, 3-, 4-, 6- or 8-isoquinolyl radicals.

If the mentioned substituents themselves contain alkyl, then that alkyl may be branched or unbranched and may contain preferably from 1 to 18, especially from 1 to 12, more especially from 1 to 8 and very especially from 1 to 4, carbon atoms. Examples of unsubstituted alkyl groups are methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl and 3-undecyl. Examples of substituted alkyl groups are hydroxymethyl, 2-hydroxyethyl, trifluoromethyl, trifluoroethyl, cyanomethyl, methoxycarbonylmethyl, acetoxymethyl and benzyl.

—$OR^{10}$, wherein $R^{10}$ is hydrogen, $C_1$–$C_{18}$alkyl as already defined for $R^{13}$, including the preferred variants mentioned therefor, $C_3$- to $C_{24}$-cycloalkyl, preferably $C_5$-, $C_6$-, $C_{12}$-, $C_{15}$-, $C_{16}$-, $C_{20}$- or $C_{24}$-cycloalkyl, $C_6$–$C_{10}$aryl, such as naphthyl or phenyl, preferably unsubstituted phenyl or phenyl that is substituted by halogen, $C_1$–$C_4$alkyl or by $C_1$–$C_4$-alkoxy, or 5- to 7-membered heteroaryl. There may be mentioned as examples of preferred radicals for $R^{10}$: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- and p-chlorophenyl, o-, m- and p-methylphenyl, 1- and 2-naphthyl, cyclopentyl, cyclohexyl, cyclododecyl, cyclopentadecyl, cyclohexadecyl, cycloeicosanyl, cyclotetracosanyl, thienyl and pyranylmethyl; preferred radicals —$OR^{10}$ are hydroxy, methoxy, —O-ethyl, —O-isopropyl, —O-isobutyl, —O-phenyl and —O-2,5-di-tert-butylphenyl;

—$NR^{11}R^{12}$, wherein $R^{11}$ and $R^{12}$ are as defined hereinabove. There may be mentioned as examples of preferred radicals: amino, methylamino, dimethylamino, ethylamino, diethylamino, isopropylamino, 2-hydroxyethylamino, 2-hydroxypropylamino, N,N-bis(2-hydroxyethyl)amino, cyclopentylamino, cyclohexylamino, cyclododecylamino, cyclopentadecylamino, cyclohexadecylamino, cycloeicosanylamino, cyclotetracosanylamino, phenylamino, N-methylphenylamino, benzylamino, dibenzylamino, piperidyl and morpholyl;

—$COR^{13}$, wherein $R^{13}$ is as defined hereinabove. There may be mentioned as examples of preferred radicals $R^{13}$: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m and p-chlorophenyl, o-, m- and p-methylphenyl, 1- and 2-naphthyl, cyclopentyl, cyclohexyl, cyclododecyl, cyclopentadecyl, cyclohexadecyl, cycloeicosanyl, cyclotetracosanyl, thienyl, pyranylmethyl and furfuryl;

—$NR^{14}COR^{13}$, wherein $R^{13}$ is as defined hereinabove and $R^{14}$ is hydrogen; $C_1$–$C_8$alkyl that is unsubstituted or substituted by cyano, hydroxy or $C_1$–$C_4$alkoxycarbonyl groups; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy groups; or a 5- to 7-membered heterocycle, the individual radicals, such as alkyl, alkoxy, aryl, etc., having the meanings given above for those radicals, including the ranges of preferred meanings given therefor. The following radicals may be mentioned by way of example: acetylamino, propionylamino, butyrylamino, benzoylamino, p-chlorobenzoylamino, p-methylbenzoylamino, N-methylacetamino, N-methylbenzoylamino, N-succinimido, N-phthalimido and N-(4-amino)phthalimido;

—$NR^{10}COOR^{13}$, wherein $R^{13}$ and $R^{10}$ are as defined hereinabove. The following radicals may be mentioned by way of example: —$NHCOOCH_3$, —$NHCOOC_2H_5$ and —$NHCOOC_6H_5$;

—$NR^{10}CONR^{11}R^{12}$, wherein $R^{11}$, $R^{12}$ and $R^{10}$ are as defined hereinabove. The following radicals may be mentioned by way of example: ureido, N-methylureido, N-phenylureido and N,N'-2', 4'-dimethylphenylureido;

—$NHSO_2R^{13}$, wherein $R^{13}$ is as defined hereinabove. The following radicals may be mentioned by way of example: methylsulfonylamino, phenylsulfonylamino, p-tolylsulfonylamino and 2-naphthylsulfonylamino;

—$SO_2R^{13}$, wherein $R^{13}$ is as defined hereinabove. The following radicals may be mentioned by way of example: methylsulfonyl, ethylsulfonyl, phenylsulfonyl and 2-naphthylsulfonyl;

—$SOR^{13}$, wherein $R^{13}$ is as defined hereinabove. The phenylsulfoxidyl radical may be mentioned by way of example.

—$SO_2OR^{13}$, wherein $R^{13}$ is as defined hereinabove. There may be mentioned as examples of radicals $R^{13}$: methyl, ethyl, phenyl, o-, m- and p-chlorophenyl, o-, m- and p-methylphenyl and 1- and 2-naphthyl;

—$CONR^{11}R^{12}$, wherein $R^{11}$ and $R^{12}$ are as defined hereinabove. The following radicals may be mentioned by way of example: carbamoyl, N-methylcarbamoyl, N-ethylcarbamoyl, N-phenylcarbamoyl, N,N-dimethylcarbamoyl, N-methyl-N-phenylcarbamoyl, N-1-naphthylcarbamoyl and N-piperidylcarbamoyl;

—$SO_2NR^{11}R^{12}$, wherein $R^{11}$ and $R^{12}$ are as defined hereinabove. The following radicals may be mentioned by way of example: sulfamoyl, N-methylsulfamoyl, N-ethylsulfamoyl, N-phenylsulfamoyl, N-methyl-N-phenylsulfamoyl and N-morpholylsulfamoyl;

—$N=NR^{15}$, wherein $R^{15}$ is the radical of a coupling component or is a phenyl radical that is unsubstituted or substituted by halogen, alkyl or by —O-alkyl, with halogen and alkyl being as defined above. Alkyl in the definitions of $R^{15}$ can have a number of carbon atoms mentioned above as being preferred. There may be mentioned as examples of $R^{15}$: the acetoacetarylide, pyrazolyl, pyridonyl, o- and p-hydroxyphenyl, o-hydroxynaphthyl, p-aminophenyl and p-N,N-dimethylaminophenyl radicals;

—$OCOR^{13}$, wherein $R^{13}$ is as defined hereinabove. There may be mentioned as examples of radicals $R^{13}$: methyl, ethyl, phenyl and o-, m- and p-chlorophenyl;

—$OCONHR^{13}$, wherein $R^{13}$ is as defined hereinabove. There may be mentioned as examples of radicals $R^{13}$: methyl, ethyl, phenyl, and o-, m- and p-chlorophenyl.

As halogen there may be used fluorine, chlorine, bromine or iodine, preferably fluorine or chlorine.

As unsubstituted or substituted $C_1$–$C_{18}$alkyl there may be used methyl, ethyl, n-propyl, isopropyl, n-butyl, isobutyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl, especially $C_1$–$C_8$alkyl, such as methyl, ethyl, n-propyl, isopropyl, n-butyl, isobutyl, sec-butyl, tert-butyl, tert-amyl, n-hexyl, 1,1,3,3-tetramethylbutyl, n-heptyl, n-octyl, 3-pentyl, 4-heptyl, 3-hexyl or 3-heptyl, more especially $C_1$–$C_4$alkyl, such as methyl, ethyl, n-propyl, isopropyl, n-butyl, isobutyl, sec-butyl or tert-butyl;

it being possible for the mentioned alkyl groups to be substituted by the following groups, which generally do not increase hydrophilicity, such as fluorine, hydroxy, cyano, —OCOR$^{13}$, —OR$^{11}$, —OCOOR$^{13}$, —CON(R$^{11}$)(R$^{12}$) or —OCONHR$^{13}$, wherein R is $C_1$–$C_{18}$alkyl, such as methyl, ethyl, n-propyl, isopropyl, n-butyl, isobutyl, sec-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl; $C_6$–$C_{10}$aryl, such as phenyl or naphthyl, preferably naphthyl; or benzyl that is unsubstituted or substituted by halogen, such as chlorine or fluorine, preferably fluorine, $C_1$–$C_4$alkyl or by —O—$C_1$–$C_4$alkyl; or a 5- to 7-membered heterocyclic radical, such as pyridyl, pyrimidyl, pyrazinyl, triazinyl, furanyl, pyrrolyl, thiophenyl, quinolyl, isoquinolyl or coumarinyl, and R$^{11}$ and R$^{12}$ are hydrogen, $C_1$–$C_{18}$alkyl that is unsubstituted or substituted by the cyano group or by the hydroxy group, as already mentioned above, preferably $C_1$–$C_{12}$-alkyl, especially $C_1$–$C_8$alkyl, more especially $C_1$–$C_4$alkyl as already mentioned above, $C_3$- to $C_{24}$-cycloalkyl, preferably $C_5$-, $C_6$-, $C_{12}$-, $C_{15}$-, $C_{16}$-, $C_{20}$- or $C_{24}$-cycloalkyl, aryl or heteroaryl, preferably derived from the above-mentioned carbocyclic and heterocyclic aromatic radicals, especially phenyl that is unsubstituted or substituted by halogen, $C_1$–$C_4$alkyl or by $C_1$–$C_4$alkoxy, or R$^{11}$ and R$^{12}$ together, or, as the case may be, with at least one of the other radicals R$^2$ to R$^9$ form a 5- or 6-membered ring or hetero ring, for example a pyridine, pyrrole, furan or pyran ring.

In a further preferred embodiment there are used as substituents on the alkyl groups mono- or di-alkylated amino groups, aryl radicals, such as naphthyl or such as, especially, phenyl that is unsubstituted or substituted by halogen, alkyl or by —O-alkyl, or heterocyclic aromatic radicals, such as 2-thienyl, 2-benzoxazolyl, 2-benzothiazolyl, 2-benzimidazolyl, 6-benzimidazolonyl, 2-, 3- or 4-pyridinyl, 2-, 4- or 6-quinolyl or 1-, 3-, 4-, 6- or 8-isoquinolyl radicals.

If the mentioned substituents themselves contain alkyl, then that alkyl may be branched or unbranched and may contain preferably from 1 to 18, especially from 1 to 12, more especially from 1 to 8 and very especially from 1 to 4, carbon atoms. Examples of unsubstituted alkyl groups are methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl and 3-undecyl. Examples of substituted alkyl groups are hydroxymethyl, 2-hydroxyethyl, trifluoromethyl, trifluoroethyl, cyanomethyl, methoxycarbonylmethyl, acetoxymethyl and benzyl.

In the radical —OR$^{10}$, there may be used for R$^{10}$: hydrogen, or $C_1$–$C_{18}$alkyl as already defined for R$^{12}$, including the preferred variants mentioned therefor. There may be mentioned as examples of preferred radicals for R$^{10}$: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- and p-chlorophenyl, o-, m- and p-methylphenyl, 1- and 2-naphthyl, cyclopentyl, cyclohexyl, cyclododecyl, cyclopentadecyl, cyclohexadecyl, cycloeicosanyl, cyclotetracosanyl, thienyl and pyranylmethyl. Examples of preferred radicals —OR$^{10}$ are hydroxy, methoxy, —O-ethyl, —O-isopropyl, —O-isobutyl, —O-phenyl and —O-2,5-di-tert-butylphenyl.

In —NR$^{11}$R$^{12}$, the radicals already defined above may be used for R$^{11}$ and R$^{12}$. There may be mentioned as examples of preferred —NR$^{11}$R$^{12}$ radicals: amino, methylamino, dimethylamino, ethylamino, diethylamino, isopropylamino, 2-hydroxyethylamino, 2-hydroxypropylamino, N,N-bis(2-hydroxyethyl)amino, cyclopentylamino, cyclohexylamino, cyclododecylamino, cyclopentadecylamino, cyclohexadecylamino, cycloeicosanylamino, cyclotetracosanylamino, phenylamino, N-methylphenylamino, benzylamino, dibenzylamino, piperidyl and morpholyl, special preference being given to dimethylamino, diethylamino, di-n-propylamino, di-n-butylamino, di-n-pentylamino, di-n-hexylamino, di-n-heptylamino, di-n-octylamino and di-n-dodecylamino.

R$^{11}$ and R$^{12}$, together, or, as the case may be, together with in each case at least one of the other radicals from the group R$^2$, R$^3$, R$^4$, R$^5$, R$^6$, R$^7$, R$^8$ and R$^9$, may form one or more 5- or 6-membered, saturated or unsaturated carbocyclic or heterocyclic rings, such as pyridine, pyrrole, piperidine, quinoline or benzoquinolizine derivatives.

There may be used as —COR$^{13}$ radicals those wherein R$^{13}$ is as defined hereinabove. The following may be mentioned as examples of preferred radicals R$^{13}$: methyl, ethyl, n-propyl, isopropyl, n-butyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl, 3-undecyl, hydroxymethyl, 2-hydroxyethyl, trifluoromethyl, trifluoroethyl, cyanomethyl, methoxycarbonylmethyl, acetoxymethyl, benzyl, phenyl, o-, m- and p-chlorophenyl, o-, m- and p-methylphenyl, 1- and 2-naphthyl, cyclopentyl, cyclohexyl, cyclododecyl, cyclopentadecyl, cyclohexadecyl, cycloeicosanyl, cyclotetracosanyl, thienyl, pyranylmethyl and furfuryl.

There may be used as —NR$^{14}$COR$^{13}$ radicals those wherein R$^{13}$ is as defined hereinabove and R$^{14}$ is hydrogen, $C_1$–$C_{18}$alkyl that is unsubstituted or substituted by cyano groups, hydroxy groups or by $C_1$–$C_4$alkoxycarbonyl groups, $C_3$- to $C_{24}$-cycloalkyl, $C_1$–$C_4$alkylaryl, $C_6$–$C_{10}$aryl that is unsubstituted or substituted by halogen, $C_1$–$C_4$alkyl groups or by $C_1$–$C_4$-alkoxy groups, or a 5- to 7-membered heterocycle, the individual radicals, such as alkyl, alkoxy, aryl, etc., having the meanings given above for those radicals, including the preferred ranges of meanings given therefor, such as o-, m- or p-chlorophenyl, o-, m- or p-methylphenyl, 1- or 2-naphthyl, cyclopentyl, cyclohexyl, cyclododecyl, cyclopentadecyl, cyclohexadecyl, cycloeicosanyl, cyclotetracosanyl, thienyl, pyranylmethyl, benzyl or furfuryl.

The following radicals may be mentioned by way of example: acetylamino, propionylamino, butyrylamino, benzoylamino, p-chlorobenzoylamino, p-methylbenzoylamino, N-methylacetamino, N-methylbenzoylamino, N-succinimido, N-phthalimido and N-(4-amino)-phthalimido.

There may be used as —NR[10]COOR[13] radicals those wherein R[13] and R[10] have the meanings already given hereinabove. The following radicals may be mentioned by way of example: —NHCOOCH$_3$, —NHCOOC$_2$H$_5$ and —NHCOOC$_6$H$_5$.

There may be used as —NR[10]CONR[11]R[12] radicals those wherein R[11], R[12] and R[10] are as defined hereinabove. The following radicals may be mentioned by way of example: ureido, N-methylureido, N-phenylureido and N,N'-2',4'-dimethylphenylureido.

There may be used as —NHSO$_2$R[13] radicals those wherein R[13] is as defined hereinabove. The following radicals may be mentioned by way of example: methylsulfonylamino, phenylsulfonylamino, p-tolylsulfonylamino and 2-naphthylsulfonylamino.

There may be used as —SO$_2$R[13] radicals those wherein R[13] is as defined hereinabove. The following radicals may be mentioned by way of example: methylsulfonyl, ethylsulfonyl, phenylsulfonyl and 2-naphthylsulfonyl.

There may be used as —SOR[13] radicals those wherein R[13] is as defined hereinabove. The phenylsulfoxidyl radical may be mentioned by way of example.

There may be used as —CONR[11]R[12] radicals those wherein R[11] and R[12] are as defined hereinabove. The following radicals may be mentioned by way of example: carbamoyl, N-methylcarbamoyl, N-ethylcarbamoyl, N-phenylcarbamoyl, N,N-dimethylcarbamoyl, N-methyl-N-phenylcarbamoyl, N-1-naphthylcarbamoyl and N-piperidylcarbamoyl. There may be used as —SO$_2$NR[11]R[12] radicals those wherein R[11] and R[12] are as defined hereinabove. The following radicals may be mentioned by way of example: sulfamoyl, N-methylsulfamoyl, N-ethylsulfamoyl, N-phenylsulfamoyl, N-methyl-N-phenylsulfamoyl and N-morpholylsulfamoyl.

There may be used as —N═NR[15] radicals those wherein R[15] is the radical of a coupling component or is a phenyl radical that is unsubstituted or substituted by halogen, alkyl or by —O-alkyl, with halogen and alkyl being as defined above. Alkyl in the definitions of R[15] can have a number of carbon atoms mentioned above as being preferred. There may be mentioned as examples of R[15]: the acetoacetarylide, pyrazolyl, pyridonyl, o- and p-hydroxyphenyl, o-hydroxynaphthyl, p-aminophenyl and p-N,N-dimethylaminophenyl radicals.

There may be used as —OCOR[13] radicals those wherein R[13] is as defined hereinabove. There may be mentioned as examples of radicals R[13]: methyl, ethyl, phenyl and o-, m- and p-chlorophenyl.

There may be used as —OCONHR[13] radicals those wherein R[13] is as defined hereinabove. There may be mentioned as examples of radicals R[13]: methyl, ethyl, phenyl and o-, m- and p-chlorophenyl.

Especially preferred perylene hydrazide imides I are those wherein R[2], R[3], R[4], R[5], R[6], R[7], R[8] and R[9] are hydrogen and R[1] is a secondary alkyl radical, such as 1—(C$_1$–C$_9$alkyl)—C$_2$—C$_{10}$alkyl, especially those wherein the radical R[1] has a "swallow-tail structure", such as 1-methylethyl, 1-ethyl-n-propyl, 1-n-propyl-n-butyl, 1-n-butyl-n-pentyl, 1-n-hexyl-1-heptyl, 1-n-heptyl-1-n-octyl, 1-n-octyl-1-n-nonyl, 1-n-nonyl-1-decyl, or an aromatic radical, especially the phenyl radical, more especially C$_1$–C$_6$alkyl-substituted phenyl, such as 2,6-di-tert-butylphenyl or 2,5-di-tert-butylphenyl.

Especially the compounds wherein R[1]=1-n-butyl-n-pentyl, 1-n-hexyl-1-heptyl, 1-n-heptyl-1-n-octyl, 1-n-octyl-1-n-nonyl, 1-n-nonyl-1-decyl or 2,5-di-tert-butylphenyl are distinguished by their good solubility, the solubility increasing as the chain length of the secondary alkyl radical increases, whereas the compound with the 2,5-di-tert-butylphenyl radical is distinctly less soluble than the alkyl compounds. The melting point of the secondary alkyl compounds falls as the chain length increases. The molar extinction coefficients lie in the region of approximately 80 000; in particular the 2,5-di-tert-butylphenyl derivative has a molar extinction coefficient of 84 500.

Characteristically, the perylene derivatives I according to the invention do not exhibit any fluorescence in solution. Fluorescence of extremely weak intensity observed in some tests hitherto may in all probability be attributable to extremely small traces of by-products, the content of which is considerably below the otherwise normal detection limit. This might be attributable to the fact that, after optical excitation, electrons are transferred from the free amino group to the perylene chromophore, resulting in the quenching of fluorescence. A clue to this might be the fact that a strong fluorescence is induced by protonation or acylation, because the transfer of electrons is hindered thereby.

The perylene hydrazide imides I according to the invention are obtained preferably by reacting perylene anhydride imides of the general formula V

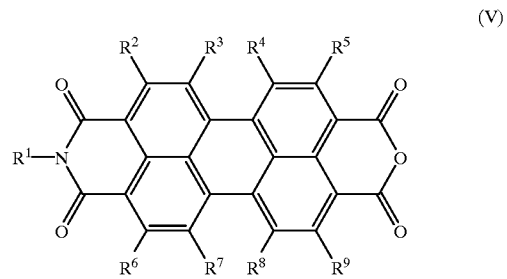

(V)

with hydrazine or hydrazine-yielding compounds, such as hydrazine hydrate or hydrazine adducts, such as hydrazine sulfate, hydrazine mono- or di-hydrochloride or hydrazine phosphate, preferably hydrazine hydrate.

Preferably, the reaction is carried out at reaction temperatures in the range of from 80 to 200° C., especially from 100 to 130° C. Observations made hitherto have shown that the success of the reaction is not dependent on the pressure range chosen. For the sake of simplicity, the reaction is usually carried out at atmospheric pressure, although lower pressures of down to 10 kPa or pressures up to 10 Mpa may also be chosen. Depending on the chosen reaction temperature, the reaction times are preferably chosen in the range of from 30 minutes to 1 hour. The reaction is, in addition, preferably carried out in the presence of a basic organic solvent, preferably a nitrogen-containing heterocycle, such as imidazole, quinoline, pyridine or picoline, especially imidazole, or a glycol, such as ethylene glycol or diethylene glycol.

In a preferred embodiment, the reaction is carried out under a protecting gas atmosphere. Suitable protecting gases include, for example, nitrogen and the noble gases, such as helium or argon.

Hydrazine, or hydrazine-yielding compounds, are usually used in excess, preferably in a two- to ten-fold excess, especially in a two- to three-fold excess, based on the perylene anhydride imide V.

Perylene anhydride imides V are known or can be prepared according to known methods, for example from the appropriate bisanhydrides. Some compounds are described, for example, in Chem. Ber. 124 (1991) 529.

It may furthermore be advantageous to carry out the reaction in the presence of a zinc compound, especially a water-soluble zinc salt, such as zinc acetate or zinc chloride. The molar ratio of perylene hydrazide imide I to zinc compound is usually chosen in the range of from 10:1 to 1:1, and is preferably 2:1.

nonyl-1-n-decyl, and $R^{18}$ is an aromatic radical, preferably a carbocyclic aromatic radical as already defined for $R^1$. $R^{18}$ is especially $C_6$–$C_{10}$aryl, such as phenyl or naphthyl, more especially phenyl. The compound of formula (VIa)

(VIa)

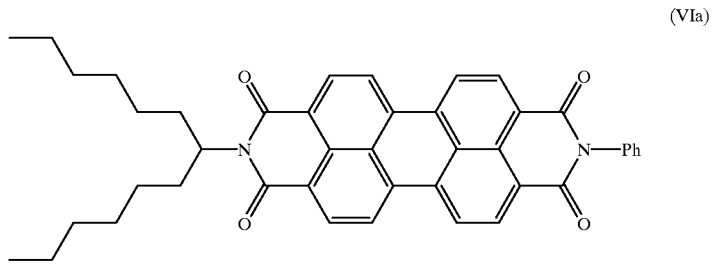

The perylene derivatives I according to the invention can be purified and isolated by customary methods, such as chromatography or extractive recrystallisation. Generally, the perylene derivatives I can then be used directly for further reactions, especially since the perylene derivatives I are usually free of fluorescent secondary products.

In order to prepare analytically pure samples, the perylene derivatives I may, in addition, be subjected to extractive recrystallisation from solvents such as cyclohexane. Such a procedure may, however, give rise to the formation of small quantities of fluorescent decomposition products. Although such products are generally completely insignificant for the elemental analysis and for the determination of the extinction coefficients, they may be troublesome, on account of their in some cases pronounced fluorescence, when the perylene derivatives I are to be used as carbonyl reagents. It is therefore especially preferred to purify the perylene derivatives I by chromatography alone.

The present invention relates also to a further process for the preparation of perylene derivatives I in which a perylene-3,4:9,10-tetracarboxylic acid bisimide of the general formula VI may be mentioned as an example.

In the hydrazinolysis, preferentially the aromatic radical is replaced by the —NH$_2$ group.

The reaction may be carried out stoichiometrically. Usually it is conducted with an excess of hydrazine or of a hydrazine-yielding compound as already mentioned, preferably hydrazine hydrate, the molar ratio of compound VI to hydrazine preferably being from 1:10 to 1:100. The reaction temperature is usually chosen in a range of from 50 to 100° C., and the reaction pressure chosen is advantageously atmospheric pressure. In a preferred embodiment the hydrazinolysis is carried out in a solvent, such as a high-boiling amine, for example quinoline or imidazole, or a tertiary alcohol, preferably tert-butyl alcohol. The reaction time is generally from 4 to 20 hours. Working up is usually carried out by treating the reaction mixture with excess water for from 1 to 4 hours. If desired, the resulting product can be freed of solvents, for example by filtration, washed with water and dried, for example, at a temperature in the range of from 90 to 140° C., and also further purified by chromatography.

The present invention relates also to the fluorescent perylene hydrazones of the general formula (II)

(VI)

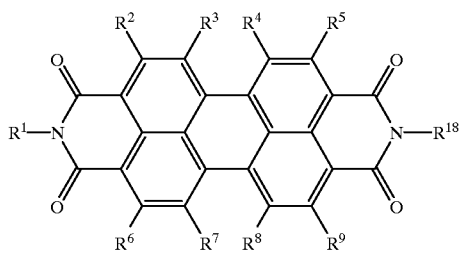

(II)

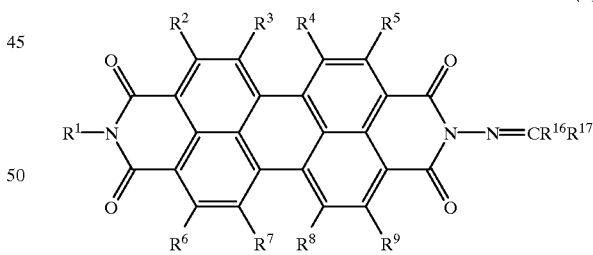

wherein $R^{18}$ has the same meaning as $R^1$ but $R^1$ and $R^{18}$ need not necessarily carry the same substituents simultaneously, is subjected to hydrazinolysis.

Perylene-3,4:9,10-tetracarboxylic acid bisimides of formula VI are known or can be prepared according to known methods, for example from the corresponding bisanhydrides or perylene anhydride imides.

Preferred bisimides VI are those wherein $R^1$ is an aliphatic radical as already defined, especially a secondary alkyl radical, such as 1-($C_1$–$C_9$alkyl)—$C_2$–$C_{10}$alkyl; preferably $R^1$ has a "swallow-tail structure", which can be realised by radicals such as 1-methyl-ethyl, 1-ethyl-n-propyl, 1-n-propyl-n-butyl, 1-n-butyl-n-pentyl, 1-n-hexyl-1-n-heptyl, 1-n-heptyl-1-n-octyl, 1-n-octyl-1-n-nonyl and 1-n- wherein the radicals $R^1$ to $R^9$ are as defined hereinabove and $R^{16}$ and $R^{17}$ are identical or different and have the meanings given for the radicals $R^2$ to $R^9$.

Preferred perylene hydrazones II are those wherein $R^2$, $R^3$, $R^4$, $R^5$, $R^6$, $R^7$, $R^8$ and $R^9$ are hydrogen and $R^1$ is a secondary alkyl radical, such as 1—($C_1$–$C_9$alkyl)— $C_2$–$C_{10}$alkyl, especially those wherein the radical $R^1$ has a "swallow-tail structure", such as 1-methyl-ethyl, 1-ethyl-n-propyl, 1-n-propyl-n-butyl, 1-n-butyl-n-pentyl, 1-n-hexyl-1-heptyl, 1-n-heptyl-1-n-octyl, 1-n-octyl-1-n-nonyl, 1-n-nonyl-1-decyl, or an aromatic radical, especially the phenyl radical, more especially $C_1$–$C_6$alkyl-substituted phenyl, such as 2,6-di-tert-butylphenyl or 2,5-di-tert-butylphenyl, and $R^{16}$ and $R^{17}$ are identical or different and are unsubstituted or substituted $C_1$–$C_{18}$alkyl, such as methyl, ethyl, n-propyl, isopropyl, n-butyl, isobutyl, sec-butyl, tert-butyl, tert-amyl, n-hexyl, 1,1,3,3-tetramethylbutyl, n-heptyl, n-octyl, n-nonyl, n-decyl, n-undecyl, n-dodecyl, n-octadecyl, 3-pentyl, 4-heptyl, 5-nonyl, 6-undecyl, 7-tridecyl, 3-hexyl, 3-heptyl, 3-nonyl or 3-undecyl, preferably $C_1$–$C_{12}$alkyl, such as methyl, ethyl, n-propyl, isopropyl, n-butyl, sec-butyl, tert-butyl, tert-amyl, n-hexyl, n-heptyl, n-octyl, n-nonyl, n-decyl, n-undecyl, n-dodecyl, 3-pentyl, 4-heptyl, 5-nonyl, 6-undecyl, 7-tridecyl, 3-hexyl, 3-heptyl, 3-nonyl or 3-undecyl, especially $C_1$–$C_8$alkyl, such as methyl, ethyl, n-propyl, isopropyl, n-butyl, isobutyl, sec-butyl, tert-butyl, tert-amyl, n-hexyl, 1,1,3,3-tetramethylbutyl, n-heptyl, n-octyl, 3-pentyl, 4-heptyl, 3-hexyl or 3-heptyl, or chloromethyl; $C_2$–$C_8$alkenyl, such as ethenyl, n-propenyl, isopropenyl, n-but-1-enyl, 2-methyl-prop-1-enyl, n-pent-1-enyl, n-hex-1-enyl, n-hept-1-enyl or 1-oct-1-enyl, preferably 2-methyl-prop-1-enyl; unsubstituted or $C_1$–$C_4$alkoxy-substituted $C_6$–$C_{10}$aryl, such as phenyl, naphthyl, 4-methoxy-phenyl, cyclopentyl, cyclohexyl, furan-2-yl or tetrahydrofuran-2-yl; $R^{16}$ and $R^{17}$ may especially, together with the carbon atom connecting them, form a five- or six-membered ring, such as a cyclopentyl or cyclohexyl ring; $R^{16}$ is more especially phenyl, 4-methoxy, furan-2-yl, chloromethyl, methyl, n-butyl, n-hexyl or 2-methyl-prop-1-enyl, and $R^{17}$ is hydrogen, methyl or ethoxy.

The perylene hydrazones II according to the invention are obtained preferably by reacting a perylene imide I with a carbonyl compound $R^{16}R^{17}C=O$.

A suitable carbonyl compound is, in principle, any carbonyl compound that is capable of forming a Schiff's base with the $NNH_2$ group of the perylene hydrazide imide I, preferably an aliphatic ketone, such as cyclohexanone, an α,β-unsaturated ketone, such as mesityl oxide, an aldehyde, especially an aromatic aldehyde, such as acetaldehyde, n-pentanal or n-octanal, or an ester, such as ethyl chloroformate or methyl chloroformate, more especially a carbonyl compound in which $R^{16}$ and $R^{17}$ contain the above-defined radicals.

The molar ratio of perylene hydrazide imide I to carbonyl compound is usually chosen in the range of from 10:1 to 0.1:1.

The reaction is generally carried out at a temperature in the range of from 20 to 150° C., especially from 40 to 100° C., more especially from 50 to 75° C. In an especially preferred embodiment, the reaction is carried out at from 55 to 65° C., especially in chloroform boiling at atmospheric pressure (about 60° C.).

Where appropriate, the reaction may be carried out in a customary inert solvent that does not adversely affect the reaction, such as a chlorinated hydrocarbon, for example chloroform or 1,1,2,2-tetrachloroethane or tetrahydrofuran. The amount of solvent used is not usually critical.

The duration of the reaction generally depends primarily on the chosen reaction temperature, and is preferably in the range of from 5 minutes to 60 minutes.

Preferably, the product is purified and isolated by chromatography. The UV/visible spectra of the perylene hydrazones (II) are generally very similar to those of the known perylene dyes. The absorption and fluorescence bands according to observations made hitherto are in the customary wavelength range, and the extinction coefficients are usually from 87 000 to 92 000.

In a further embodiment of the present invention, the similarity of the UV/visible spectra may be used for analytical purposes since, irrespective of the derivatisation, as a rule measurements in the same spectral range are possible for any carbonyl compounds.

A further embodiment of the present invention is accordingly concerned with a method of identifying carbonyl compounds by reacting a carbonyl compound with a hydrazide, which method comprises reacting a perylene hydrazide imide I according to the invention with a carbonyl compound $R^{16}R^{17}C=O$ and analysing the resulting perylene hydrazone II by spectroscopy, preferably fluorescence spectroscopy, or by chromatography.

The present invention relates also to the use of perylene hydrazide imides I as identification reagents for carbonyl compounds.

In an especially preferred embodiment, especially pure perylene hydrazide imides I are used for the identification method. It is also especially advantageous if, in addition, the extinction coefficients are precisely determined and corresponding calibration curves are ascertained by the use of different concentrations. For example, the best results for the preparation of the perylene hydrazones II in pure form are achieved by reacting the carbonyl compounds as they are and then removing excess carbonyl compound by distillation. Derivatives of aliphatic ketones, such as cyclohexanone, of aldehydes, of α,β-unsaturated ketones, such as mesityl oxide, and of aromatic aldehydes, such as benzaldehyde and anisaldehyde, are generally obtainable in that way.

Usually, fluorescence is seen as positive detection of aldehydes and ketones after only a few minutes and, in particular, the fluorescence is detected especially well by a visual comparison with a blank specimen, advantageously with the aid of a commercial UV fluorescent lamp (lines of the mercury vapour lamp at 365 nm). The reaction can generally be completed by extending the reaction time to, for example, 1 hour.

Since fluorescence is usually induced also by protonation, all reagents should preferably be acid-free, unless it is actually desired to detect protons. A further embodiment of the present invention is therefore concerned with a method of detecting protonic acids, wherein a perylene hydrazide imide I is brought into contact with a protonic acid and the reaction product is analysed by means of fluorescence spectroscopy or chromatography. Preferred protonic acids are mineral acids, such as hydrochloric acid, sulfuric acid, nitric acid, and sulfonic acids, such as methanesulfonic acid, benzenesulfonic acid and toluenesulfonic acid, and also aliphatic, aromatic or polybasic carboxylic acids, such as acetic acid, trifluoroacetic acid, benzoic acid and citric acid.

It is also advantageous for the detection of carbonyl compounds, and protonic acids, for the substances used to be free of acylating agents, such as acid chlorides or acid anhydrides, since in general acylating agents are also able to react with the perylene hydrazide imides I according to the invention. A further embodiment of the present invention accordingly concerns a method of detecting acylating agents wherein a perylene hydrazide imide I is brought into contact with an acylating agent and the reaction product is analysed by means of chromatography or fluorescence spectroscopy.

In a preferred embodiment, which concerns the detection of carbonyl compounds, any acylating agents present are hydrolysed in a manner known per se prior to the qualitative identification of the carbonyl compounds, where they are in admixture with aldehydes or ketones.

It has also been found that carboxylic acid esters do not interfere in the qualitative identification of carbonyl compounds, since they react more slowly with the perylene hydrazide imides I than do aldehydes and ketones.

The perylene hydrazones II formed in the detection methods according to the invention can be identified by their $R_f$ values, preferably by means of chromatography, especially by means of thin-layer chromatography or by means of HPLC (High Pressure Liquid Chromatography), generally with a high degree of detection sensitivity. It has also been found that the simultaneous detection of several carbonyl compounds in complex mixtures is possible using thin-layer chromatography methods. This could be of interest, for example, for the isolation of new natural substances. The present invention accordingly relates also to a method for the simultaneous detection of more than one carbonyl compound in a mixture wherein the mixture containing the carbonyl compounds is reacted with a perylene hydrazide imide I and the reaction mixture is worked up by chromatography.

It has also been found that, when aldehydes and ketones are used in less than stoichiometric amounts in relation to the perylene hydrazide imide I, an increase in the fluorescence intensity is observed as the proportion of carbonyl compound increases. Using calibration curves it is possible to determine the quantity of the carbonyl compounds concerned, or of the protonic acids and acylating agents concerned. The quantitative detection method according to the invention is used especially in the case of non-volatile aldehydes and ketones. A further embodiment of the present invention accordingly concerns the quantitative determination of carbonyl compounds, protonic acids and acylating agents by determining the fluorescence intensity of the perylene hydrazones II obtained in each case.

Finally, it has been discovered that the perylene derivatives I and II according to the invention form stable, coloured complexes with metal salts, such as the nitrates, chlorides, sulfates and perchlorates of magnesium and aluminium. Further embodiments of the present invention are accordingly concerned with metal complexes obtainable by reacting a metal salt with perylene hydrazide imide I or perylene hydrazone II, a method of detecting metal salts, the use of the perylene derivatives I and II according to the invention in the detection of metal ions, a process for the preparation of metal complexes with the perylene derivatives I and II, and the use of the perylene derivatives I and II in the preparation of metal-containing colourants, especially the use of perylene hydrazone II in the preparation of fluorescent metal-containing colourants.

A further embodiment concerns perylene-3,4:9,10-tetracarboxylic acid bisimides III

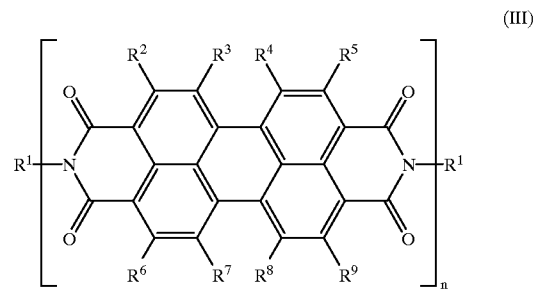

wherein n is 2 or 3.

Preferred perylene bisimides III are bifluorophoric perylene-3,4:9,10-tetracarboxylic acid bisimides (n=2) (IIIa)

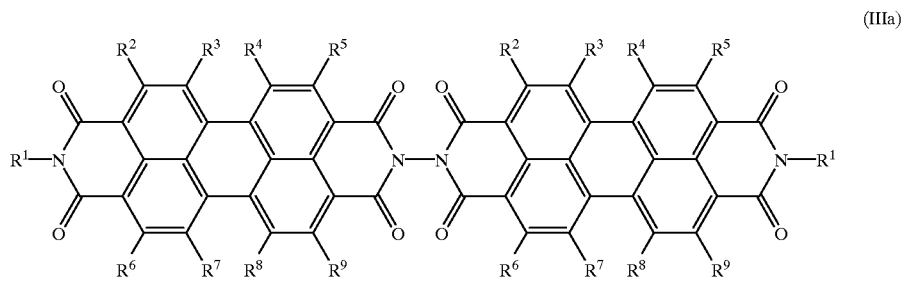

and trifluorophoric perylene-3,4:9,10-tetracarboxylic acid bisimides (n=3) (IIIb)

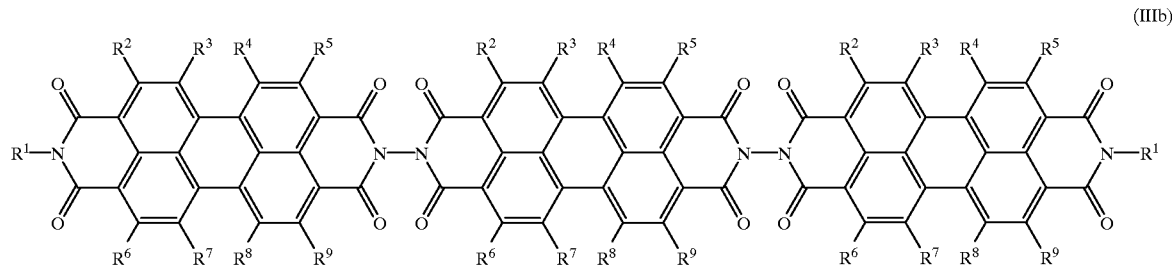

especially those wherein $R^2$, $R^3$, $R^4$, $R^5$, $R^6$, $R^7$, $R^8$ and $R^9$ are hydrogen.

Especially preferred bi- and tri-fluorophoric perylene-3,4:9,10-tetracarboxylic acid bisimides III are those wherein $R^2$, $R^3$, $R^4$, $R^5$, $R^6$, $R^7$, $R^8$ and $R^9$ are hydrogen and $R^1$ is a secondary alkyl radical, such as 1—($C_1$–$C_9$alkyl)—$C_2$–$C_{10}$alkyl, especially those wherein the radical $R^1$ has a "swallow-tail structure", such as 1-methyl-ethyl, 1-ethyl-n- propyl, 1-n-propyl-n-butyl, 1-n-butyl-n-pentyl, 1-n-hexyl-1-heptyl, 1-n-heptyl-1-n-octyl, 1-n-octyl-1-n-nonyl or 1-n-nonyl-1-decyl, or an aromatic radical, especially a phenyl radical, more especially $C_1$–$C_6$alkyl-substituted phenyl, such as 2,6-di-tert-butylphenyl or 2,5-di-tert-butylphenyl.

The bifluorophoric perylene-3,4:9,10-tetracarboxylic acid bisimides IIIa according to the invention are obtained preferably by reacting the perylene hydrazide imides I according to the invention

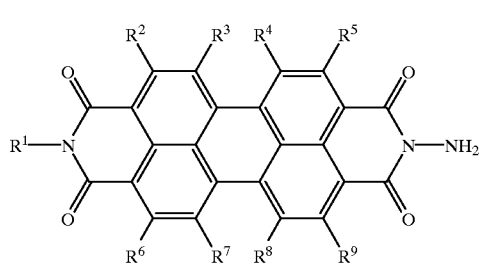

(I)

with N-substituted perylene-3,4:9,10-tetracarboxylic acid 3,4-anhydride-9,10-imides V

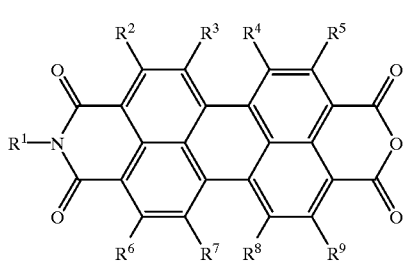

(V)

In an especially preferred embodiment, the reaction is carried out in the presence of a basic organic solvent, preferably a nitrogen-containing heterocycle, such as imidazole, quinoline, pyridine or picoline, especially imidazole, or a glycol, such as ethylene glycol or diethylene glycol.

Usually, the reaction is carried out at reaction temperatures in the range of from 80 to 200° C., preferably from 100 to 150° C. and especially from 130 to 150° C.

Observations made hitherto have shown that the success of the reaction is not dependent on the choice of pressure range. For the sake of simplicity, the reaction is usually carried out under atmospheric pressure, although lower pressures of down to 10 kPa or pressures up to 10 MPa may also be chosen. Depending on the chosen reaction temperature, the reaction times are preferably chosen in the range of from 30 minutes to 1 hour.

The molar ratio of perylene hydrazide imide I to N-substituted perylene-3,4:9,10-tetracarboxylic acid 3,4-anhydride-9,10-imide V is usually chosen in the range of from 1.25:1 to 0.8:1, preferably from 1.1:1 to 0.9:1; more especially a stoichiometric molar ratio is chosen in order to facilitate working up.

The amount of solvent is generally chosen in the range of from 0.5 to 20 kg of solvent per mole of perylene hydrazide imide I.

Generally, the reaction time is chosen in the range of from 0.5 to 10 hours, preferably from 1 to 2 hours.

In a preferred embodiment, the reaction is carried out under a protecting gas atmosphere, such as a nitrogen, helium or argon atmosphere.

It may furthermore be advantageous to carry out the reaction in the presence of a zinc compound, especially a water-soluble zinc salt, such as zinc acetate or zinc chloride. The molar ratio of perylene-3,4:9,10-tetracarboxylic acid monoanhydride monoimide of formula V to zinc compound is usually chosen in the range of from 10:1 to 1:1, and is preferably 2:1.

In a preferred embodiment the reaction mixture, which may still be at an elevated temperature, is diluted with a water-soluble alcohol, such as a $C_1$–$C_4$alkanol, preferably methanol, ethanol, n-propanol, isopropanol or n-butanol, especially ethanol, in an amount generally of from 10 to 500 litres, preferably from 40 to 60 litres, especially 50 litres, per mole of perylene hydrazide imide I. The diluted reaction mixture is then customarily acidified, advantageously with a mineral acid, such as hydrochloric acid, nitric acid, sulfuric acid, or alternatively phosphoric acid, to a pH of less than 7, preferably less than 6, especially less than 3. In an especially preferred embodiment from 100 to 200 litres, especially 150 litres, of a 2 N acid are added per mole of perylene hydrazide imide I. The reaction product usually obtained after acidification may be washed, for example with water, a water-soluble alcohol, preferably methanol or ethanol, especially methanol, or a water/alcohol mixture, such as water/methanol, and then dried, for example for from 2 to 16 hours at a temperature in the range of from 50 to 150° C. or, if carried out under reduced pressure, in a correspondingly lower temperature range. In an especially preferred embodiment the reaction product is purified by means of chromatography, for example using aluminium oxide or silica gel as support and preferably chloroform or a chloroform/$C_1$–$C_6$alkanol mixture, especially chloroform/n-butanol, as eluant.

A further process for the preparation of the perylene derivatives IIIa comprises the hydrazinolysis of a perylene-3,4:9,10-tetracarboxylic acid 3,4-anhydride-9,10-imide V with hydrazine or a salt thereof, especially hydrazinium sulfate. Preferably, the reaction is carried out analogously to the above-described reaction of the imides V with hydrazine to form the hydrazide imides I. More especially the components are used in stoichiometric amounts in order to facilitate working up. An excess usually results in the formation of hydrazide imides I, while less than the stoichiometric amount of hydrazine or a hydrazine-yielding compound can be tolerated and as a rule only reduces the yield.

A further process for the preparation of the perylene derivatives IIIa comprises the hydrazinolysis of perylene-3,4:9,10-tetracarboxylic acid bisimides of the general formula VI

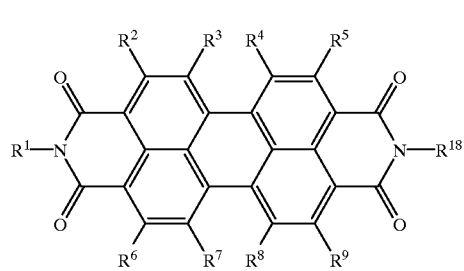

(VI)

wherein $R^{18}$ has the same meaning as $R^1$ but $R^1$ and $R^{18}$ need not necessarily carry the same substituents simultaneously.

Preferred bisimides VI are the compounds already defined hereinabove that have a "swallow-tail structure", the compound VIa being especially preferred.

The reaction is usually carried out by selecting a molar ratio of hydrazine to compound VI in the range of from 100:1 to 1:1, preferably from 70:1 to 30:1, especially from 60:1 to 40:1. Instead of hydrazine it is possible to use a hydrazine-yielding compound, such as hydrazine hydrate or a salt of hydrazine with hydrochloric acid or sulfuric acid, preferably the salt of sulfuric acid.

The reaction temperature is usually chosen in a range of from 100 to 200° C., preferably from 130 to 150° C., and the reaction pressure chosen is advantageously atmospheric pressure. In a preferred embodiment the hydrazinolysis is carried out in a solvent, such as a basic organic solvent, preferably a nitrogen-containing heterocycle, such as imidazole, quinoline, pyridine or picoline, especially imidazole, or a glycol, such as ethylene glycol or diethylene glycol, or a tertiary alcohol, preferably tert-butyl alcohol.

The reaction time is generally from 0.5 to 10 hours, preferably from 1 to 2 hours. Working up is usually carried out by treating the reaction mixture with excess water, generally for from 1 to 4 hours. If desired, the resulting product can be freed of solvents, for example by filtration, washed with water and dried, for example, at a temperature in the range of from 90 to 140° C., and also further purified by chromatography.

It has also been found that the bifluorophoric perylene-3,4:9,10-tetracarboxylic acid bisimides IIIa according to the invention can be obtained by reacting the formamides of formula Ia

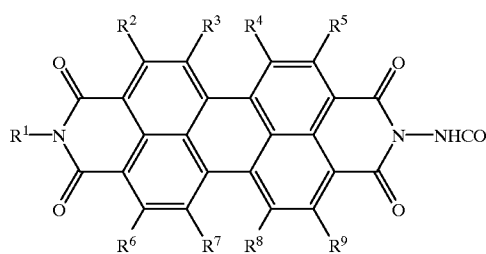

(Ia)

with N-substituted perylene-3,4:9,10-tetracarboxylic acid 3,4-anhydride-9,10-imides V.

The reaction is usually carried out at a temperature in the range of from 100 to 250° C., preferably from 140 to 200° C. The reaction time is advantageously chosen in dependence on the reaction temperature selected, and is preferably in the range of from 1 to 8 hours, especially from 3 to 6 hours.

The molar ratio of perylene anhydride imide V to formamide Ia is preferably chosen in the range of from 1.25:1 to 0.8:1, especially from 1.1:1 to 0.9:1, and more especially is stoichiometric.

The reaction is usually carried out in the presence of a solvent, preferably a nitrogen-containing heterocycle, such as pyridine, picoline, lutidine or imidazole, especially imidazole, a carboxylic acid, such as acetic acid, or a glycol, such as ethylene glycol. The amount of solvent is generally chosen in the range of from 0.5 to 20 kg of solvent per mole of perylene anhydride imide V.

In a preferred embodiment, the resulting reaction mixture, which may still be at an elevated temperature, is diluted with a water-soluble alcohol, such as a $C_1$–$C_4$alkanol, preferably methanol, ethanol, n-propanol, isopropanol or n-butanol, especially ethanol, in an amount generally of from 10 to 500 litres, preferably from 40 to 60 litres, especially 50 litres, per mole of perylene anhydride imide V. The diluted reaction mixture is then customarily acidified, advantageously with a mineral acid, such as hydrochloric acid, nitric acid, sulfuric acid, or alternatively phosphoric acid, until the pH of the reaction mixture is less than 7, preferably less than 6, especially less than 3. The reaction product usually obtained after acidification may be washed, for example with water, a water-soluble alcohol, preferably methanol or ethanol, especially methanol, or a water/alcohol mixture, such as water/methanol, and then dried, for example for from 2 to 16 hours at a temperature in the range of from 50 to 150° C. or, if carried out under reduced pressure, in a correspondingly lower temperature range. In an especially preferred embodiment the reaction product is purified by means of chromatography, for example using aluminium oxide or silica gel as support and preferably chloroform or a chloroform/$C_1$–$C_6$alkanol mixture, especially chloroform/n-butanol, as eluant.

The formamides Ia are obtained preferably by reacting perylene hydrazide imides I with formic acid, especially anhydrous formic acid, or a formic acid derivative, especially a formic acid $C_1$–$C_4$alkyl or $C_6$–$C_{10}$aryl ester, such as methyl formate, ethyl formate, n-propyl formate, n-butyl formate, phenyl formate, or a formic acid mixed anhydride, such as formyl fluoride, formyl acetate or formyl benzoate, anhydrous formic acid being especially preferred.

The amount of formic acid or the appropriate abovementioned derivative is generally chosen in the range of from 2 to 500 litres, preferably from 40 to 60 litres, per mole of perylene hydrazide imide I.

The reaction temperatures are usually chosen in the range of from 50 to 200° C., preferably from 60 to 90° C. The reaction times are generally in the range of from 3 to 20 hours, preferably from 6 to 18 hours.

If desired, the reaction may also be carried out in a solvent, such as a nitrogen-containing heterocycle, such as pyridine, picoline, lutidine or imidazole, preferably imidazole, a carboxylic acid, such as acetic acid, or a glycol, such as ethylene glycol, the amount of solvent usually being chosen in the range of from 0.5 to 20 kg, especially from 2 to 10 kg, per mole of perylene hydrazide imide I, 5 kg per mole of perylene hydrazide imide I being preferred.

The reaction mixture can usually be worked up by washing the precipitate generally obtained and subsequently drying. If desired, the desired product can be purified, that is to say isolated, by chromatography.

A further embodiment accordingly concerns formamides of formula Ia.

The trifluorophoric perylene-3,4:9,10-tetracarboxylic acid bisimides IIIb accoding to the invention are obtained preferably by reacting perylene hydrazide imides I with perylene-3,4:9,10-tetracarboxylic acid bisanhydrides (VII)

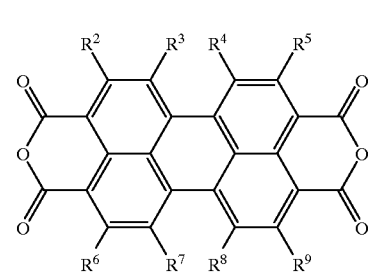

(VII)

Unsubstituted perylene-3,4:9,10-tetracarboxylic acid bisanhydride is known. The corresponding substituted derivatives may be derived from the unsubstituted compound according to methods known per se. For example, the preparation of 1,7-disubstituted compounds is described in WO 96/22331.

In a preferred embodiment, the reaction is carried out in the presence of a basic organic solvent, preferably a nitrogen-containing heterocycle, such as imidazole, quinoline, pyridine or picoline, especially imidazole, or a glycol, such as ethylene glycol or diethylene glycol.

In an especially preferred embodiment the reaction is carried out in the presence of a zinc compound, especially a water-soluble zinc salt, such as zinc acetate or zinc chloride, preferably zinc acetate. Usually, the molar ratio of perylene hydrazide imide I to zinc compound is chosen in the range of from 10:1 to 1:1, and is preferably 2:1.

Preferably, the reaction is carried out at reaction temperatures in the range of from 80 to 200° C., especially from 100 to 150° C.

Observations made hitherto have shown that the success of the reaction is not dependent on the choice of pressure range. For the sake of simplicity, the reaction is usually carried out under atmospheric pressure, although lower pressures of down to 10 kPa or pressures up to 10 MPa may be chosen. Depending on the chosen reaction temperature, the reaction times are preferably chosen in the range of from 30 minutes to 1 hour.

The molar ratio of perylene hydrazide imide I to perylene-3,4:9,10-tetracarboxylic acid bisanhydride VII is usually chosen in the range of from 1.25:1 to 0.8:1, preferably from 1.1:1 to 0.9:1; more especially a stoichiometric molar ratio is chosen if it is desired to maximise the yield and to minimise the time and work required for working up.

The amount of solvent is generally chosen in the range of from 0.5 to 20 kg, especially from 2 to 10 l, per mole of perylene hydrazide imide I, 5 l per mole of perylene hydrazide imide I being preferred.

Generally, the reaction time is chosen in the range of from 0.5 to 4 hours, preferably from 1.5 to 2 hours.

In a preferred embodiment, the reaction mixture, which may still be at an elevated temperature, is diluted with a water-soluble alcohol, such as a $C_1$–$C_4$alkanol, preferably methanol, ethanol, n-propanol, isopropanol or n-butanol, especially ethanol, in an amount generally in a range of from 10 to 500 litres, preferably from 40 to 60 litres, per mole of perylene anhydride imide I, with 50 litres being especially preferred. The diluted reaction mixture is then customarily acidified, advantageously with a mineral acid, such as hydrochloric acid, nitric acid, sulfuric acid, or alternatively phosphoric acid, until the pH of the reaction mixture is in the region of less than 7, preferably less than 6, especially less than 3. The reaction product usually obtained after acidification may be washed, for example with water, a water-soluble alcohol, preferably methanol or ethanol, especially methanol, or a water/alcohol mixture, such as water/methanol, and then dried, for example for from 2 to 16 hours at a temperature in the range of from 50 to 150° C. or, if carried out under reduced pressure, in a correspondingly lower temperature range. In an especially preferred embodiment the reaction product is purified by means of chromatography, for example using aluminium oxide or silica gel as support and preferably chloroform or a chloroform/$C_1$–$C_6$alkanol mixture, such as chloroform/methanol or chloroform/ethanol, especially chloroform/ethanol, as eluant.

If desired, further purification may be carried out by chromatography using silica gel as support material and toluene/carboxylic acid, especially toluene/glacial acetic acid, as first eluant, and a chloroform/$C_1$–$C_6$alkanol mixture, especially chloroform/n-butanol, as the following, second eluant.

A further preferred embodiment concerns the synthesis of the trifluorophoric perylene derivatives IIIb by reaction of the peryleneformamides Ia with perylene-3,4:9,10-bisanhydrides VII. The advantage of that embodiment is that the reaction can be carried out without zinc-containing compounds.

The reaction is usually carried out at a temperature in the range of from 100 to 250° C., preferably from 140 to 200° C. The reaction time is advantageously chosen in dependence on the chosen reaction temperature, preferably in the range of from 1 to 8 hours, especially from 3 to 6 hours.

The molar ratio of peryleneformamide Ia to bisanhydride VII is preferably chosen in the range of from 2.5:1 to 1.6:1, especially from 2.2:1 to 1.8:1, and more especially is stoichiometric.

The reaction is usually carried out in the presence of a solvent, preferably a nitrogen-containing heterocycle, such as pyridine, picoline, lutidine or imidazole, especially imidazole, a carboxylic acid, such as acetic acid, or a glycol, such as ethylene glycol.

The amount of solvent is generally chosen in the range of from 0.5 to 20 kg, preferably from 4 to 6 kg, of solvent per mole of peryleneformamide Ia, with 5 kg being especially preferred.

In a preferred embodiment, the resulting reaction mixture, which may still be at an elevated temperature, is diluted with a water-soluble alcohol, such as a $C_1$–$C_4$alkanol, preferably methanol, ethanol, n-propanol, isopropanol or n-butanol, especially ethanol, in an amount generally of from 10 to 500 litres, preferably from 40 to 60 litres, especially 50 litres, per mole of peryleneformamide Ia. The diluted reaction mixture is then customarily acidified, advantageously with a mineral acid, such as hydrochloric acid, nitric acid, sulfuric acid, or alternatively phosphoric acid, until the pH of the reaction mixture is in the region of less than 7, preferably less than 6, especially less than 3. The reaction product usually obtained after acidification may be washed, for example with water, a water-soluble alcohol, preferably methanol or ethanol, especially methanol, or a water/alcohol mixture, such as water/-methanol, and then dried, for example for from 2 to 16 hours at a temperature in the range of from 50 to 150° C. or, if carried out under reduced pressure, in a correspondingly lower temperature range. In an especially preferred embodiment the reaction product is purified by means of chromatography, for example using aluminium oxide or silica gel as support and preferably chloroform or a chloroform/$C_1$–$C_6$alkanol mixture, especially chloroform/n-butanol, as eluant.

FIG. 1 shows the UV/visible spectra of monofluorophoric perylene derivatives (curve with the lowest maximum extinction coefficient), and of the bifluorophoric (curve with the middle maximum extinction coefficient) and trifluorophoric (curve with the highest maximum extinction coefficient) perylene derivatives IIIa and IIIb according to the invention.

The UV/visible absorption spectra of the bifluorophoric dyes are usually bathochrome-shifted compared with the absorption spectra of the monochromophoric perylene dyes, that is to say dyes having only one perylene unit.

This is clearly shown in the example of the N-substituted mono-, di- and tri-perylene derivatives N-(1-nonyl-decyl)-perylene-3,4:9,10-tetracarboxylic acid 3,4-hydrazide-9,10-imide (A), $N^2,N^2$-bis(1-nonyl-decyl)-$N^1,N^1$-bis(perylene-3,4:9,10-bis(dicarboximide)) (B), and bis[(N-(1-nonyl-decyl)-perylene-3,4:9,10-bis(dicarboximide)-N'-yl]-perylene-3,4:9,10-bis(dicarboximide) (C) (see FIG. 1): the colour coordinates of (A) are: x=0.3474, y=0.2948, z=0.3579 for $T_{max}$=0.1, 3°, standard illumination C). In the case of the bifluorophoric dye (B), on the one hand the extinction coefficient is greater, and on the other hand the maximum is shifted by 10 nm in the direction of longer wavelength. That tendency continues in the trifluorophoric dye (C): the wavelength of the maximum is bathochrome-shifted by a further 2 nm (537 nm), and the extinction coefficient has been increased again compared with (B) (colour coordinates of (C): x=0.3474, y=0.2948, z=0.3667 for $T_{max}$=0.1, 2°, standard illumination C; see FIG. 1, curve with the greatest extinction coefficient).

Hence, especially the unsubstituted perylene bisimide chromophore can be used also for applications in the longer wave spectral range.

It has also been found that trifluorophoric perylene derivatives IIIb aggregate in concentrated solution. As a result, the UV/visible spectra are usually changed in characteristic manner (red-violet colour shade). Generally, the fluorescence is also simultaneously shifted into the longer wavelength range (e.g. 630 nm in the case of (C)).

In the following, dilute dye solutions in which there is no aggregation are taken as a starting point.

It has also been found that the extinction coefficients of the compounds according to the invention are generally unexpectedly increased disproportionately compared with monofluorophoric perylenes. This may be of particular interest especially for practical applications. While in the case of the bifluorophoric dyes extinction coefficients usually of up to 240 000 are obtained, which are considerably more than twice the value of the extinction coefficients of the monofluorophoric perylene dyes (85 000–95 000), those coefficients are far exceeded by the extinction coefficients of the trichromophoric dyes, which are generally up to 420 000, a figure higher by 135 000 than three times the value of the coefficients of monofluorophoric perylene dyes.

The very strong extinction coefficients of the perylene derivatives IIIa and IIIb according to the invention usually relate especially to the longest wave absorption band, while the shorter waved "appear normal" and have an approximately threefold extinction value. The extra increase of the extinction coefficients thus has the character of an additional absorption in the spectral range of the normal absorption spectrum. This "superimposed" additional band in addition has a lower half-width value than the customary long wavelength bands. This is valuable for practical purposes, since especially brilliant colour shades can be achieved as a result.

The bifluorophoric and trifluorophoric colourants usually have a pronounced fluorescence in solution (fluorescence quantum yield of almost 100%), which is likewise usually shifted to longer wavelengths and consequently can be differentiated from the fluorescence of perylene dyes. This is of particular interest for practical applications. The fluorescence spectra of the bi- and tri-fluorophoric perylene derivatives IIIa and IIIb are usually structured like those of the corresponding monofluorophoric perylene derivatives. In addition to the fluorescence in solution, the perylene derivatives III according to the invention generally have a strong solids fluorescence, making them valuable especially for labelling purposes. The perylene derivatives I and II according to the invention and possible metal complexes thereof are suitable for use as colourants, especially as pigments and dyes, according to methods that are generally in each case known per se, preferably (a) for the melt colouration of polymers, it being possible to use as polymers polyvinyl chloride, cellulose acetate, polycarbonates, polyamides, polyurethanes, polyimides, polybenzimidazoles, melamine resins, silicones, polyesters, polyethers, polystyrene, polymethyl methacrylate, polyethylene, polypropylene, polyvinyl acetate, polyacrylonitrile, polybutadiene, polychlorobutadiene or polyisoprene, and the copolymers of the mentioned monomers;

(b) as vat dyes or mordant dyes, for example for dyeing natural materials and, especially, paper, wood, straw, leather, animal skins or natural fibre materials, such as cotton, wool, silk, jute, sisal, hemp, flax or animal hair (e.g. horsehair) and their conversion products, such as viscose fibres, nitrocellulose or copper rayon (rayon), preferred salts for mordant dyeing being aluminium, chromium and iron salts;

(c) in the preparation of paints, lacquers, especially automotive lacquers, coating compositions, paper dyes, printing inks, inks, especially for use in ink-jet printers, preferably in homogeneous solution as fluorescent inks, and for drawing and writing purposes, and in electrophotography, for example for dry-copying systems (Xerox process) and laser printers;

(d) for security-marking purposes, such as for cheques, cheque cards, bank notes, coupons, documents, identity papers and the like, where a special, unmistakable colour impression is to be achieved;

(e) as an additive to colourants, such as pigments and dyes, in which a particular shade of colour is to be achieved; especially luminous shades are preferred;

(f) for labelling objects for the purpose of mechanically recognising those objects by means of fluorescence, preference being given to the mechanical recognition of objects for sorting, for example for the recycling of plastics, with alpha-numerical printing or bar codes preferably being used;

(g) for frequency conversion of light, for example in order to make longer-wave, visible light from short-wave light, or for frequency doubling or frequency tripling of laser light in nonlinear optics;

(h) for the production of passive display elements for a wide variety of display, information and labelling purposes, for example passive display elements, road signs and traffic signals, such as traffic lights;

(i) as starting material for supraconducting organic materials (via $\pi$-$\pi$ interactions, after doping with, for example, iodine there is usually obtained an intermediate charge delocalisation);

(j) for solids fluorescent labelling;

(k) for decorative and artistic purposes;

(l) for tracer purposes, for example in biochemistry, medicine, technology and natural science, it being possible to link the colourants according to the invention covalently to substrates or via secondary valences, such as hydrogen bonds or hydrophobic interactions (adsorption);

(m) as fluorescent dyes in highly sensitive detection methods (see C. Aubert, J. Fünfschilling, I. Zschokke-Gränacher and H. Langhals, Z. Analyt. Chem. 1985, 320, 361), especially as fluorescent dyes in scintillators;

(n) as dyes or fluorescent dyes in optical light-collecting systems, in fluorescent solar collectors (see H. Langhals, Nachr. Chem. Tech. Lab. 1980, 28, 716), in fluorescence-activated displays (see W. Greubel and G. Baur, Elektronik 1977, 26, 6), in cold-light sources for light-induced polymerisation in the preparation of plastics, for materials' testing, for example in the manufacture of semiconductor circuitry, for the investigation of microstructures of integrated semiconductor components, in photoconductors, in photographic processes, in display, illumination or image-converting systems in which excitation is effected by means of electrons, ions or UV radiation, for example in fluorescent displays, Braun tubes or in fluorescent tubes, as part of an integrated semiconductor circuit, which contain dyes as such or in conjunction with other semiconductors, for example in the form of an epitaxy, in chemiluminescent systems, for example in chemiluminescent light rods, in luminescent immunoassays or other luminescent detection methods, as highlighter inks, especially for lending visual prominence to writing and drawings or other graphic products, for identifying signs and other objects where a particular visual colour impression is to be achieved, in dye lasers, preferably as fluorescent dyes for producing laser beams and as Q-switches;

(o) optical storage media and (p) as rheology improvers;

The perylene derivatives I according to the invention are readily soluble and readily available amino derivatives of excellent suitability as reagents for the qualitative, semi-quantitative and quantitative detection of carbonyl compounds, protonic acids and acylating agents. The perylene hydrazones II and III according to the invention provide further, very strongly fluorescent perylene derivatives.

EXAMPLES (A) Preparation of the Perylene Hydrazide Imides I

Example 1

General procedure for the synthesis of N-(alkyl)-perylene-3,4:9,10-tetracarboxylic acid 3,4-hydrazide-9,10-imides and N-(aryl)-perylene-3,4:9,10-tetracarboxylic acid 3,4-hydrazide-9,10-imides 1 mmol of N-(alkyl)-perylene-3,4:9,10-tetracarboxylic acid 3,4-anhydride-9,10-imide is dissolved homogeneously in approximately 2 g of imidazole at an oil bath temperature of 130° C. Hydrazine hydrate (100 percent) is then added in excess (approximately from 2 to 10 mmol, ratio not critical), and the starting materials are reacted for from 30 to 60 minutes. Ethanol is carefully added to the still-warm flask contents, and the mixture is transferred, with repeated rinsing out, into 200 ml of 2 N hydrochloric acid, and stirred for from 1 to 2 hours at room temperature. The precipitated crude product is separated off using a frit, washed with methanol/water and dried at 100° C. for approximately 12 h in a drying cabinet. Purification of the dye is carried out by chromatography over both an aluminium oxide column and a silica gel column, each with chloroform/ethanol (20+1) as eluant. The purity of the fractions is monitored by silica gel/chloroform/ethanol (10+1), in the course of which the product can be separated off in the form of a dark-red, non-fluorescent band. The product should preferably not be left on a chromatography column overnight since decomposition may generally occur in such a case. If required, the dyes can be further purified by extractive recrystallisation (see H. Langhals, Chem. Ber. 118 (1985) 4641) from cyclohexane. During the procedure, which takes several days, a small amount of an unidentified fluorescent decomposition product may be formed, but this does not usually interfere with the analysis. For the synthesis of azomethines and the detection of carbonyl compounds, however, it is preferable to use thin-layer-chromatographically homogeneous non-fluorescent N-(alkyl)-perylene-3,4:9,10-tetracarboxylic acid 3,4-hydrazide-9,10-imides. This procedure is also suitable for the preparation of N-(aryl)-perylene-3,4:9,10-tetracarboxylic acid 3,4-anhydride-9,10-imides.

Example 2

N-(1-Butyl-pentyl)-perylene-3,4:9,10-tetracarboxylic Acid 3,4-hydrazide-9,10-imide (2a)

1.3 g (2.5 mmol) of N-(1-butyl-pentyl)-perylene-3,4:9,10-tetracarboxylic acid 3,4-anhydride-9,10-imide, 200 mg (4.0 mmol) of hydrazine hydrate and 4 g of imidazole are reacted in accordance with the general procedure of Example 1. Reaction time 1 h. For the elemental analysis, 100 mg of the dye are subjected to extractive recrystallisation from cyclohexane (see H. Langhals, Chem. Ber. 118 (1985) 4641). Yield 820 mg (61%), melting point >350° C. —$R_f$(silica gel/CHCl$_3$/ethanol (10+1))=0.70.—$R_f$(silica gel/CHCl$_3$/ethanol (20+1))=0.59. —IR (KBr): v=3370 cm$^{-1}$ (w), 3330(w), 3075(w), 2957(m), 2929(m), 2868 (m), 1698 (s), 1656 (s), 1595 (s), 1577 (m), 1555 (w sh), 1506 (w), 1465 (w), 1456 (w), 1436 (w), 1404 (s), 1378 (m), 1348 (s), 1302 (m), 1255 (m), 1195 (w), 1173 (w), 1101 (m), 965 (m br.), 852 (m), 809 (s), 795 (w), 751 (w), 739 (m). —$^1$H-NMR (CDCl$_3$): δ=0.82 (t, 6H, 2 CH$_3$), 1.32 (m$_c$, 8 H, 4 CH$_2$), 1.89 (m$_c$, 2 H, 2 α-CH$_2$), 2.25 (m$_c$, 2 H, 2 α-CH$_2$), 5.16 (m$_c$, 1 H, NCH), 5.52 (s, 2 H, NH$_2$), 8.47 (d, $^3$J=8.0 Hz, 2 H, perylene), 8.52 (d, $^3$J=8.1 Hz, 2 H, perylene), 8.57 (d, $^3$J=7.9 Hz, 2 H, perylene), 8.63 (d br., $^3$J=7.7 Hz, 2 H, perylene). —$^{13}$C-NMR (CDCl$_3$): δ=14.04, 22.63, 29.16, 32.09, 54.83, 122.16, 122.90, 123.35, 126.01, 126.35, 127.90, 129.39, 131.53, 133.89, 135.05, 159.95. —UV (CHCl$_3$): $\lambda_{max}$ (ε)= 528 nm (78 700), 491 (48 300), 460 (17 800). —Fluorescence: $\lambda_{max}$=535 nm, 574 (very weak fluorescence, which probably originates from an impurity and is observed only in dilute solution) —MS (70 eV); m/z (%): 532 (14), 531 (40)[M$^+$], 514 (5) [M$^+$—OH], 418 (4), 407 (13), 406 (53), 405 (100) [M$^+$—C$_9$H$_{18}$], 390 (6), 388 (4), 377 (7), 376 (25), 84 (5), 82 (8), 55 (4). —C$_{33}$H$_{29}$N$_3$O$_4$ (531.6): calculated C 74.56, H 5.50, N 7.90; found C 73.93, H 5.50, N 7.87.

Example 3

N-(1-Hexyl-heptyl)-perylene-3,4:9,10-tetracarboxylic acid 3,4-hydrazide-9,10-imide (2b)

2.0 g (3.5 mmol) of N-(1-hexyl-heptyl)-perylene-3,4:9,10-tetracarboxylic acid 3,4-anhydride-9,10-imide, 350 mg (6.9 mmol) of hydrazine hydrate and 7 g of imidazole are reacted in accordance with the general procedure (reaction time 1 h). For the elemental analysis, 150 mg of the dye are subjected to extractive recrystallisation from cyclohexane. Yield 830 mg (40%), melting point 332–334° C. —$R_f$(silica gel/CHCl$_3$/ethanol (10+1))=0.80. —$R_f$ (silica gel/CHCl$_3$/ethanol (20+1))=0.61. —IR (KBr): v=2956 cm$^{-1}$ (m), 2927 (s), 2857 (m), 1699 (s), 1658 (s), 1595 (s), 1578 (m), 1556 (w), 1510 (w), 1458 (w), 1436 (w), 1404 (s), 1379 (w), 1350 (s),1303 (w), 1255 (s), 1200 (w), 1174 (w), 1130 (w), 1110 (w), 980 (w), 852 (w), 805 (s), 800 (w), 739 (m). —$^1$H-NMR (CDCl$_3$): δ=0.81 (t, 6 H, 2 CH$_3$), 1.28 (m$_c$, 16 H, 8 CH$_2$),1.88 (m$_c$, 2 H, 2 α-CH$_2$), 2.24 (m$_c$, 2 H, 2 α-CH$_2$),5.16 (m$_c$, 1 H, NCH), 5.48 (s, 2 H, NH$_2$), 8.33 (d, $^3$J=8.2 Hz, 2 H, perylene), 8.41 (d, $^3$J=8.2 Hz, 2 H, perylene), 8.45 (d, $^3$J=8.0 Hz, 2 H, perylene), 8.57 (d br., $^3$J=7.6 Hz, 2 H, perylene). —$^{13}$C-NMR (CDCl$_3$): δ=14.03, 22.58, 26.97, 29.23, 31.76, 32.38, 54.91, 122.07, 122.80, 123.26, 125.90, 126.21, 127.78, 129.32, 131.40, 133.74, 134.91, 159.83. —UV(CHCl$_3$): $\lambda_{max}$(ε)=527 nm (80 000), 491 (48 600), 460 (17 800). —Fluorescence: $\lambda_{max}$=535 nm, 575. Very weak fluorescence, which probably originates from an impurity and is observed only in dilute solution. —MS (70 eV); m/z (%): 588 (10), 587 (25) [M$^+$], 570 (5) [M$^+$—OH], 418 (4), 407 (14), 406 (53), 405 (100) [M$^+$—C$_{13}$H$_{26}$], 390 (2), 388 (6), 377 (6), 376 (22), 360 (4). —C$_{37}$H$_{37}$N$_3$O$_4$ (587.7): calculated C 75.61, H 6.35, N 7.15; found C 75.32, H 6.24, N 7.01.

Example 4

N-(1-Heptyl-octyl)-perylene-3,4:9,10-tetracarboxylic Acid 3,4-hydrazide-9,10-imide (2c)

1.30 g (2.16 mmol) of N-(1-heptyl-octyl)-perylene-3,4:9, 10-tetracarboxylic acid 3,4-anhydride-9,10-imide and 220 mg (4.40 mmol) of hydrazine hydrate in 5 g of imidazole are reacted in accordance with the general procedure. Reaction time 1 h. Yield 720 mg (55%), melting point 307–308° C. —$R_f$ (silica gel/CHCl$_3$/ethanol (10+1))=0.74. —$R_f$ (silica gel/-CHCl$_3$/ethanol (20+1))=0.56. —IR (KBr): v=2955 cm$^{-1}$ (m), 2926 (s), 2855 (m), 1700 (s), 1658 (s), 1616 (w), 1595 (s), 1579 (m), 1508 (w), 1465 (w), 1457 (w), 1438 (w), 1404 (s), 1378 (w), 1349 (s br.), 1302 (w), 1255 (s), 1200 (w), 1173 (m), 1125 (w), 1115 (w), 970 (m br.), 855 (m), 809 (s), 800 (w), 795 (w), 739 (s). —$^1$H-NMR (CDCl$_3$): δ=0.81 (t, 6 H, 2 CH$_3$), 1.28 (m$_c$, 20 H, 10 CH$_2$), 1.89 (m$_c$, 2 H, 2

α-CH$_2$), 2.25 (m$_c$, 2 H, 2 α-CH$_2$), 5.16 (m$_c$, 1 H, NCH), 5.46 (s, 2 H, NH$_2$), 8.27 (d, $^3$J=8.3 Hz, 2 H, perylene), 8.35 (d, $^3$J=8.1 Hz, 2 H, perylene), 8.38 (d, $^3$J=8.1 Hz, 2 H, perylene), 8.55 (d br., $^3$J=7.7 Hz, 2 H, perylene). —$^{13}$C-NMR (CDCl$_3$): δ=14.05, 22.60, 27.03, 29.23, 29.53, 31.81, 32.36, 54.92, 121.93, 122.66, 123.14, 125.70, 125.97, 127.57, 129.20, 131.19, 133.50, 134.66, 159.65. —UV (CHCl$_3$): λ$_{max}$ (ϵ)=528 nm (81 500), 492 (49 200), 460 (18 100). —Fluorescence: λ$_{max}$=536 nm, 575. Very weak fluorescence, which probably originates from an impurity and is observed only in dilute solution. —MS (70 eV); m/z (%): 616 (11), 615 (26) [M$^+$], 598 (5) [M$^+$—OH], 430 (4), 418 (3), 407 (15), 406 (57), 405 (100) [M$^+$—C$_{15}$H$_{30}$], 391 (4), 390 (7), 377 (9), 376 (34), 360 (6), 331 (5), 275 (4), 249 (4), 124 (4), 123 (4), 69 (5), 55 (5). —C$_{39}$H$_{41}$N$_3$O$_4$ (615.8): calculated C 76.07, H 6.71, N 6.82; found C 76.48, H 6.74, N 6.89. (The dimeric dye N$^2$,N$^2$-bis(1-heptyl-octyl)-N$^1$,N$^1$-bis(perylene-3,4:9,10-bis(dicarboximide)) can be synthesised as an analytically pure derivative).

Example 5

N-(1-Octyl-nonyl)-perylene-3,4:9,10-tetracarboxylic Acid 3,4-hydrazide-9,10-imide (2d)

1.50 g (2.38 mmol) of N-(1-octyl-nonyl)-perylene-3,4:9,10-tetracarboxylic acid 3,4-anhydride-9,10-imide and 130 mg (2.60 mmol) of hydrazine hydrate in 6 g of imidazole are reacted in accordance with the general procedure (reaction time 1 h). For the elemental analysis, 100 mg of the dye are subjected to extractive recrystallisation from cyclohexane. Yield 700 mg (46%), melting point 286–287° C. —R$_f$ (silica gel/CHCl$_3$/ethanol (10+1))=0.80. —R$_f$ (silica gel/CHCl$_3$/ethanol (20+1))=0.55. —IR (KBr): v=2955 cm$^{-1}$ (m), 2924 (s), 2854 (s), 1698 (s), 1658 (s), 1595 (s), 1578 (s), 1506 (w), 1485 (w), 1457 (m), 1436 (m), 1404 (s), 1378 (m), 1348 (s), 1302 (m), 1256 (s), 1200 (w), 1173 (m), 1128 (w), 1115 (w), 975 (m), 852 (w), 809 (s), 798 (w), 751 (w), 739 (s). —$^1$H-NMR (CDCl$_3$): δ=0.81 (t, 6 H, 2 CH$_3$), 1.30 (m$_c$, 24 H, 12 CH$_2$), 1.89 (m$_c$, 2 H, 2 α-CH$_2$), 2.25 (m$_c$, 2 H, 2 α-CH$_2$), 5.16 (m$_c$, 1 H, NCH), 5.49 (s, 2 H, NH$_2$), 8.35 (d, $^3$J=8.1 Hz, 2 H, perylene), 8.42 (d, $^3$J=8.3 Hz, 2 H, perylene), 8.46 (d, $^3$J=7.9 Hz, 2 H, perylene), 8.57 (d br., 2 H, perylene). —$^{13}$C-NMR (CDCl$_3$): δ=14.06, 22.62, 27.02, 29.25, 29.51, 29.57, 31.83, 32.37, 54.92, 122.01, 122.74, 123.20, 125.81, 126.10, 127.69, 129.27, 131.30, 133.62, 134.80, 159.75. —UV(CHCl$_3$): λ$_{max}$ (ϵ)=528 nm (80 600), 492 (48 600), 460 (17 400). —Fluorescence (CHCl$_3$): λ$_{max}$=539 nm, 570. Very weak fluorescence, which probably originates from an impurity and is observed only in dilute solution. —MS (70 eV); m/z (%): 644 (13), 643 (27) [M$^+$], 626 (5) [M$^+$—OH], 430 (4), 418 (3), 407 (16), 406 (58), 405 (100) [M$^+$—C$_{17}$H$_{34}$], 391 (5), 390 (7), 388 (6), 377 (6), 376 (23), 360 (4), 331 (3). —C$_{41}$H$_{45}$N$_3$O$_4$ (643.8): calculated C 76.49, H 7.05, N 6.53; found C 76.51, H 7.08, N 6.60.

Example 6

N-(1-Nonyl-decyl)-perylene-3,4:9,10-tetracarboxylic Acid 3,4-hydrazide-9,10-imide (2e)

1.33 g (2.02 mmol) of N-(1-nonyl-decyl)-perylene-3,4:9,10-tetracarboxylic acid 3,4-anhydride-9,10-imide and 320 mg (6.40 mmol) of hydrazine hydrate in 5 g of imidazole are reacted in accordance with the general procedure (reaction time 2 h). Yield 800 mg (60%), melting point 268–271° C. —R$_f$ (silica ge/CHCl$_3$/ethanol (10+1))=0.76. —R$_f$ (silica gel/—CHCl$_3$/ethanol (20+1))=0.51. —R$_f$ (silica gel/CHCl$_3$/1-butanol (40+1))=0.28. —IR (KBr): v=2955 cm$^{-1}$ (m), 2925 (s), 2854 (m), 1698 (s), 1658 (s), 1617 (w), 1595 (s), 1577 (m), 1507 (w), 1468 (w), 1457 (w), 1437 (w), 1404 (m), 1378 (w), 1349 (s), 1302 (w), 1256 (m), 1202 (w), 1173 (m), 1055 (w), 1040 (w), 975 (w br.), 855 (w), 809 (s), 800 (w), 739 (m). —$^1$H-NMR (CDCl$_3$): δ=0.80 (t, 6 H, 2 CH$_3$), 1.28 (m$_c$, 28 H, 14 CH$_2$), 1.89 (m$_c$, 2 H, 2 α-CH$_2$), 2.23 (m$_c$, 2 H, 2 α-CH$_2$), 5.16 (m$_c$, 1 H, NCH), 5.49 (s, 2 H, NH$_2$), 8.33 (d, $^3$J=8.1 Hz, 2 H, perylene), 8.41 (d, $^3$J=8.1 Hz, 2 H, perylene), 8.45 (d, $^3$J=7.7 Hz, 2 H, perylene), 8.58 (s, br., 2 H, perylene). —$^{13}$C-NMR (CDCl$_3$): δ=14.49, 23.05, 27.44, 29.68, 29.98, 32.27, 32.78, 55.34, 122.43, 123.15, 123.62, 126.21, 126.51, 128.10, 129.68, 131.72, 134.03, 135.20, 160.17. —UV (CHCl$_3$): λ$_{max}$ (ϵ)=528 nm (81 000), 492 (49 500), 460 (18 500). —Fluorescence: λ$_{max}$=536 nm, 574. Very weak fluorescence, which probably originates from an impurity and is observed only in dilute solution. —MS (70 eV); m/z (%): 673 (3), 672 (13), 671 (29) [M$^+$], 654 (5), [M$^+$—OH], 418 (3), 408 (4), 407 (17), 406 (62), 405 (100) [M$^+$—C$_{19}$H$_{38}$], 391 (4), 390 (8), 389 (3), 388 (9), 377 (10), 376 (33), 360 (6), 331 (4), 124 (5), 82 (5), 55 (5). —C$_{43}$H$_{49}$N$_3$O$_4$: calculated 671.3723; found 671.3717 (MS). —C$_{43}$H$_{49}$N$_3$O$_4$ (671.9): calculated C 76.87, H 7.35, N 6.25; found C 76.80, H 7.25, N 6.32.

Example 7

N-(2,5-Di-tert-butyl-phenyl)-perylene-3,4:9,10-tetracarboxylic acid 3,4-hydrazide-9,10-imide (2f)

150 mg (0.26 mmol) of N-(2,5-di-tert-butyl-phenyl)-perylene-3,4:9,10-tetracarboxylic acid 3,4-anhydride-9,10-imide and 50 mg (1.00 mmol) of hydrazine hydrate in 2 g of imidazole are reacted in accordance with the general procedure (reaction time 30 min). Yield 40 mg (26%), melting point>350° C. —R$_f$ (silica gel/CHCl$_3$/ethanol (20+1))=0.57. —R$_f$ (aluminium oxide/CHCl$_3$/ethanol (20+1))=0.35. —IR (KBr): v=2964 cm$^{-1}$ (m), 2875 (w), 1701 (s br.), 1685 (w), 1666 (s br.), 1616 (w), 1594 (s), 1579 (m), 1506 (w), 1434 (w), 1402 (m), 1359 (s), 1255 (m), 1174 (w), 1150 (w), 970 (w br.), 855 (w), 828 (w), 809 (m), 804 (w), 741 (m), 735 (w), 651 (w). -$^1$H-NMR (CDCl$_3$): δ=1.27 (s, 9 H, C(CH$_3$)$_3$), 1.34 (s, 9 H, C(CH$_3$)$_3$), 5.55 (s, 2 H, NH$_2$), 7.14 (d, $^4$J=2.2 Hz, 1 H, aromatic), 7.46 (dd, $^3$J=8.6 Hz, $^4$J=2.2 Hz, 1 H, aromatic), 7.59 (d, $^3$J=8.6 Hz, 1 H, aromatic), 8.58 (d, $^3$J=8.1 Hz, 2 H, perylene), 8.61 (d, $^3$J=8.2 Hz, 2 H, perylene), 8.66 (d, $^3$J=8.0 Hz, 2 H, perylene), 8.72 (d, $^3$J=7.9 Hz, 2 H, perylene). —$^{13}$C-NMR (CDCl$_3$): δ=31.22, 31.71, 122.41, 123.16, 123.41, 123.92, 126.36, 127.79, 127.96, 128.75, 129.72, 130.83, 131.60, 131.74, 132.51, 134.52, 135.05, 143.71, 150.22, 160.04, 164.30. —UV(CHCl$_3$): λ$_{max}$ (ϵ)= 528 nm (84 650), 491 (50 700), 460 (18 850). —Fluorescence (CHCl$_3$): λ$_{max}$=539 nm, 576 (very weak fluorescence, which probably originates from an impurity and is observed only in dilute solution) —MS (70 eV); m/z(%): 593 (3) [M$^+$], 578 (4) [M$^+$—CH$_3$], 576 (3) [M$^+$—OH], 538 (8), 537 (39), 536 (100) [M$^+$—C$_4$H$_9$], 522 (6), 521 (10), 520 (9) [576 —C$_4$H$_8$], 506 (2), 390 (1), 57 (3). —C$_{37}$H$_{28}$N$_3$O$_4$: [M$^+$—CH$_3$] calculated 578.2080; found 578.2080 (MS). —C$_{38}$H$_{31}$ N$_3$O$_4$ (593.7): calculated C 76.88, H 5.26, N 7.08; found C 75.93, H 5.39, N 6.83.

(B) Preparation of the Perylene Hydrazones II

Example 8

N-(1-Octyl-nonyl)-perylene-3,4:9,10-tetracarboxylic Acid 3,4-(benzylimine)-imide-9,10-imide (3)

100 mg (0.16 mmol) of N-(1-octyl-nonyl)-perylene-3,4:9,10-tetracarboxylic acid 3,4-hydrazide-9,10-imide are stirred for 4 h at 60° C. with 4 ml (40 mmol) of freshly distilled benzaldehyde. The reaction is terminated by the dropwise addition of approximately 50 ml of methanol. The precipitated dye is separated off using a D4 frit and washed thoroughly with methanol and diethyl ether. The dried precipitate is taken up in a small amount of chloroform and the solution is then filtered using a D4 frit that is free of acid traces. Methanol is added to the solution and the solvent mixture is distilled off using a rotary evaporator. The pure product is then dried for 24 h at 40° C. under an oil-pump vacuum. Yield 110 mg (96%), melting point 329–332° C. —$R_f$ (silica gel/CHCl$_3$/ethanol (10+1))=0.95. —$R_f$ (silica gel/CHCl$_3$/ethanol (20+1))=0.88. —IR (KBr): v=2954 cm$^{-1}$ (m), 2926 (s), 2854 (m), 1697 (s), 1660 (s), 1616 (w), 1594 (s), 1579 (m), 1506 (w), 1457 (w), 1449 (w), 1435 (w), 1405 (m), 1354 (m), 1338 (s), 1254 (m), 1176 (m), 1000 (m), 965 (w), 851 (m), 809 (s), 800 (m), 755 (m), 739 (m), 690 (m). —$^1$H-NMR (CDCl$_3$): δ=0.81 (t, 6 H, 2 CH$_3$), 1.25 (m$_c$, 24 H, 12 CH$_2$), 1.89 (m$_c$, 2 H, 2 α-CH$_2$), 2.22 (m$_c$, 2 H, 2 α-CH$_2$), 5.15 (m$_c$, 1 H, NCH), 7.52 (m$_c$, 3 H, aromatic), 7.99 (d, $^3$J=7.1 Hz, 2 H, aromatic), 8.29 (d, $^3$J=8.1 Hz, 2 H, perylene), 8.37 (d, $^3$J=8.1 Hz, 2 H, perylene), 8.44 (d, $^3$J=7.9 Hz, 2 H, perylene), 8.56 (s, br., 2 H, perylene), 8.62 (s, 1H, N=CH). —$^{13}$C-NMR (CDCl$_3$): δ=14.05, 22.61, 27.04, 29.24, 29.50, 29.56, 31.82, 32.39, 54.93, 122.83, 122.87, 123.02, 125.88, 126.07, 128.42, 128.80, 129.29, 129.36, 130.87, 131.48, 132.49, 132.56, 133.72, 134.57, 159.93, 163.50 br., 164.20 br., 171.27. —UV (CHCl$_3$): $\lambda_{max}$(ε)=528 nm (87 400), 491 (52 500), 460 (18 900). —Fluorescence (CHCl$_3$): $\lambda_{max}$=535 nm, 575. —MS (70 eV); m/z (%): 732 (3), 731 (6) [M$^+$], 714 (2), 629 (8), 628 (16) [M$^+$—C$_7$H$_5$N], 611 (3), 495 (4), 494 (9), 403 (2), 393 (2), 392 (12), 391 (44), 390 (100) [628 —C$_{17}$H$_{34}$], 374 (2), 373 (4), 346 (3), 345 (3), 104 (6), 103 (58) [C$_7$H$_5$N$^+$], 76 (16), 75 (4), 51 (3), 50 (6). —C$_{48}$H$_{49}$N$_3$O$_4$ (731.9): calculated C 78.77, H 6.75, N 5.74; found C 78.82, H 6.99, N 5.77.

Example 9

N-(1-Hexyl-heptyl)-perylene-3,4:9,10-tetracarboxylic Acid 3,4-(benzylimine)-imide-9,10-imide 3 ml (30 mmol) of benzaldehyde are added to 100 mg (0.17 mmol) of N-(1-hexyl-heptyl)-perylene-3,4:9,10-tetracarboxylic acid 3,4-hydrazide-9,10-imide and the mixture is heated at 60° C. for 3 h with vigorous stirring. The still-warm reaction mixture is diluted with 50 ml of methanol and the resulting precipitate is filtered off with suction after approximately 30 minutes. The dye is then washed thoroughly with methanol and diethyl ether and dried at 100° C. The red solid is taken up in a small amount of chloroform and filtered using a D5 frit (rinsed with chloroform/triethylamine (10+1) before use) in order to remove solid material. $R_f$ (silica gel/CHCl$_3$/ethanol (10+1))=0.87. —$R_f$ (silica gel/CHCl$_3$/ethanol (20+1))=0.78. —IR (KBr): v=2954 cm$^{-1}$ (m), 2928 (m), 2857 (m), 1697 (s), 1680 (s), 1616 (w), 1594 (s), 1579 (m), 1449 (m), 1432 (m), 1405 (m), 1355 (m), 1336 (s), 1253 (s), 1176 (m), 852 (w), 809 (s), 755 (m), 739 (w), 683 (w). —UV (CHCl$_3$): $\lambda_{max}$=528 nm, 491, 460. —Fluorescence (CHCl$_3$): $\lambda_{max}$=535 nm, 575. —MS (70 eV); m/z (%): 675 (8) [M$^+$], 658 (2), 573 (9), 572 (20) [M$^+$—C$_7$H$_5$N], 555 (4), 494 (8), 406 (5), 405 (9), 392 (11), 391 (41), 390 (100) [572 —C$_{13}$H$_{26}$], 346 (6), 345 (4), 105 (10), 104 (14), 103 (17) [C$_7$H$_5$N$^+$].

Example 10

N-(1-Hexyl-heptyl)-perylene-3,4:9,10-tetracarboxylic Acid 3,4-(4-methoxy-benzylimine)-imide-9,10-imide 100 mg (0.17 mmol) of N-(1-hexyl-heptyl)-perylene-3,4:9,10-tetracarboxylic acid 3,4-hydrazide-9,10-imide and 3 ml (25 mmol) of 4-methoxybenzaldehyde (anisaldehyde) are reacted for 1 h at 40° C. (little conversion) and then for 1 h at 60° C. Yield 90 mg (80%), melting point 348–350° C. —$R_f$ (silica gel/CHCl$_3$/ethanol (10+1))=0.92. —$R_f$ (silica gel/CHCl$_3$/ethanol (20+1))=0.85. —$R_f$ (silica gel/CHCl$_3$/1-butanol (40+1))=0.44. —IR (KBr): v=3065 cm$^{-1}$ (w), 2956 (m), 2928 (s), 2857 (m), 1696 (s), 1658 (s), 1594 (s), 1579 (s), 1515 (m), 1457 (m), 1431 (m), 1423 (m), 1405 (s), 1355 (m), 1336 (s br.), 1254 (s br.), 1205 (w), 1172 (s), 1126 (w), 1110 (w), 1055 (w), 991 (w), 962 (w), 851 (m), 833 (m), 809 (s), 799 (m), 754 (w), 739 (s). —$^1$H-NMR (CDCl$_3$): δ=0.83 (t, 6 H, 2 CH$_3$), 1.28 (m$_c$, 16 H, 8 CH$_2$),1.90 (m$_c$, 2 H, 2 α-CH$_2$), 2.24 (m$_c$,2 H, 2 α-CH$_2$), 3.91 (s, 3 H, OCH$_3$), 5.18 (m$_c$, 1 H, NCH), 7.02 (d, $^3$J=8.8 Hz, 2 H, aromatic), 7.95 (d, $^3$J=8.9 Hz, 2 H, aromatic), 8.52 (d, $^3$J=8.2 Hz, 2 H, perylene), 8.54 (d, $^3$J=9.1 Hz, 3 H, 2 H perylene, 1 H N=CH), 8.63 (d, $^3$J=8.1 Hz, 4 H, perylene). —$^{13}$C-NMR (CDCl$_3$): δ=14.02, 22.57, 26.95, 29.21, 31.74, 32.38, 54.86, 114.28, 122.99, 123.16, 125.17, 126.16, 126.40, 128.67, 129.43, 131.23, 131.71, 134.08, 134.83, 160.31, 163.26, 170.63. —UV (CHCl$_3$): $\lambda_{max}$(ε)=528 nm (92 800), 491 (55 900), 460 (20 300). —Fluorescence (CHCl$_3$): $\lambda_{max}$=543 nm, 575 (weak fluorescence). —MS (70 eV); m/z (%): 706 (1), 705 (1) [M$^+$], 574 (2), 573 (9), 572 (23) [M$^+$—C$_8$H$_7$NO], 555 (5), 524 (4), 403 (2), 392 (13), 391 (45), 390 (100) [M$^+$—C$_8$H$_7$NO —C$_{13}$H$_{26}$], 374 (2), 373 (7), 346 (5), 345 (5),133 (13) [C$_8$H$_7$NO$^+$], 103 (5), 90 (4), 55 (2). —C$_{45}$H$_{43}$N$_3$O$_5$: calculated 705.3203; found 705.3202 (MS). —C$_{45}$H$_{43}$N$_3$O$_5$ (705.9): calculated C 76.57, H 6.14, N 5.95; found C 76.40, H 6.09, N 5.91.

Example 11

N-(1-Hexyl-heptyl)-perylene-3,4:9,10-tetracarboxylic Acid 3,4-((2-furfuryl-imine)-imide-9,10-imide 100 mg (0.17 mmol) of N-(1-hexyl-heptyl)-perylene-3,4:9,10-tetracarboxylic acid 3,4-hydrazide-9,10-imide and 3 ml (36 mmol) of furfural are reacted for 2 h at 50° C. and then for 2 days at 80° C. Yield 100 mg (91%), melting point 334–337° C. —$R_f$ (silica gel/CHCl$_3$/ethanol (10+1))=0.86. —$R_f$ (silica gel/CHCl$_3$/ethanol (20+1))=0.79. —$R_f$ (silica gel/CHCl$_3$/1-butanol (40+1))=0.32. —IR (KBr): v=2956 cm$^{-1}$ (m), 2928 (m), 2856 (m), 1696 (s), 1660 (s br.), 1636 (w), 1623 (w), 1618 (w), 1594 (s), 1578 (m), 1506 (w), 1476 (w), 1457 (w), 1430 (w), 1405 (m), 1331 (s br.), 1253 (m), 1176 (m), 1018 (w), 809 (s), 739 (m). —$^1$H-NMR (CDCl$_3$): δ=0.81 (t, 6 H, 2 CH$_3$),1.22 (m$_c$, 16 H, 8 CH$_2$), 1.87 (m$_c$, 2 H, 2 α-CH$_2$), 2.22 (m$_c$, 2 H, 2 α-CH$_2$), 5.16 (m$_c$, 1 H, NCH), 6.62 (dd, J=1.8 Hz, J=1.8 Hz, 1 H, aromatic), 7.15 (d, J=3.5 Hz, 1 H, aromatic), 7.70 (d, J=1.7 Hz, 1 H, aromatic), 8.52 (d, $^3$J=8.1 Hz, 2 H, perylene), 8.52 (s, 1 H, N=CH), 8.55 (d, $^3$J=8.2 Hz, 2 H, perylene), 8.64 (d, $^3$J=7.9 Hz, 4 H, perylene). —$^{13}$C-NMR (CDCl$_3$): δ=14.01, 22.56, 26.94, 29.20, 31.74, 32.37, 54.86, 112.48, 118.67, 122.99, 123.00, 123.26, 123.42 br., 124.16 br., 126.19, 126.45, 128.72, 129.44, 131.03 br., 131.89, 134.07, 135.01, 146.87, 148.03, 158.38, 160.20, 163.43 br., 164.45 br.. —UV (CHCl$_3$): $\lambda_{max}$(ε)=528 nm (89 100), 491 (53 400), 460 (19 000). —Fluorescence (CHCl$_3$): $\lambda_{max}$=538 nm, 575 (very weak fluorescence). —MS (70 eV); m/z (%): 666 (2), 665 (4) [M$^+$], 573 (6) [M$^+$—C$_5$H$_2$NO], 572 (14) [M$^+$—C$_5$H$_3$NO], 555 (3), 485 (3), 484 (6), 405 (3), 392 (10), 391 (43), 390 (100) [572 —C$_{13}$H$_{26}$], 373 (6), 345 (5). —C$_{42}$H$_{39}$N$_3$O$_5$ (665.8): calculated C 75.77, H 5.90, N 6.31; found C 75.66, H 5.69, N 6.40.

Example 12

N-(1-Hexyl-heptyl)-perylene-3,4:9,10-tetracarboxylic Acid 3,4-(cyclohexylimine)-imide-9,10-imide 10 ml (96 mmol) of cyclohexanone are added to 100 mg (0.17 mmol) of N-(1-hexyl-heptyl)-perylene-3,4:9,10- tetracarboxylic acid 3,4-hydrazide-9,10-imide and the mixture is heated at 70° C. for 10 minutes with stirring. The mixture is then stirred for a further 12 h at room temperature. The reaction is monitored by thin-layer chromatography and is terminated only when starting material can no longer be detected. Excess cyclohexanone is removed under a fine vacuum. The dye is washed with methanol and then dried. The product is taken up in a small amount of chloroform and the solution is filtered using a D4 frit. Methanol is added to the filtrate and the solvent mixture is removed using a rotary evaporator. The pure dye is subsequently dried for 24 h at 40° C. under an oil-pump vacuum. —$R_f$ (silica gel/CHCl$_3$/acetone (10+1)=0.68. —$R_f$ (silica gel/CHCl$_3$/ethanol (10+1))=0.86. —$R_f$ (silica gel/CHCl$_3$/ethanol (20+1))=0.68. —IR (KBr): v=2955 cm$^{-1}$ (m), 2928 (m), 2857 (m), 1698 (s), 1660 (s), 1594 (s), 1579 (m), 1506 (w), 1457 (w), 1431 (w), 1405 (m), 1355 (m sh), 1341 (s sh), 1336 (s), 1255 (m), 1208 (w), 1177 (w), 1127 (w), 1110 (w), 980 (w), 965 (w), 852 (w), 809 (m), 741 (w). —$^1$H-NMR (CDCl$_3$): δ=0.80 (t, 6 H, 2 CH$_3$),1.28 (m$_c$, 16 H, 8 CH$_2$), 1.70 (s, 4 H, cyclohexyl radical), 1.86 (m$_c$, 2 H, 2 α-CH$_2$), 1.96 (s, 2 H, cyclohexyl radical), 2.21 (m$_c$, 4 H, 2 α-CH$_2$/2 cyclohexyl radical), 2.75 (t, 2 H, cyclohexyl radical), 5.16 (m$_c$, 1 H, NCH), 8.57 (d, $^3$J=8.1 Hz, 2 H, perylene), 8.59 (d, $^3$J=8.1 Hz, 2 H, perylene), 8.65 (d, $^3$J=8.1 Hz, 4 H, perylene). —$^{13}$C-NMR (CDCl$_3$): δ=14.44, 22.98, 25.98, 26.73, 27.34, 27.81, 29.62, 30.84, 32.16, 32.78, 36.22, 54.93, 123.41, 123.65, 126.70, 126.99, 129.93, 131.53, 134.69, 135.33, 160.12, 185.81. —UV (CHCl$_3$): $\lambda_{max}$ (ε)=527 nm (85 800), 491 (51 400), 459 (18 600). —Fluorescence (CHCl$_3$): $\lambda_{max}$=539 nm, 575. —MS (70 eV); m/z (%): 668 (36), 667 (84) [M$^+$], 651 (6), 650 (12), 626 (7), 624 (55), 585 (11), 557 (6), 556 (10), 487 (17), 486 (56), 485 (62) [M$^+$—C$_{13}$H$_{26}$], 444 (7), 443 (40), 442 (100) [485 —C$_3$H$_7$], 429 (6), 404 (9), 403 (19), 392 (16), 391 (60), 390 (65), 389 (6), 376 (10), 375 (34), 373 (28), 363 (5), 362 (15), 361 (21), 347 (10), 346 (31), 345 (22), 333 (9), 305 (10), 302 (7), 275 (6), 274 (7), 69 (12), 65 (7), 55 (20). —C$_{43}$H$_{45}$N$_3$O$_4$ (667.8): calculated C 77.33, H 6.79, N 6.29; found C 76.76, H 6.79, N 6.15.

Example 13

N-(1-Hexyl-heptyl)-perylene-3,4:9,10-tetracarboxylic Acid 3,4-((1-butyl)-imine)-imide-9,10-imide 5 ml (47 mmol) of pentanal (valeraldehyde) are added to 100 mg (0.17 mmol) of N-(1-hexyl-heptyl)-perylene-3,4:9,10-tetracarboxylic acid 3,4-hydrazide-9,10-imide and the mixture is stirred at room temperature for 24 h. Excess aldehyde is removed under a fine vacuum. The residue is washed with a small amount of cold methanol and then dried thoroughly over CaCl$_2$. The product is taken up in a small amount of chloroform and the solution is filtered using a D4 frit. Methanol is added to the filtrate and the solvent mixture is removed using a rotary evaporator. The pure dye is subsequently dried for 24 h at 40° C. under an oil-pump vacuum. In the attempt to purify the dye by chromatography (silica gel/chloroform/ethanol (20+1)), the product decomposes. Yield 90 mg (90%). —$R_f$ (silica gel/CHCl$_3$/ethanol (20+1))=0.88. —IR (KBr): v=2957 cm$^{-1}$ (m), 2928 (m), 2857 (w), 1698 (s), 1660 (s), 1616 (w), 1594 (s), 1579 (m), 1510 (w), 1457 (w), 1432 (w), 1405 (m), 1354 (m), 1336 (s), 1254 (m), 1207 (w), 1177 (m), 851 (w), 809 (m), 800 (w), 739 (m). —$^1$H-NMR (CDCl$_3$): δ=0.81 (t, 6 H, 2 CH$_3$),1.03 (t, 3 H, CH$_3$),1.26 (m$_c$, 16 H, 8 CH$_2$), 1.60 (m$_c$, 2 H, CH$_2$), 1.76 (m$_c$, 2 H, CH$_2$), 1.88 (m$_c$, 2 H, 2 α-CH$_2$), 2.22 (m$_c$ 2 H, 2 α-CH$_2$), 2.70 (q, 2 H, CH$_2$), 5.16 (m$_c$, 1 H, NCH), 8.02 (t, 1 H, N═CH), 8.50 (m$_c$, 8 H, perylene) (in the $^1$H-NMR spectrum, the NH$_2$ protons of the starting material are already detectable at 5.48 ppm). —$^{13}$C-NMR (CDCl$_3$): δ=13.86, 14.03, 22.30, 22.58, 26.97, 27.88, 29.22, 31.76, 32.37, 33.28, 54.86, 122.89, 123.00, 123.13, 126.06, 131.56, 133.96, 134.78, 160.04, 177.76. —UV (CHCl$_3$): $\lambda_{max}$=528 nm, 491, 460. —Fluorescence (CHCl$_3$): $\lambda_{max}$=535 nm, 575. —MS (70 eV); m/z (%): 655 (4) [M$^+$], 614 (4), 613 (9), 599 (4), 598 (9), 587 (9), 586 (20), 573 (6), 572 (13) [M$^+$—C$_5$H$_9$N], 557 (4), 556 (4), 474 (8), 431 (8), 416 (9), 406 (5), 405 (13), 404 (17), 403 (5), 392 (13), 391 (53), 390 (100) [572 —C$_{13}$H$_{26}$], 376 (5), 375 (7), 374 (7), 373 (9), 346 (9), 345 (8). —C$_{42}$H$_{45}$N$_3$O$_4$: calculated 655.3410; found 655.3405 (MS).

Example 14

Derivatisation of pentanal with N-(1-hexyl-heptyl)-perylene-3,4:9,10-tetracarboxylic acid 3,4-hydrazide-9,10-imide using Al$_2$O$_3$ as drying agent 100 mg (0.17 mmol) of N-(1-hexyl-heptyl)-perylene-3,4:9,10-tetracarboxylic acid 3,4-hydrazide-9,10-imide, 1 ml (18 mmol) of pentanal and 1.3 g of aluminium oxide (neutral) are heated to reflux in 10 ml of chloroform. After 30 minutes, a thin-layer chromatogram (silica gel/chloroform/ethanol (10+1) or aluminium oxide/chloroform) demonstrates that the non-fluorescent starting material N-(1-hexyl-heptyl)-perylene-3,4:9,10-tetracarboxylic acid 3,4-hydrazide-9,10-imide has substantially been converted into the strongly fluorescent product. In addition to traces of the starting material it is also possible to identify two slight impurities ($R_f$ silica gel/chloroform/ethanol (10+1)=0.75 and 0.69). Even after the addition of more aldehyde and Al$_2$O$_3$ there is no further change in a period of 3 h. The drying agent is filtered off and the product is precipitated with methanol. The two solvents are then distilled off because the dye is still noticeably dissolved. Only after working up with methanol is it possible to discern an intensely coloured decomposition product on the thin-layer chromatogram. —$R_f$ (silica gel/CHCl$_3$/ethanol (10+1))=0.85. Main product. —$R_f$ (aluminium oxide/CHCl$_3$)=0.60. Main product 78. —$R_f$ (silica gel/CHCl$_3$/ethanol (10+1))=0.90. Decomposition product. —$R_f$ (aluminium oxide/CHCl$_3$)=0.81. Decomposition product.

Example 15

N-(1-Hexyl-heptyl)-perylene-3,4:9,10-tetracarboxylic Acid 3,4-((1-hexylimine)-imide-9,10-imide 160 mg (0.28 mmol) of N-(1-hexyl-heptyl)-perylene-3,4:9,10-tetracarboxylic acid 3,4-hydrazide-9,10-imide are stirred in 2 ml (14.3 mmol) of heptanal (oenanthaldehyde) for 4 h at 50° C. When the reaction is complete, excess aldehyde is removed in vacuo. The residue is washed repeatedly with a small amount of cold methanol and then dried (the characteristic odour of the oenanthaldehyde is clearly perceptible even after drying). Purification of the dye is carried out by column chromatography on silica gel using ethyl acetate as eluant After a short first runnings, the intensely fluorescent product can readily be separated from the non-fluorescent starting material. The chromatography is carried out swiftly and without significant interruptions, since the hydrazones rapidly decompose on the column material. The homogeneous dye fraction is freed of solvent in vacuo with gentle heating and dried under an oil-pump vacuum. Yield 90 mg (48%). —$R_f$ (silica gel/CHCl$_3$/ethanol (10+1))=0.88. —$R_f$ (silica gel/ethyl acetate)=0.81. —IR (KBr): v=2955 cm$^{-1}$ (m), 2928 (m), 2857 (m), 1700 (s), 1660 (s), 1595 (s), 1579 (m), 1506 (w), 1465 (w), 1457 (w), 1430 (w), 1405 (m), 1352 (m sh), 1337 (s), 1254 (m), 1177 (m), 850 (w), 809 (m), 798 (w), 739 (m). —$^1$H-NMR (CDCl$_3$): δ=0.81 (t, 6 H, 2 CH$_3$), 0.91 (t; 3 H, CH$_3$), 1.28 (m$_c$, 20 H, 8 CH$_2$+2 CH$_2$), 1.56 (m$_c$, 2 H, CH$_2$), 1.85 (m$_c$, 2 H, 2 α-CH$_2$), 2.24 (m$_c$ 2 H, 2 α-CH$_2$), 2.40 (t, $^3$J=8.3 Hz, 2 H, CH$_2$), 2.70 (dd, $^3$J=7.5 Hz, $^4$J=1.3 Hz, 2 H, CH$_2$), 5.18 (m$_c$, 1 H, NCH), 8.02 (t, $^3$J=6.5 Hz, 1 H, N═CH), 8.45 (d, $^3$J=8.1 Hz, 2 H, aromatic), 8.48 (d, $^3$J=8.1 Hz, 2 H, perylene), 8.57 (d, $^3$J=8.0 Hz, 2 H perylene), 8.63 (s br., 2 H, perylene). —$^{13}$C-NMR (CDCl$_3$): δ=14.02, 22.04, 22.57, 25.77, 26.96, 28.81, 29.21, 31.54, 31.75, 32.37, 33.59, 43.89, 54.85, 122.07, 122.78, 122.91, 123.04, 123.14, 123.23, 123.28, 126.10, 126.34, 128.64, 129.38, 131.60, 133.99, 134.81, 134.90, 160.06, 163.38 br., 164.39 br., 177.70 (on account of the decomposition to the starting materials, the NMR specimen of the sensitive substance contains more signals than expected both in the $^1$H-NMR and the $^{13}$C-NMR spectra. In particular, additional signals of the free oenanthaldehyde are observed (e.g.: $^1$H-NMR: 9.75 ppm, $^{13}$C-NMR: 202.86 ppm). —UV (CHCl$_3$): λ$_{max}$ (ε)=527 nm (78 600), 491 (44 600), 460 (11 200). —Fluorescence (CHCl$_3$): λ$_{max}$=535 nm, 576. —MS (70 eV); m/z (%): 684 (3), 683 (5) [M$^+$], 614 (4), 613 (10), 598 (8), 587 (8), 586 (16), 574 (5), 573 (16), 572 (18) [M$^+$—C$_7$H$_{13}$N], 502 (6), 431 (5), 416 (6), 405 (8), 404 (10), 403 (5), 392 (16), 391 (58), 390 (100) [572 —C$_{13}$H$_{26}$], 375 (6), 374 (7), 373 (8), 346 (9), 345 (8), 83 (20), 82 (25), 69 (5), 55 (13), 54 (9). —C$_{44}$H$_{49}$N$_3$O$_4$ (683.9): calculated C 77.28, H 7.22, N 6.14; found C 77.86, H 7.23, N 6.27.

Example 16

N-(1-Hexyl-heptyl)-perylene-3,4:9,10-tetracarboxylic Acid 3,4-(methylimine)-imide-9,10-imide 50 mg (0.09 mmol) of N-(1-hexyl-heptyl)-perylene-3,4:9,10-tetracarboxylic acid 3,4-hydrazide-9,10-imide and 3 ml (53 mmol) of acetaldehyde. Reaction time: 3 days at 30° C. If required, fresh acetaldehyde is added to the mixture. —R$_f$ (silica gel/CHCl$_3$/ethanol (20+1))=0.70. —$^1$H-NMR (CDCl$_3$): δ=0.81 (t, 6 H, 2 CH$_3$), 1.28 (m$_c$, 16 H, 8 CH$_2$), 1.88 (m$_c$, 2 H, 2 α-CH$_2$), 2.24 (m$_c$, 2 H, 2 α-CH$_2$), 5.16 (m$_c$, 1 H, NCH), 5.48 (s, 2 H, NH$_2$), 7.95 (t, 1 H, N═CH), 8.50 (m$_c$, 8 H, perylene). (A conversion of 40% is estimated from the ratio of the signals at 5.48 ppm (starting material) and 7.95 ppm (product)=3:2.) —UV (CHCl$_3$): λ$_{max}$=528 nm, 490, 460. —Fluorescence (CHCl$_3$): λ$_{max}$=535 nm, 575. —MS (70 eV); m/z (%): 614 (3), 613 (7) [M$^+$], 596 (2), 587 (3), 573 (4), 572 (9) [M$^+$—CH$_3$CN], 432 (8), 431 (4) [M$^+$—C$_{13}$H$_{26}$], 406 (8), 405 (14), 392 (10), 391 (45), 390 (100) [572 —C$_{13}$H$_{26}$], 376 (5), 346 (5), 345 (5), 55 (5).

Example 17

N-(1-Hexyl-heptyl)-perylene-3,4:9,10-tetracarboxylic Acid 3,4-(2-(4-methyl-pent-3-en)imine)-imide-9,10-imide 300 mg (0.50 mmol) of N-(1-hexyl-heptyl)-perylene-3,4:9,10-tetracarboxylic acid 3,4-hydrazide-9,10-imide and 80 mg (0.80 mmol) of freshly distilled mesityl oxide are heated at the boil for 24 h in 80 ml of absolute benzene. The benzene is distilled off in vacuo, and the dye is precipitated with methanol and then dried at 100° C. For purification, the crude product is chromatographed on dried silica gel with absolute chloroform/absolute acetone (10+1), it being possible for the fluorescent dye to be separated off after a short first runnings. Yield 90 mg (90%). —R$_f$ (silica gel/CHCl$_3$/acetone (10+1))=0.82. —$^1$H-NMR (CDCl$_3$): δ=0.83 (t, 6 H, 2 CH$_3$), 1.28 (m$_c$, 16 H, 8 CH$_2$), 1.90 (m$_c$, 2 H, 2 α-CH$_2$), 2.24 (m$_c$ 2 H, 2 α-CH$_2$), 5.18 (m$_c$, 1 H, NCH), 6.01 (s, 1 H, C═CH), 8.50 (m$_c$, 8 H, perylene). —$^{13}$C-NMR (CDCl$_3$): δ=14.02, 20.04, 21.26, 22.56, 26.93, 27.47, 29.20, 31.74, 32.36, 54.57, 122.57, 122.98, 123.10, 123.32, 126.10, 126.90, 129.20, 129.60, 131.59, 134.20, 134.86, 148.10, 159.52, 170.70. —UV (CHCl$_3$): λ$_{max}$=527 nm, 491, 460. —Fluorescence (CHCl$_3$): λ$_{max}$=534 nm, 576. —MS (70 eV); m/z (%): 667 (4) [M$^+$], 628 (4), 627 (9), 613 (4), 612 (13), 573 (6), 572 (12), 555 (4), 446 (9), 445 (10), 431 (10), 430 (33), 404 (5), 403 (5), 392 (18), 391 (57), 390 (100), 389 (5), 376 (5), 375 (6), 374 (7), 373 (10), 362 (5), 361 (5), 347 (4), 346 (9), 345 (8), 302 (4), 95 (16), 55 (6).

Example 18

Fluorescence Derivatisation of Benzaldehyde

For each test, a fixed amount of a dye solution of N-(1-butyl-pentyl)-perylene-3,4:9,10-tetracarboxylic acid 3,4-hydrazide-9,10-imide is placed in a vessel, an increasing amount of a benzaldehyde solution is added and the mixture is made up to a constant volume. The two components are refluxed for 30 minutes. The fluorescence intensity is then measured. A blank specimen of N-(1-butyl-pentyl)-perylene-3,4:9,10-tetracarboxylic acid 3,4-hydrazide-9,10-imide also has to be exposed to these reaction conditions, because an increase in the fluorescence may occur in that specimen too.

Measurement series 1 (benzaldehyde) (Table 1): Weighed-in amount of the dye N-(1-butyl-pentyl)-perylene-3,4:9,10-tetracarboxylic acid 3,4-hydrazide-9,10-imide (M=531.6 g mol$^{-1}$): 0.39 mg in 50 ml of chloroform. For each measurement 2.00 ml (2.94×10$^{-5}$ mmol) of the dye solution are placed in a vessel.

Weighed-in amount of the benzaldehyde (M=106.1 g mol$^{-1}$): 100 mg in 50 ml of chloroform. 2.00 ml of that solution are taken out and diluted to a volume of 1.00 litre. 0.1 ml of that solution therefore contains 0.366×10$^{-5}$ mmol of benzaldehyde.

Measurement series 2 (Table 2): Weighed-in amount of the dye N-(1-butyl-pentyl)-perylene-3,4:9,10-tetracarboxylic acid 3,4-hydrazide-9,10-imide (M=531.6 g mol$^{-1}$): 0.39 mg in 50 ml of chloroform. For each measurement 2.00 ml (2.94×10$^{-5}$ mmol) of the dye solution are placed in a vessel.

Weighed-in amount of the benzaldehyde (M=106.1 g mol$^{-1}$): 99 mg in 50 ml of chloroform. 2.00 ml of that solution are removed and diluted to a volume of 1 litre. 0.1 ml of that solution therefore contains 0.38×10$^{-5}$ mmol of benzaldehyde.

TABLE 1

Measurement of fluorescence: Benzaldehyde-N-(1-butyl-pentyl)-perylene-3,4:9,10-tetracarboxylic acid 3,4-hydrazide-9,10-imide (measurement series 1)

| Aldehyde-solution | | Aldehyde:dye | Fluorescence | |
|---|---|---|---|---|
| ml | 10$^{-5}$ mmol | mol:mol | units | Remarks |
| 0 | 0 | 0:1 | 4.5 | cold |
| 0 | 0 | 0:1 | 5.0 | reflux |
| 0.1 | 0.37 | 8:1 | 6.0 | |
| 0.2 | 0.75 | 4:1 | 6.0 | |
| 0.4 | 1.51 | 2:1 | 6.6 | |
| 0.8 | 3.02 | 1:1 | 6.2 | |
| 1.6 | 6.03 | 1:2 | 11 | |

TABLE 2

Measurement of fluorescence: Benzaldehyde-N-(1-butyl-pentyl)-perylene-3,4:9,10-tetracarboxylic acid 3,4-hydrazide-9,10-imide (measurement series 2)

| Aldehyde-solution | | Aldehyde:dye | Fluorescence | |
|---|---|---|---|---|
| ml | $10^{-5}$ mmol | mol:mol | units | Remarks |
| 0 | 0 | — | 5.0 | reflux |
| 0.1 | 0.38 | 8:1 | 8.5 | |
| 0.2 | 0.75 | 4:1 | >>20 | |
| 0.3 | 1.13 | 2.5:1 | 8.5 | |
| 0.4 | 1.51 | 2:1 | 15 | |
| 0.5 | 1.89 | 1.5:1 | >>20 | |
| 0.6 | 2.26 | 1.3:1 | 13 | |
| 0.7 | 2.64 | 1.1:1 | 15.2 | |
| 0.8 | 3.02 | 1:1 | 16 | |

Example 19

Derivatisation of Secologanin

A microspatula tip of perylene-3,4:9,10-tetracarboxylic acid 3,4-hydrazide-9,10-dicarboximide is stirred for up to 3 h at 60° C. with a microspatula tip of secologanin in 3 ml of distilled chloroform (acid-free reaction solution). The course of the reaction can be monitored by thin-layer chromatography (silica gel/chloroform/ethanol (10+1)). —$R_f$ (silica gel/CHCl$_3$/ethanol (10+1))=0.74 (non-fluorescent starting material), $R_f$ (silica gel/CHCl$_3$/-ethanol (10+1))=0.16 (fluorescent main product), $R_f$ (silica gel/CHCl$_3$/ethanol (10+1))=0.77 (fluorescentsecondary product).

Example 20

N-(1-Octyl-nonyl)-N'-(N''-carbamic Acid Ethyl Ester)-perylene-3,4:9,10-bis(dicarboximide)

40 mg (0.36 mmol) of ethyl chloroformate and 40 mg (0.40 mmol) of triethylamine are added to 220 mg (0.34 mmol) of N-(1-octyl-nonyl)-perylene-3,4:9,10-tetracarboxylic acid 3,4-hydrazide-9,10-imide and the mixture is then stirred at 60° C. for 3 h. After cooling, the reaction mixture is carefully poured into 150 ml of ethanol/water (1+1) and stirred vigorously for 2 h. The resulting precipitate is separated off using a D4 frit, washed three times with water and then dried at 100° C. The crude product, which is already very pure, is chromatographed on silica gel/chloroformlethanol (10+1). Approximately 100 ml of methanol are added to the homogeneous dye fraction. The solvent mixture is distilled off and the pure product is dried at 60° C. under an oil-pump vacuum. Yield 150 mg (68%), melting point 277–278° C. —$R_f$ (silica gel/CHCl$_3$/ethanol (10+1))=0.66. —$R_f$ (silica gel/—CHCl$_3$/1-butanol (40+1))= 0.27. —$R_f$ (silica gel/CHCl$_3$/triethylamine (40+1))=0.17. —IR (KBr): v=2954 cm$^{-1}$ (m), 2926 (m), 2855 (m), 1718 (s), 1700 (s), 1660 (s), 1636 (m), 1616 (m), 1595 (s), 1580 (m), 1506 (w), 1465 (w), 1457 (w), 1404 (m), 1348 (m), 1305 (m), 1254 (m), 1175 (m), 810 (m), 750 (m), 668 (m). —$^1$H-NMR (CDCl$_3$): δ=0.80 (t, 6 H, 2 CH$_3$), 1.28 (m$_c$, 27 H, 12 CH$_2$+CH$_3$), 1.92 (m$_c$, 2 H, 2 α-CH$_2$), 2.25 (m$_c$, 2 H, 2 α-CH$_2$), 4.31 (d br., 2 H, OCH$_2$), 5.15 (m$_c$, 1 H, NCH), 7.17 (s br., 1 H, NH), 8.21 (d br., 2 H, perylene), 8.31 (d br., 4 H, perylene), 8.53 (d br., 2 H, perylene). —$^{13}$C-NMR (CDCl$_3$): δ=14.06, 14.42, 22.62, 27.10, 29.26, 29.53, 31.82, 55.09, 62.92, 122.36, 122.72, 123.26, 125.85, 126.04, 128.92, 129.00, 129.10, 130.86, 131.69, 133.47, 134.87, 155.18, 161.40. —UV (CHCl$_3$): $\lambda_{max}(\epsilon)$=526 nm (82 900), 490 (49 900), 459 (18 100). —Fluorescence (CHCl$_3$): $\lambda_{max}$= 535 nm, 574. —MS (70 eV); m/z (%): 716 (21), 715 (46) [M$^+$], 698 (12) [M$^+$—OH], 669 (5), 480 (6), 479 (31), 478 (77), 477 (100) [M$^+$—C$_{17}$H$_{34}$], 433 (11), 432 (22), 431 (24), 414 (5), 407 (6), 406 (35), 405 (75), 391 (22), 390 (37), 388 (6), 377 (12), 376 (43), 347 (10), 320 (8), 319 (5). —C$_{44}$H$_{49}$N$_3$O$_6$ (715.8): calculated C 73.82, H 6.90, N 5.87; found C 73.81, H 6.94, N 5.80.

Example 21

N-(1-Hexyl-heptyl)-N'-(N''-carbamic acid ethyl ester)-perylene-3,4:9,10-bis(dicarboximide)

100 mg (0.17 mmol) of N-(1-hexyl-heptyl)-perylene-3,4:9,10-tetracarboxylic acid 3,4-hydrazide-9,10-imide, 20 mg (0.18 mmol) of ethyl chloroformate and 20 mg (0.20 mmol) of triethylamine are reacted at 60° C. for 3 h. After cooling, the mixture is poured into 50 ml of ethanol/water (1+1) and stirred vigorously for 2 h. The resulting precipitate is separated off using a D4 frit, washed with water and dried at 100° C. —$R_f$ (silica gel/CHCl$_3$/ethanol (10+1))=0.66. —$R_f$ (silica gel/CHCl$_3$/1-butanol (40+1))=0.19. —$R_f$ (aluminium oxide/CHCl$_3$/ethanol (10+1))=0.68. —$R_f$ (aluminium oxide/CHCl$_3$/1-butanol (40+1))=0.34. —IR (KBr): v=2927 cm$^{-1}$ (m), 2857 (w), 1718 (m), 1700 (s), 1653 (m), 1636 (m), 1595 (s), 1577 (m), 1505 (w), 1457 (w), 1437 (w), 1420 (m), 1254 (m), 1176 (w), 1109 (w), 1043 (w), 809 (m). —$^1$H-NMR (CDCl$_3$): δ=0.82 (t, 6 H, 2 CH$_3$), 1.28 (m$_c$, 16 H, 8 CH$_2$), 1.33 (s, 3 H, O—CH$_2$CH$_3$), 1.90 (m$_c$, 2 H, 2 α-CH$_2$), 2.25 (m$_c$, 2 H, 2 α-CH$_2$), 4.32 (q, 2 H, OCH$_2$), 5.16 (m$_c$, 1 H, NCH), 8.51 (m$_c$, 8 H, perylene). —$^{13}$C-NMR (CDCl$_3$): δ=14.04, 14.41, 22.59, 27.01, 29.23, 31.77, 32.41, 55.03, 62.96, 122.47, 122.84, 123.37, 126.31, 129.20, 131.90, 133.68, 135.44, 155.17, 166.51.

Example 22

N-1-(Hexyl-heptyl)-N'-(phenyl)-perylene-3,4:9,10-bis(dicarboximide) (2g)

600 mg (1.04 mmol) of N-(1-hexyl-heptyl)-perylene-3,4:9,10-tetracarboxylic acid 3,4-anhydride-9,10-imide and 280 mg (3.0 mmol) of distilled aniline are stirred for 3 h at 150° C. with 100 mg (0.46 mmol) of zinc acetate dihydrate in 3 g of imidazole. The still-warm mixture is carefully diluted with 10 ml of ethanol and the flask contents are poured with several portions of ethanol into 100 ml of 2 N hydrochloric acid. The mixture is stirred for 2 h at room temperature, and the resulting precipitate is filtered off with suction and washed repeatedly with water/methanol. The crude product so obtained is dried at 100° C. The dye is purified by chromatography on silica gel (column 40×4 cm) using chloroform as eluant. Yield 510 mg (75%). —$^1$H-NMR (CDCl$_3$): δ=0.81 (t, 6 H, 2 CH$_3$),1.28 (m$_c$, 16 H, 8 CH$_2$),1.88 (m$_c$, 2 H, 2 α-CH$_2$), 2.24 (m$_c$, 2 H, 2 α-CH$_2$), 5.16 (m$_c$, 1 H, NCH), 7.35 (m$_c$, 2 H, phenyl), 7.53 (m$_c$, 3 H, phenyl), 8.50 (m$_c$, 8 H, perylene). —MS (70 eV); m/z (%): 649 (14), 648 (30) [M$^+$], 631 (7), 479 (4), 469 (3), 468 (18), 467 (69), 466 (100) [M$^+$—C$_{13}$H$_{26}$], 465 (20), 449 (5), 422 (5), 421 (8).

Example 23

Hydrazinolysis of 2 g 500 mg (0.77 mmol) of 2 g (from Example 22) are stirred with 1.0 ml (20.0 mmol) of hydrazine hydrate (100 percent) in 10 ml of tert-butyl alcohol and heated to the boil. After 20 h, the flask contents are stirred into water and the mixture is stirred for 1 h. The resulting precipitate is filtered off with suction, washed with water and dried at 120° C. The crude product is chromatographed once on silica gel/chloroform/ethanol (10+1) and can be identified as N-(1-hexyl-heptyl)- perylene-3,4:9,10-tetracarboxylic acid 3,4-hydrazide-9,10-imide on the basis of its spectroscopic data.

Example 24

N-(1-Hexyl-heptyl)-perylene-3,4:9,10-tetracarboxylic Acid 3,4-((2-hydrazopyridin)-yl)-imide-9,10-imide 250 mg (0.44 mmol) of N-(1-hexyl-heptyl)-perylene-3, 4:9,10-tetracarboxylic acid 3,4-anhydride-9,10-imide and 200 mg (1.80 mmol) of 2-hydrazopyridine are stirred for 20 h at room temperature in 20 ml of 2-methoxyethanol. By adding a further 20 mg (0.18 mmol) of 2-hydrazopyridine and increasing the reaction temperature to 70° C., the reaction is prevented from proceeding to completion and is therefore terminated after 4 h. The solvent is removed in vacuo and the crude product is chromatographed on aluminium oxide/chloroform/ethanol (10+1). Further purification is carried out on aluminium oxide (column 50×4 cm)/chloroform (flash chromatography) and silica gel (column 50×4 cm)/chloroform/glacial acetic acid (10+1). The eluant is removed using a rotary evaporator, and the residue is washed thoroughly with water/methanol and then dried in vacuo at 60° C. Yield 70 mg (24%), melting point>350° C. —$R_f$(silica gel/CHCl$_3$/ethanol (10+1))=0.57. —$R_f$ (silica gel/CHCl$_3$/glacial acetic acid (10+1))=0.48. —IR (KBr): v=3441 cm$^{-1}$ (m br.), 2956 (m), 2927 (m), 2856 (m), 1718 (m), 1700 (s), 1685 (m br.), 1658 (s), 1594 (s), 1579 (m), 1506 (w), 1476 (w), 1459 (w), 1437 (m), 1404 (m), 1355 (m), 1346 (s), 1319 (w), 1253 (m br.), 1175 (m), 1110 (w), 1090 (w), 1035 (w), 966 (w), 855 (w), 810 (s), 746 (m). —$^1$H-NMR (CDCl$_3$): δ=0.81 (t, 6 H, 2 CH$_3$), 1.28 (m$_c$, 16 H, 8 CH$_2$), 1.87 (m$_c$, 2 H, 2 α-CH$_2$), 2.26 (m$_c$, 2 H, 2 α-CH$_2$), 5.17 (m$_c$, 1 H, NCH), 6.85 (m$_c$, 2 H, aromatic), 7.57 (t, $^3$J=7.8 Hz, $^4$J=1 Hz, 1 H, aromatic), 8.14 (d, $^3$J=5.0 Hz, 1 H, aromatic), 8.58 (d, $^3$J=8.1 Hz, 2 H, perylene), 8.59 (d, $^3$J=8.0 Hz, 2 H, perylene), 8.67 (d, $^3$J=8.0 Hz, 4 H, perylene). —$^{13}$C-NMR (CDCl$_3$): δ=14.02, 22.57, 26.94, 29.20, 31.75, 32.37, 54.90, 108.82, 117.65, 122.93, 123.44, 126.30, 126.71, 129.49, 132.20, 134.10, 135.36, 137.99, 148.21, 157.02, 162.45. —UV (CHCl$_3$): $\lambda_{max}$(ε)=527 nm (79 100), 490 (48 100), 459 (17 700). —Fluorescence (CHCl$_3$): $\lambda_{max}$=542 nm, 577. —MS (70 eV); m/z (%): 666 (5), 665 (20), 664 (41) [M$^+$], 648 (4), 647 (9) [M$^+$—OH], 619 (6), 495 (4), 484 (17), 483 (41), 482 (39) [M$^+$—C$_{13}$H$_{26}$], 465 (7), 439 (11), 438 (45), 437 (100) [M$^+$—C$_{13}$H$_{26}$—CO], 392 (4), 390 (5), 319 (5), 94 (5), 55 (5). —C$_{42}$H$_{40}$N$_4$O$_4$ (664.8): calculated C 75.88, H 6.06, N 8.43; found C 75.94, H 5.99, N 8.22.

(C) Preparation of Bifluorophoric Perylene Derivatives IIIa

Example 25

N$^2$,N$^2$-Bis(1-butyl-pentyl)-N$^1$,N$^1$-bis(perylene-3,4:9,10-bis(dicarboximide))

150 mg (0.28 mmol) of N-(1-butyl-pentyl)-perylene-3, 4:9,10-tetracarboxylic acid 3,4-hydrazide-9,10-imide and 150 mg (0.29 mmol) of N-(1-butyl-pentyl)-perylene-3,4:9, 10-tetracarboxylic acid 3,4-anhydride-9,10-imide are stirred at 140° C. for 70 minutes in 1.5 g of imidazole. The reaction is terminated by the addition of 15 ml of ethanol. The red suspension is stirred in 50 ml of 2 N hydrochloric acid for one hour, and the precipitated crude product is filtered off with suction and washed repeatedly with distilled water. For purification, after drying overnight the product is chromatographed first on aluminium oxide using chloroform/1-butanol (40+1), and then on silica gel using chloroform/1-butanol (40+1). 20 ml of methanol are added to the isolated deep-red main band and the solvent mixture is removed. After drying at 100° C., the product is obtained in the form of a deep-red powder. Yield 120 mg (41%). $R_f$ (silica gel/CHCl$_3$+1-butanol (40+1))=0.1 1. —$R_f$ (silica gel/CHCl$_3$+ethanol (10+1))=0.89. —IR (kBr): v=3030 cm$^{-1}$ (w), 2955 (m), 2928 (m), 2860 (m), 1736 (m), 1715 (s), 1698 (s br.), 1660 (s), 1616 (m), 1594 (s), 1579 (s), 1505 (w), 1465 (w), 1455 (w), 1430 (m), 1404 (s), 1354 (s), 1332 (s br.), 1253 (s br.), 1204 (m), 1192 (m), 1176 (m), 1125 (m), 1100 (m), 972 (w), 958 (w), 945 (w), 853 (m), 810 (s), 755 (m), 741 (s), 725 (m), 662 (m), 658 (m). —$^1$H-NMR (CDCl$_3$): δ=0.86 (t, 12 H, 4 CH$_3$), 1.30 (m$_c$, 16 H, 8 CH$_2$), 1.89 (m$_c$, 4 H, 4 α-CH$_2$), 2.24 (m$_c$, 4 H, 4 α-CH$_2$), 5.17 (m$_c$, 2 H, 2 NCH), 8.06 (s br., 4 H, perylene), 8.25 (s br., 4 H, perylene), 8.36 (s br., 4 H, perylene), 8.54 (s br., 4 H, perylene). —$^{13}$C-NMR (CDCl$_3$): δ=14.08, 22.62, 29.26, 32.05, 54.82, 122.11, 122.41, 123.47, 125.61, 125.86, 128.88, 129.23, 132.03, 133.23, 134.92, 159.88. —UV (CHCl$_3$): $\lambda_{max}$ (ε)= 534 nm (230 100), 496 (94 700), 462 (29 800). —Fluorescence (CHCl$_3$): $\lambda_{max}$=548 nm, 580. —Solid-state fluorescence: $\lambda_{max}$=623 nm. —MS (70 eV); m/z (%): 1032 (6), 1031 (15) [M$^+$], 1030 (21), 1014 (5), [M$^+$—OH], 1013 (8), 906 (12), 905 (24) [M$^+$—C$_9$H$_{18}$], 904 (13), 780 (33), 779 (80) [M$^+$—C$_9$H$_{18}$—C$_9$H$_{18}$], 778 (100), 391 (17), 390 (34), 389 (8), 373 (14), 345 (8), 126 (6) [C$_9$H$_{18}^+$]. —C$_{66}$H$_{54}$N$_4$O$_8$ (1031.2): calculated C 76.88, H 5.28, N 5.43; found C 76.28, H 5.44, N 5.29.

Example 26

N$^2$,N$^2$-Bis(1-hexyl-heptyl)-N$^1$,N$^1$-bis(perylene-3,4:9,10-bis(dicarboximide))

110 mg (0.19 mmol) of N-(1-hexyl-heptyl)-perylene-3, 4:9,10-tetracarboxylic acid 3,4-anhydride-9,10-imide and 100 mg (0.17 mmol) of N-(1-hexyl-heptyl)-perylene-3,4:9, 10-tetracarboxylic acid 3,4-hydrazide-9,10-imide are stirred at 140° C. for 1 h in 1 g of imidazole. Before it cools, the reaction mixture is taken up in 50 ml of ethanol, 100 ml of 2 N hydrochloric acid are added and the mixture is stirred at room temperature for 2 h. The precipitated crude dye product is separated off by filtering with suction, washed with water and methanol and dried overnight at 100° C. For purification, the dye is chromatographed on aluminium oxide (column 30×4 cm) and silica gel using chloroform/1-butanol (40+1) as eluant. The thin-layer-chromatographically homogeneous dye fraction is filtered using a D4 frit, methanol is added, and the mixture is concentrated using a rotary evaporator and dried in vacuo (0.1 torr) for 8 h at 50° C. Yield 0.08 g (39%). —$R_f$ (silica gel/CHCl$_3$/1-butanol (40+1))=0.33. —IR (KBr): n=2954 cm$^{-1}$ (m), 2927 (s), 2856 (m), 1735 (w), 1717 (s), 1698 (s), 1660 (s), 1616 (w), 1594 (s), 1579 (s), 1510 (w), 1457 (m), 1430 (m), 1404 (s), 1354 (m), 1334 (s), 1252 (s), 1204 (m), 1174 (m), 1130 (w), 1110 (w), 965 (w), 855 (w), 810 (s), 800 (m), 755 (w), 741 (m), 730 (w), 665 (w), 660 (w). —$^1$H-NMR (CDCl$_3$): δ=0.80 (t, 12 H, 4 CH$_3$), 1.28 (m$_c$, 32 H, 16 CH$_2$, 1.90 (m$_c$ 4 H, 4 α-CH$_2$), 2.27 (m$_c$ 4 H, 4 α-CH$_2$), 5.18 (m$_c$ 2 H, 2 NCH), 8.22 (d, $^3$J=7.9 Hz, 4 H, perylene), 8.38 (d, $^3$J=7.9 Hz, 4 H perylene), 8.45 (d, $^3$J=7.9 Hz, 4 H, perylene), 8.61 (s br., 4 H, perylene.). —$^{13}$C-NMR (CDCl$_3$): δ=14.02, 22.58, 27.02, 29.21, 31.76, 32.36, 54.88, 122.21, 122.55, 123.56, 124.24 br., 125.82, 126.09, 129.03, 129.40, 131.01 br., 131.73 br., 132.10, 133.43, 135.15, 159.98, 163.21 br., 164.31 br.. —UV (CHCl$_3$): $\lambda_{max}$(ε)=535 nm (241 800), 496 (97 700), 462 (29 600). —Fluorescence (CHCl$_3$): $\lambda_{max}$=540 nm, 581. —Solid-state fluorescence: $\lambda_{max}$=530 nm, 637. —MS (70 eV): m/z (%) :1143 (0.8), 1142 (1.3) [M$^+$], 962 (1.3), 961 (2.7), 960 (1.2) [M$^+$—C$_{13}$H$_{26}$], 780 (1.7), 779 (5.4), 778 (6.3) [M$^+$—C$_{13}$H$_{26}$—C$_{13}$H$_{26}$], 572

(0.9), 392 (1.8), 391 (8), 390 (14), 373 (2), 345 (1), 182 (52) [$C_{13}H_{26}{}^+$]. —$C_{74}H_{70}N_4O_8$ (1143.4): calculated C 77.73, H 6.17, N 4.90; found C 77.61, H 6.20, N 4.89.

Example 27

$N^2$, $N^2$-Bis(1-heptyl-octyl)-$N^1$,$N^1$-bis(perylene-3, 4:9,10-bis(dicarboximide))

200 mg (0.33 mmol) of N-(1-heptyl-octyl)-perylene-3, 4:9,10-tetracarboxylic acid 3,4-anhydride-9,10-imide, 200 mg (0.32 mmol) of N-(1-heptyl-octyl)-perylene-3,4:9,10-tetracarboxylic acid 3,4-hydrazide-9,10-imide and 1 g of imidazole are heated at 140° C. for 1 h with stirring. The reaction mixture is suspended in 50 ml ethanol, 100 ml of 2 N hydrochloric acid are then added, and the mixture is stirred for 2 h at room temperature. After filtering off with suction, washing (methanol) and drying the precipitate (2 h at 100° C.), the crude product is purified by column chromatography on aluminium oxide (column 30×4 cm) and then silica gel using chloroform/1-butanol (40+1) as eluant. The dye solution obtained is filtered using a D4 frit, methanol is added, and the mixture is concentrated in a rotary evaporator and dried in vacuo (0.1 torr) at 50° C. for 8 h. Yield 110 mg (29%). —$R_f$ (silica gel/$CHCl_3$/1-butanol (40+1))=0.40. —IR (KBr): ν=2955 $cm^{-1}$ (m), 2926 (m), 2856 (m), 1735 (w), 1717 (m), 1699 (s), 1658 (m), 1618 (w), 593 (s), 1579 (m), 1510 (w), 1455 (w), 1431 (w), 1404 (m), 1354 (m), 1333 (s), 1252 (m), 1204 (w), 1174 (m), 1130 (w), 1110 (w), 970 (w), 855 (w), 810 (m), 741 (m). —$^1$H-NMR ($CDCl_3$): δ=0.80 (t, 12 H, 4 $CH_3$), 1.28 ($m_c$, 40 H, 20 $CH_2$), 1.92 ($m_c$, 4 H, 4 α-$CH_2$), 2.27 ($m_c$, 4 H, 4 α-$CH_2$), 5.20 ($m_c$, 2 H, 2 NCH), 8.23 (d, $^3$J=8.1 Hz, 4 H, perylene), 8.39 (d, $^3$J=7.9 Hz, 4 H, perylene), 8.46 (d, $^3$J=7.7 Hz, 4 H, perylene), 8.63 (s br., 4 H, perylene). —$^{13}$C-NMR ($CDCl_3$): δ=14.03, 22.58, 27.07, 29.23, 29.51, 31.79, 32.36, 54.88, 122.23, 122.57, 123.57, 124.24 br., 125.85, 126.13, 129.06, 129.44, 131.04 br., 131.76 br., 132.12, 133.47, 135.18, 160.00, 163.25 br., 164.29 br.. —UV ($CHCl_3$): $\lambda_{max}$(ε)=535 nm (241 700), 496 (97 800), 462 (29 700). —Fluorescence ($CHCl_3$): $\lambda_{max}$=539 nm, 580. —Solid-state fluorescence: $\lambda_{max}$=534 nm, 624. —MS (70 eV); m/z (%) : 1199 (0.3), 1198 (0.3) [$M^+$], 990 (0.5), 989 (1), 988 (0.4) [$M^+$—$C_{15}H_{30}$], 780 (1), 779 (2), 778 (3) [988 —$C_{15}H_{30}$], 601 (0.2), 600 (0.6), 583 (0.2), 403 (0.3), 396 (0.2), 393 (0.2), 392 (0.6), 391 (4), 390 (5), 374 (0.2), 373 (0.8), 346 (0.3), 345 (0.5), 210 (64) [$C_{15}H_{30}{}^+$]. —MS (FAB, 3-NBA); m/z (%) :1200 (2), 1199 (3), 1198 (1) [$M^+$], 1197 (2), 990 (15), 989 (21) [$M^+$+1 —$C_{15}H_{30}$], 779 (14), 778 (21) [$M^+$—2 $C_{15}H_{30}$], 403 (15), 392 (31), 391 (100), 390 (48), 375 (24), 373 (31), 346 (30), 345 (25), 300 (11), 275 (18), 274 (11), 250 (9). —$C_{78}H_{78}N_4O_8$ (1199.5): calculated C 78.10, H 6.55, N 4.67; found C 78.28, H 6.79, N 4.72.

Example 28

$N^2$,$N^2$-Bis(1-octyl-nonyl)-$N^1$, $N^1$-bis(perylene-3,4:9, 10-bis(dicarboximide))

0.14 g (0.22 mmol) of N-(1-octyl-nonyl)-perylene-3,4:9, 10-tetracarboxylic acid 3,4-anhydride-9,10-imide, 0.10 g (0.16 mmol) of N-(1-octyl-nonyl)-perylene-3,4:9,10-tetracarboxylic acid 3,4-hydrazide-9,10-imide and 1 g of imidazole are heated at 140° C. for 1 h with stirring. The still-hot solution is carefully diluted with approximately 10 ml of ethanol, and the flask contents are poured with several portions of ethanol into 100 ml of 2 N hydrochloric acid. The mixture is stirred for 2 h at room temperature, and the resulting precipitate is filtered off with suction and washed repeatedly with methanol. The crude product so obtained is dried at 100° C. for 8 h (yield 220 mg). In order to remove unreacted monoimide monoanhydride and other secondary products, the crude product is filtered through a short column (aluminium oxide/chloroform/1-butanol (40+1)). The product is further purified by column chromatography on silica gel using chloroform/1-butanol (40+1) as eluant. Traces of impurities are removed by further chromatography on silica gel/-chloroform (column 20×4 cm). The resulting dye fraction is filtered using a D4 frit to remove solid matter (dust, silica gel), methanol is added and the mixture is concentrated in a rotary evaporator and dried at 50° C. for 8 h under an oil-pump vacuum. Yield 110 mg (56%). —$R_f$ (silica gel/$CHCl_3$/1-butanol (40+1))=0.42. —IR (KBr): ν=2954 $cm^{-1}$ (m), 2925 (s), 2854 (m), 1738 (w), 1717 (s), 1699 (s), 1660 (s), 1616 (w), 1594 (s), 1579 (m), 1510 (w), 1465 (w), 1460 (w), 1430 (w), 1404 (m), 1354 (m), 1332 (s), 1253 (m), 1204 (w), 1174 (m), 1130 (w), 1112 (w), 970 (w), 855 (w), 810 s, 800 (w), 741 (m). —$^1$H-NMR ($CDCl_3$): δ=0.80 (t, 12 H, 4 $CH_3$),1.28 ($m_c$, 48 H, 24 $CH_2$), 1.92 ($m_c$, 4 H, 4 α-$CH_2$), 2.26 ($m_c$, 4 H, 4 α-$CH_2$), 5.20 ($m_c$, 2 H, 2 NCH), 8.22 (d, $^3$J=7.6 Hz, 4 H, perylene), 8.38 (d, $^3$J=8.1 Hz, 4 H, perylene), 8.45 (d, $^3$J=7.7 Hz, 4 H, perylene), 8.63 (s br., 4 H, perylene). —$^{13}$C-NMR ($CDCl_3$): δ=14.04, 22.60, 27.07, 29.25, 29.53, 29.56, 31.80, 32.36, 54.89, 122.22, 122.55, 123.57, 124.24 br., 125.83, 126.11, 129.04, 129.41, 131.00 br., 131.71 br., 132.11, 133.44, 135.16, 159.99, 163.22 br., 164.30 br.. —UV ($CHCl_3$): $\lambda_{max}$ (ε)=535 nm (242 000), 496 (98 300), 463 (30 000). —UV ($CHCl_3$): $\lambda_{max}$(ε)=530 nm (242 000), 492 (96 700), 459 (27 100). —UV (toluene): $\lambda_{max}$ (ε)=536 nm (209 700), 497 (87 300), 463 (26 500). —UV ($H_2SO_4/SO_3$ (65%)): $\lambda_{max}$(ε)=700 nm (91 600), 661 (235 400), 610 (77 200), 436 (33 000). —Fluorescence ($CHCl_3$): $\lambda_{max}$=539 nm, 580. —Fluorescence (THF): $\lambda_{max}$=533 nm, 575. —Fluorescence (toluene): $\lambda_{max}$=541 nm, 583. —MS (70 eV); m/z (%): 1255 (1), 1254 (2) [$M^+$], 1018 (3), 1017 (3), 1016 (2) [$M^+$—$C_{17}H_{34}$], 780 (4), 779 (8), 778 (8) [$M^+$—$C_{17}H_{34}$ —$C_{17}H_{34}$), 628 (4), 392 (10), 391 (40), 390 (72), 373 (8), 346 (4), 345 (4), 238 (35) [$C_{17}H_{34}{}^+$]. —$C_{82}H_{86}N_4O_8$ (1255.6): calculated C 78.44, H 6.90, N 4.46; found C 78.45, H 7.08, N 4.43.

Example 29

$N^2$, $N^2$-Bis(1-nonyl-decyl)-$N^1$,$N^1$-bis(perylene-3, 4:9,10-bis(dicarboximide))

710 mg (1.08 mmol) of N-(1-nonyl-decyl)-perylene-3, 4:9,10-tetracarboxylic acid 3,4-anhydride-9,10-imide, 70 mg (0.54 mmol) of hydrazinium sulfate 147 and 5 g of imidazole are maintained at 140° C. for 2 h. Before it cools, the reaction mixture is diluted with approximately 40 ml of ethanol and is then introduced into 200 ml of 2 N hydrochloric acid. After 2 h, the resulting precipitate is filtered off with suction, washed with methanol and dried at 100° C. for 8 h in a drying cabinet. The crude product is purified by column chromatography on aluminium oxide (column 60×3 cm)/chloroform/1-butanol (40+1) and then silica gel/ chloroform/1-butanol (40+1). High-purity purification is effected by chromatography on silica gel/absolute chloroform, the product being adsorbed in the first portion of the column while small impurities can be eluted. The bichromophoric dye is then diluted with the eluant mixture chloroform/1-butanol (40+1), further impurities remaining behind on the column. The resulting dye fraction is filtered using a D4 frit to remove solid ingredients (silica gel, dust), methanol is added, the solvent mixture is distilled off, and the residue is dried for 8 h at 50° C./0.1 torr. Yield 220 mg (31%). —$R_f$ (silica gel/$CHCl_3$+1-butanol (40+1))=0.21. —IR (KBr): ν=2955 $cm^{-1}$ (m), 2925 (m), 2851 (m), 1735 (w), 1716 (m br.), 1699 (s), 1660 (s), 1593 (s), 1578 (m), 1510 (w), 1465 (w), 1430 (w), 1404 (m), 1351 (w), 1333 (s), 1253 (m), 1205 (w), 1174 (w), 1130 (w), 965 (w), 855 (w), 810 (m), 795 (w), 740 (m), 725 (w). —$^1$H-NMR($CDCl_3$):

δ=0.81 (t, 12 H, 4 CH$_3$),1.24 (m$_c$, 56 H, 28 CH$_2$),1.89 (m$_c$, 4 H, 4α-CH$_2$), 2.24 (m$_c$, 4 H, 4α-CH$_2$), 5.19 (m$_c$, 2 H, 2 NCH), 8.57 (d, $^3$J=8.2 Hz, 4 H, perylene), 8.61 (d, $^3$J=8.1 Hz, 4 H, perylene), 8.69 (d, $^3$J=7.9 Hz , 8 H, perylene). —$^{13}$C-NMR(CDCl$_3$): δ=14.04, 22.61, 27.07, 29.25, 29.55, 29.57, 31.84, 32.36, 54.89, 122.25, 122.57, 123.57, 124.25 br., 125.86, 126.15, 129.07, 129.45, 131.03 br., 131.75 br., 132.13, 133.47, 135.19, 160.00, 163.27 br., 164.31 br.. —UV (CHCl$_3$): λ$_{max}$ (ε)=534 nm (239 200), 496 (97 000), 462 (29 800). —Fluorescence (CHCl$_3$): λ$_{max}$=538 nm, 580. —Solid-state fluorescence: λ$_{max}$=534 nm, 636. —MS (70 eV): m/z (%): 1312 (0.4), 1311 (0.4) [M$^+$+1], 1309 (0.1) [M$^+$−1], 1293 (0.1), 1047 (0.5), 1046 (1), 1045 (2), 1044 (1), 1028 (0.2), 1027 (0.3), 780 (3), 779 (7), 778 (6), 761 (1), 656 (4), 639 (2), 529 (1), 417 (1), 415 (1), 404 (2), 403 (4), 393 (4), 392 (20), 390 (64), 389 (100), 373 (13), 345 (9), 274 (3), 266 (8) [C$_{19}$H$_{38}$$^+$]. —C$_{86}$H$_{94}$N$_4$O$_8$ (1311.7): calculated C 78.75, H 7.22, N 4.27; found C 78.75, H.7.26, N 4.10.

Example 30

N$^2$N$^2$-Bis(1-hexyl-heptyl)-N$^2$,N$^2$-bis(perylene-3,4:9, 10-bis(dicarboximide))

1.10 g (2.00 mmol) of N-(2-methyl-5-tert-butylphenyl)-perylene-3,4:9,10-tetracarboxylic acid 3,4-anhydride-9,10-imide are stirred with 50 mg (1.00 mmol) of hydrazine hydrate in imidazole for one hour at 140° C. The reaction is terminated by the addition of 50 ml of ethanol and the suspension is stirred for two hours in 200 ml of 2 N hydrochloric acid. The precipitated crude product is filtered off with suction, washed with bidistilled water and dried. Yield 1.1 g of crude product. For purification, 400 mg of the crude product are first filtered through an aluminium oxide column (30×4 cm) using chloroform, only 100 mg of crude product being used per column on account of its poor solubility. That amount can readily be dissolved in chloroform by heating. Subsequently, chromatography is carried out on a silica gel column (20×4 cm) using chloroform, the product remaining adsorbed at the beginning of the column. After the impurities have been washed out, the product is eluted by a change in the eluant (chloroform/1-butanol (40+1)). The prepurified phases are finally chromatographed on a silica gel column using chloroform/1-butanol (40+1), it being possible for the main fraction to be separated off from fluorescent first runnings. After evaporating off the solvent mixture, the product is dried at 100° C. Yield 150 mg (38%), melting point>350° C. —R$_f$ (silica gel/CHCl$_3$/ethanol (10+1))=0.84. —R$_f$ (aluminium oxide/—CHCl$_3$/ethanol (10+1))=0.97. —R$_f$ (silica gel/CHCl$_3$/1-butanol (40+1))=0.04. —IR (KBr): ν=2963 cm$^{-1}$ (m), 2920 (w), 1707 (s), 1670 (s), 1616 (m), 1593 (s), 1579 (m), 1506 (m), 1429 (m), 1403 (m), 1354 (m), 1336 (s), 1252 (m), 1198 (m), 1176 (m), 1125 (m), 970 (m), 960 (m), 850 (m), 830 (w), 810 (s), 798 (m), 755 (w), 741 (m), 725 (w), 680 (w), 662 (m), 502 (w), 487 (m), 475 (w), 425 (w). —$^1$H-NMR (CDCl$_3$): δ=1.34 (s, 18 H, 2 C(CH$_3$)$_3$), 2.17 (s, 6 H, 2 CH$_3$), 7.23 (d, $^4$J=1.9 Hz, 2 H, aromatic), 7.35 (d, $^3$J=8.3 Hz, 2 H, aromatic), 7.44 (dd, $^3$J=8.3 Hz, $^4$J=1.9 Hz, 2 H, aromatic), 8.75 (m$_c$, 16 H, perylene). —$^{13}$C-NMR (CDCl$_3$): δ=17.21, 31.34, 34.53, 122.47, 123.02, 123.78, 125.39, 126.39, 129.59, 130.68, 131.77, 132.33, 132.45, 133.83, 134.22, 135.36, 150.29, 160.07, 163.02. —UV (CHCl$_3$): λ$_{max}$ (ε)=535 nm (250 200), 495 (100 600), 462 (30 700), (the specimen is prepared 24 h before the measurement on account of only moderate solubility). —Fluorescence (CHCl$_3$): λ$_{max}$=540 nm, 580. —MS (70 eV): m/z (%): 1071 (2), 1070 (6) [M$^+$], 1069 (9), 1056 (23), 1055 (70) [M$^+$—CH$_3$], 1054 (100), 1053 (26) [M$^+$—OH], 1052 (31), 1039 (3), 1038 (4) [1055 —OH], 1037 (9), 999 (14), 998 (20) [M$^+$—CH$_3$—C$_4$H$_9$], 997 (27), 522 (26), 521 (71), 520 (13), 520 (22), 519 (18), 503 (14), 463 (28), 462 (12), 373 (11), 345 (12), 131 (15), 91 (16) [C$_6$H$_4$—CH$_3$$^+$]. —C$_{70}$H$_{46}$N$_4$O$_8$ (1071.2): calculated C 78.49, H 4.33, N 5.23; found C 77.79, H 4.53, N 5.11.

Example 31

N$^2$-(2-Methyl-5-tert-butylphenyl)-N$^2$-(1-octyl-nonyl)-N$^1$,N$^1$-bis(perylene-3,4:9,10-bis (dicarboximide))

150 mg (0.23 mmol) of N-(1-octyl-nonyl)-perylene-3,4:9,10-tetracarboxylic acid 3,4-hydrazide-9,10-imide and 150 mg (0.28 mmol) of N-(2-methyl-5-tert-butyl-phenyl)-perylene-3,4-anhydride-9,10-imide are reacted at 140° C. in 1 g of imidazole. The reaction is monitored by thin-layer chromatography (aluminium oxide/chloroform+1-butanol (40+1)) and terminated after 2 h by the addition of 10 ml of ethanol. The suspension is poured with several portions of ethanol into 100 ml of 2 N hydrochloric acid and the mixture is stirred for 2 h at room temperature. The precipitate is filtered off, washed with methanol and dried for 2 h at 100° C. (yield 280 mg). In order to remove excess monoimide monoanhydride, the crude product is chromatographed on aluminium oxide (column 30×4 cm)/chloroform/1-butanol (40+1). Further purification is carried out by column chromatography with silica gel/chloroform/1-butanol (40+1) (column 60×3 cm), and silica gel/toluene/acetone (10+1). The dye fraction so obtained is filtered using a D4 frit to remove solid components (silica gel), methanol is added, the solvent mixture is removed and the residue is dried for 8 h at 60° C./0.1 torr. Yield 110 mg (41%). —R$_f$ (silica gel/CHCl$_3$+1-butanol (40+1))=0.30. —IR (KBr): ν=2953 cm$^{-1}$ (m), 2926 (m), 2854 (m), 1738 (w), 1718 (s sh), 1708 (s br.), 1662 (m), 1618 (w), 1593 (s), 1581 (m), 1515 (w), 1429 (w), 1403 (m), 1354 (m), 1334 (s), 1253 (m), 1201 (w), 1175 (m), 1130 (w), 973 (w), 960 (w), 855 (w), 810 (m), 800 (m), 755 (w), 741 (m), 730 (w), 661 (w). —$^1$H-NMR (CDCl$_3$): δ=0.79 (t, 6 H, 2 CH$_3$), 1.19 (m$_c$, 24 H, 12 CH$_2$), 1.32 (s, 9 H, C(CH$_3$)$_3$), 1.91 (m$_c$, 2 H, 2 α-CH$_2$), 2.20 (m$_c$, 5 H, 2 α-CH$_2$, aryl-CH$_3$), 5.18 (m$_c$, 1 H, NCH), 7.31 (d, 2 H, aromatic), 7.41 (d, $^3$J=7.9 Hz, 1 H, aromatic), 8.45 (m$_c$, 14 H, perylene), 8.72 (d, $^3$J=7.7 Hz, 2 H, perylene). —$^{13}$C-NMR (CDCl$_3$): δ=14.05, 17.21, 22.60, 27.04, 29.24, 29.51, 29.67, 31.35, 31.80, 32.35, 34.54, 54.90, 122.31, 122.45, 122.90, 123.65, 123.76, 125.42, 126.00, 126.26, 126.37, 129.54, 130.67, 131.79, 132.16, 132.32, 132.46, 133.63, 133.85, 134.15, 150.28, 159.99, 160.11, 163.00. —UV (CHCl$_3$): λ$_{max}$ (ε)=535 nm (240 500), 496 (97 000), 463 (29 500). —Fluorescence (CHCl$_3$): λ$_{max}$=537 nm, 580. —Solid-state fluorescence: λ$_{max}$=532 nm, 575, 625. —MS (70 eV); m/z (%): 1163 (0.2), 1162 (0.2) [M$^+$], 1145 (0.1) [M$^+$—OH], 925 (0.7), 924 (0.5) [M$^+$—C$_{17}$H$_{34}$], 910 (0.6), 909 (0.9) [924 —CH$_3$], 852 (0.1), 851 (0.3), 779 (0.2), 778 (0.2) [924 -C$_{11}$H$_{14}$], 629 (0.8), 628 (2), 611 (1), 537 (1), 536 (3), 522 (5), 521 (15), 519 (3), 466 (1), 463 (3), 403 (1), 393 (1), 392 (5), 391 (17), 390 (29), 374 (1), 373 (3), 346 (2), 345 (2), 238 (61) [C$_{17}$H$_{34}$$^+$]. —MS (FAB, 3-NBA); m/z (%): 1164 (12), 1163 (13), 1162 (5) [M$^+$], 1161 (3), 1148 (1), 1147 (81), [M$^+$—CH$_3$], 926 (3), 925 (4), 924 81) [M$^+$—C$_{17}$H$_{34}$], 909 (1) [924 —CH$_3$], 868 (1) [924 —C$_4$H$_9$], 613 (1), 537 (1), 535 (1), 523 (1) 522 (2). —C$_{76}$H$_{66}$N$_4$O$_8$ (1163.4): calculated C 78.46, H 5.72, N 4.82; found C 78.13, H 6.13, N 4.59.

Example 32

Reaction of N$^2$,N$^2$-bis(1-hexyl-heptyl)-N$^1$,N$^1$-bis (perylene-3,4:9,10-bis-(dicarboximide) with Hydrazine Hydrate 60 mg (0.05 mmol) of N$^2$,N$^2$-bis(1-hexyl-heptyl)-N$^1$,N$^1$-bis(perylene-3,4:9,10-bis(di-carboximide) are boiled at reflux in 15 ml of tert-butyl alcohol with 0.5 ml (1.0 mmol) of hydrazine hydrate. The reaction is monitored by thin-layer chromatography (silica gel/-chloroform/ethanol (10+1)) and terminated after 90 min by the dropwise addition of 100 ml of 2 N hydrochloric acid. Only traces of the starting material are then detectable. The single product is a non-fluorescent dye in virtually quantitative yield. After 30 minutes' stirring, the resulting precipitate is filtered off and washed repeatedly with distilled water and once with ethanol and dried overnight at 100° C. in a drying cabinet. The product is identified as N-(1-hexyl-heptyl)-perylene-3,4:9,10-tetracarboxylic acid 3,4-hydrazide-9,10-imide on the basis of the spectroscopic data (IR, $^1$H-NMR, MS, qual. UV).

Example 33

Reaction of N,N'-bis(1-hexyl-heptyl)-perylene-3, 4:9,10-bis(dicarboximide) with Hydrazine Hydrate 150 mg (0.20 mmol) of N,N'-bis(1-hexyl-heptyl)-perylene-3,4:9,10-bis(dicarboximide) are boiled at reflux in 20 ml of tert.-butyl alcohol with 0.5 ml (1.0 mmol) of hydrazine hydrate. The reaction is monitored by thin-layer chromatography (A: silica gel/chloroform/ethanol (10+1), B: silica gel/chloroform). After 2 h the reaction is terminated.

Example 34

Hydrolysis of $N^2,N^2$-bis(1-hexyl-heptyl)-$N^1,N^1$-bis (perylene-3,4:9,10-bis(dicarboximide)) with KOH in Tert-butanol 0.10 g (1.60 mmol) of potassium hydroxide (85%) is added with vigorous stirring to 0.30 g (0.26 mmol) of $N^2,N^2$-bis(1-hexyl-heptyl)-$N^1,N^1$-bis(perylene-3,4:9,10-bis (dicarboximide) in 10 ml of boiling tert-butyl alcohol, whereupon a change in colour to deep-red is observed. The reaction is very difficult to monitor by thin-layer chromatography (silica gel/chloroform/ethanol (10+1); silica gel/chloroform/glacial acetic acid (10+1)), since the products give very broad unstructured bands in the eluants used. After 25 min, however, the starting material can scarcely be detected. The reaction is consequently terminated by the careful dropwise addition of 50 ml of glacial acetic acid. The suspension is introduced into 150 ml of 2 N hydrochloric acid, and then stirred for a further 1 h at room temperature. A further thin-layer chromatogram (silica gel/chloroform/ethanol (20+1)) proves that two main products have been formed. These can be separated by chromatography (silica gel/chloroform/ethanol (20+1)) and one of the products can be identified as N-(1-hexyl-heptyl)-perylene-3,4:9,10-tetracarboxylic acid 3,4-hydrazide-9,10-imide.

(D) Preparation of Trifluorophoric Compounds

Example 35

Bis[(N-(1-nonyl-decyl)-perylene-3,4:9,10-bis (dicarboximid)-N'-yl]-perylene-3,4:9,10-bis (dicarboximide)

300 mg (0.45 mmol) of N-(1-nonyl-decyl)-perylene-3, 4:9,10-tetracarboxylic acid 3,4-hydrazide-9,10-imide, 90 mg (0.23 mmol) of perylenetetracarboxylic acid bisanhydride, 50 mg (0.23 mmol) of zinc acetate dihydrate and 3 g of imidazole are stirred at 140° C. for 2 h. The reaction mixture is transferred with a total of 50 ml of ethanol into 150 ml of 2 N hydrochloric acid, and the mixture is then stirred for 2 h at room temperature. The resulting precipitate is separated off using a D4 frit, washed (water/methanol) and dried overnight at 110° C. Yield 0.35 g (89%). The crude product is chromatographed twice on silica gel/chloroform/ethanol (20+1), secondary products being separated off with the first runnings. The further purification is carried out on silica gel/toluene/glacial acetic acid (15+1). A portion of the dye remains securely adsorbed on the column material, while deep-coloured first runnings is separated off and is discarded without further investigation. Since the run-off is almost colourless, the eluant mixture is changed to chloroform/1-butanol (40+1)/flash chromatography, a pure dye fraction being isolated. This is filtered using a D4 frit, methanol is added and then the solvent mixture is removed. The product has to be very carefully dried under a fine vacuum at temperatures of from 80 to 100° C. Yield 0.03 g (8%). —$R_f$ (silica gel/CHCl$_3$+ 1-butanol (40+1))=0.37. —IR (KBr): $v$=3080 cm$^{-1}$ (w), 2925 (s), 2854 (m), 1738 (m), 1718 (s br.), 1698 (s br.), 1660 (s), 1615 (w), 1592 (s), 1580 (s), 1508 (w), 1482 (w), 1465 (w), 1428 (m), 1403 (s), 1353 (m), 1329 (s), 1252 (s), 1202 (m), 1174 (m), 1126 (m), 970 (m), 962 (m), 852 (m), 830 (w), 810 (s), 800 (m), 796 (m), 755 (w), 739 (m), 723 (m), 663 (m). —$^1$H-NMR (C$_2$D$_2$Cl$_4$/87° C.): $\delta$=0.81 (t, 12 H, 4 CH$_3$), 1.28 (m$_c$, 56 H, 28 CH$_2$), 1.90 (m$_c$, 4 H, 4 α-CH$_2$), 2.23 (m$_c$, 4 H, 4 α-CH$_2$), 5.16 (m$_c$, 2 H, 2 NCH), 8.47 (m$_c$, 12 H, perylene), 8.59 (d, $^3$J=7.5 Hz, 4 H, perylene), 8.63 (d, $^3$J=7.8 Hz, 4 H, perylene), 8.79 (d, $^3$J=7.9 Hz, 4 H, perylene). —$^{13}$C-NMR (C$_2$D$_2$Cl$_4$): $\delta$=14.05, 24.88, 29.20, 31.48, 31.76, 31.90, 34.05, 34.48, 57.03, 124.27, 124.81, 125.23, 126.03, 134.60, 162.63. (despite a measurement duration of 22 000 pulses at a measurement frequency of 150 MHz no further signals emerge above the noise). —UV (CHCl$_3$): $\lambda_{max}$ ($\epsilon$)=538 nm (422 100), 497 (139 500), 463 (43 000). —UV (CHCl$_3$): $\lambda_{max}$ ($\epsilon$)=538 nm (419 500), 497 (135 800), 463 (41 300) (control measurement!). —Fluorescence (CHCl$_3$): $\lambda_{max}$=544 nm, 584. —MS (FAB, 3-NBA); m/z (%): 1701 (0.1), 1700 (0.1), 1699 (0.02), 1698 (0.02) [M$^+$], 1434 (0.3), 1433 (0.3), 1432 (0.04) [M$^+$—C$_{19}$H$_{38}$], 1168 (0.2), 1167 (0.2), 1166 (0.1) [1432 —C$_{19}$H$_{38}$], 1046 (0.1), 1045 (0.1), 1044 (0.1), 1043 (0.1), 780 (0.8), 779 (1), 778 (0.5), 764 (0.5), 750 (0.6), 735 (0.4), 734 (0.5), 391 (17), 390 (6), 373 (6), 345 (5). —The molecular weight of the trifluorophoric dye is in addition confirmed by gel permeation chromatography (GPC). —C$_{110}$H$_{102}$N$_6$O$_{12}$ (1700.1): calculated C 77.72, H 6.05, N 4.94; found C 77.49, H 6.01, N 4.77.

Example 36

Bis[(N-(1-hexyl-heptyl)-perylene-3,4:9,10-bis (dicarboximid)-N'-yl]perylene-3,4:9,10-bis (dicarboximide)

0.30 g (0.51 mmol) of N-(1-hexyl-heptyl)-perylene-3,4:9, 10-tetracarboxylic acid 3,4-hydrazide-9,10-imide, 0.10 g (0.26 mmol) of perylenetetracarboxylic acid bisanhydride, 0.06 g (0.26 mmol) of zinc acetate dihydrate and 2 g of imidazole. Reaction time: 3.5 h at 150° C. Purification: chromatography on aluminium oxide/chloroform/ethanol (10+1) and chromatography on silica gel/toluene/glacial acetic acid (15+1), in the course of which a deep-coloured band is separated off and is discarded without closer examination. The main quantity of the product remains on the column and can be eluted with the eluant mixture chloroform/1-butanol (40+1) using slight excess pressure (flash chromatography). Yield 0.06 g (15%). —$R_f$ (silica gel/CHCl$_3$/1-butanol (40+1))=0.34. —IR (KBr): $v$=3065 cm$^{-1}$ (w), 2952 (m), 2927 (m), 2856 (m), 1738 (w), 1716 (s br.), 1698 (s br.), 1660 (s), 1616 (m), 1593 (s), 1580 (m), 1510 (w), 1460 (w), 1428 (m), 1403 (m), 1353 (m), 1329 (s), 1252 (m), 1202 (m), 1126 (m), 1108 (w), 965 (m), 852 (m), 810 (s), 796 (m), 762 (w), 738 (m), 725 (m), 663 (m).

—$^1$H-NMR ($C_2D_2Cl_4$, 90° C.): δ=0.87 (t, 12 H, 4 $CH_3$), 1.29 ($m_c$, 32 H,16 $CH_2$), 1.95 ($m_c$, 4 H, 4α-$CH_2$),2.27 ($m_c$, 4 H, 4 α-$CH_2$) 5.16 ($m_c$, 2 H, 2 NCH), 8.50 ($m_c$, 12 H, perylene), 8.61 (d, $^3$J=7.8 Hz, 4 H, perylene), 8.66 (d, $^3$J=7.5 Hz, 4 H, perylene), 8.78 (d, $^3$J=8.0 Hz, 4 H, perylene). —UV ($CHCl_3$): $\lambda_{max}$ (ε)=538 nm (416 900), 497 (135 000), 463 (38 500). —Fluorescence ($CHCl_3$): $\lambda_{max}$=543 nm, 583. —MS (FAB, 3-NBA); m/z (%): 1532 (0.1), 1531 (0.1), 1530 (0.1) [M$^+$], 1350 (0.6), 1349 (0.6), 1168 (0.4), 1167 (0.5), 1166 (0.2) [M$^+$—$C_{13}H_{26}$—$C_{13}H_{26}$], 961 (0.4), 779 (3), 391 (24), 390 (14), 373 (18), 345 (14). —The molecular weight of the trifluorophoric dye is in addition confirmed by gel permeation chromatography (GPC). —$C_{98}H_{78}N_6O_{12}$ (1531.7): calculated C 76.85, H 5.13, N 5.49; found C 75.91, H 5.04, N 5.67.

Example 37

Bis[(N-(1-heptyl-octyl)-perylene-3,4:9,10-bis (dicarboximid)-N'-yl]perylene-3,4:9,10-bis (dicarboximide)

0.24 g (0.37 mmol) of N-(1-heptyl-octyl)-perylene-3,4:9, 10-tetracarboxylic acid 3,4-hydrazide-9,10-imide and 0.07 g (0.18 mmol) of perylenetetracarboxylic acid bisanhydride are stirred in 5 g of imidazole for 4 h at an oil-bath temperature of 160° C. 50 ml of ethanol are carefully added to the still-warm reaction mixture, which is subsequently introduced into 200 ml of 2 N hydrochloric acid and stirred for 2 h at room temperature. The resulting precipitate is separated off using a glass frit, washed with water and dried overnight in air. Yield 0.25 g (88%). The crude product is filtered first through an aluminium oxide column (30×4 cm/chloroform/ethanol (20+1). Purification is carried out by chromatography on silica gel/chloroform/ethanol (20+1), in the course of which a portion of the secondary products is washed out whereas the product remains on the column. By changing the mobile phase (chloroform/ethanol (10+1)), the trichromophoric dye is eluted as a broad band. Interestingly, the dye band can then be separated into two fractions containing trichromophoric dyes (UV spectrum): by means of flash chromatography on silica gel/toluene/glacial acetic acid (15+1), one fraction is obtained as an intense red dye band while a second remains on the chromatography column. When the run-off is almost colourless, the eluant is changed (chloroform/1-butanol (40+1)/flash chromatography) and in that manner the second fraction is isolated. The two fractions are each filtered using a separate D4 frit, isolated, dried and characterised separately from one another, but all spectroscopic data of the two fractions are identical (UV, IR, GPC). The first fraction still has slight impurities only in the 600 MHz $^1$H-NMR spectrum. The two fractions also cannot be differentiated by thin-layer chromatography. —Yield 50 mg (1st fraction) (18%) and 110 mg (2nd fraction) (39%). Total yield 57%. —$R_f$ (silica gel/$CHCl_3$/ethanol (10+1))=0.88. —$R_f$ (silica gel/$CHCl_3$/ethanol (20+1))=0.17. —$R_f$ (silica gel/$CHCl_3$/1-butanol (40+1))=0.05. —IR (KBr): ν=2955 cm$^{-1}$ (m), 2926 (m), 2854 (m), 1732 (w sh), 1716 (s sh), 1698 (s), 1658 (m), 1616 (w), 1593 (s), 1579 (m), 1506 (w), 1458 (w), 1429 (w), 1403 (m), 1353 (m), 1330 (s), 1252 (m), 1203 (m), 1174 (m), 1126 (w), 970 (w), 855 (w), 810 (m), 800 (w), 796 (w), 739 (m), 725 (w), 663 (m). —$^1$H-NMR ($C_2D_2Cl_4$, 115 ° C.): δ=0.89 (t, 12 H, 4 $CH_3$), 1.35 ($m_c$, 40 H, 20 $CH_2$), 1.94 ($m_c$, 4 H, 4α-$CH_2$), 2.29 ($m_c$, 4 H, 4 α-$CH_2$) 5.18 ($m_c$, 2 H, 2 NCH), 8.53 ($m_c$, 12 H, perylene), 8.64 (d, $^3$J=8.1 Hz, 4 H, perylene), 8.69 (d, $^3$J=8.1 Hz, 4 H, perylene), 8.79 (d, $^3$J=8.0 Hz, 4 H, perylene). —UV ($CHCl_3$): $\lambda_{max}$ (ε)=537 nm (407 000), 497 (13 4000), 463 (41 600). —Fluorescence ($CHCl_3$): $\lambda_{max}$=544 nm, 583. —The molecular weight of the trifluorophoric dye is confirmed by gel permeation chromatograpy (GPC).

—$C_{102}H_{86}N_6O_{12}$ (1587.9): calculated C 77.15, H 5.46, N 5.29; found C 76.53, H 5.71, N 5.09. —The values of the first fraction are also listed, for the sake of completeness: $C_{102}H_{86}N_6O_{12}$ (1587.9): calculated C 77.15, H 5.46, N 5.29; found C 74.52, H 6.02, N 4.57.

(E) Preparation of a Formamide Ia According to the Invention

Example 38

N-(1-Heptyl-octyl)-N'-(N''-formamidyl)-perylene-3,4:9, 10-bis(dicarboximide) 0.23 g (0.38 mmol) of N-(1-heptyl-octyl)-perylene-3,4:9,10-tetracarboxylic acid 3,4-hydrazide-9,10-imide are covered with 20 ml of 99% formic acid and the batch is stirred at 70° C. for from 6 to 18 h. The starting material slowly dissolves. The progress of the reaction can be monitored by thin-layer chromatography (silica gel/chloroform/ethanol (10+1)). In addition, the fluorescence of the solution markedly increases. The reaction product is introduced into 200 ml of methanol/water (1+1) and stirred for 15 min. The resulting precipitate is washed neutral with a large amount of water and then dried at 100° C. for 1 h. Yield 0.25 g. The unstable product is obtained in a high degree of purity and can be used for further reactions. For the elemental analysis, however, the dye has to be purified by chromatography on silica gel/toluene/ethanol (10+1). As mentioned above, the dye is unstable. The eluant must therefore be distilled off in vacuo at the lowest possible water bath temperature. Yield 0.14 g (58%) after chromatography, melting point 339–341° C. —$R_f$ (silica gel/$CHCl_3$/ethanol=(10+1))=0.40. —$R_f$ (silica gel/toluene/ethanol=(10+1))=0.52. —IR (KBr): ν=3441 cm$^{-1}$ (s br.), 2958 (m), 2927 (m), 2855 (m), 1725 (m), 1700 (s br.), 1685 (m), 1660 (s), 1594 (s), 1579 (m), 1508 (w), 1460 (w), 1435 (w), 1405 (m), 1355 (m sh), 1347 (m), 1305 (w), 1255 (m br.), 1202 (w), 1176 (w), 855 (w), 809 (m), 800 (w), 740 (m). —$^1$H-NMR ($CDCl_3$): δ=0.81 (t, 6 H, 2 $CH_3$), 1.28 ($m_c$, 20 H, 10 $CH_2$), 1.90 ($m_c$, 2 H, 2 α-$CH_2$), 2.23 ($m_c$, 2 H, 2 α-$CH_2$), 5.15 ($m_c$, 1 H, NCH), 7.97 (s, 1 H, NH), 8.41 (d, J=8.1 Hz, 2 H, perylene), 8.46 (d, J=7.9 Hz, 2 H, perylene), 8.51 (d br., J=7.5 Hz, 2 H, perylene), 8.51 (s, 1 H, H—RC=O), 8.59 (s br., 2 H, perylene). —$^{13}$C-NMR ($CDCl_3$): δ=14.05, 22.60, 27.04, 29.21, 29.51, 31.79, 32.35, 55.05, 122.23, 122.92, 123.51, 129.27, 132.08, 133.66, 135.37, 158.87, 160.85. —UV ($CHCl_3$): $\lambda_{max}$ (ε)=527 nm (79 700), 490 (48 600), 460 (17 700). —Fluorescence ($CHCl_3$): $\lambda_{max}$=535 nm, 576. —MS (70 eV); m/z (%): 644 (8), 643 (22) [M$^+$], 616 (8), 615 (20) [M$^+$—CO], 601 (7), 600 (17), 505 (5), 435 (7), 434 (23), 433 (4) [M$^+$—$C_{15}H_{30}$], 418 (9), 407 (12), 406 (54), 405 (100) [615 —$C_{15}H_{30}$], 392 (7), 391 (33), 390 (58), 377 (6), 376 (25), 321 (8), 69 (5), 55 (6). —$C_{40}H_{41}N_3O_5$ (643.8): calculated C 74.63, H 6.42, N 6.53; found C 73.75, H 6.49, N 6.51.

FIG. 2 shows a comparison of the UV/visible spectra of the aminoperylene dye 2d (from Example 5) ($R^1$=1-octylnonyl) (—), of the perylene hydrazone 3 (from Example 8) ($R^1$=1—octylnonyl, $R^{16}$=H, $R^{17}$=$C_6H_5$) ( . . . ) and of the perylene bisimide of formula VI ($R^1$=$R^{18}$=1-octylnonyl) ( - - - ) in chloroform.

What is claimed is:

1. A perylene hydrazide imide of the general formula I

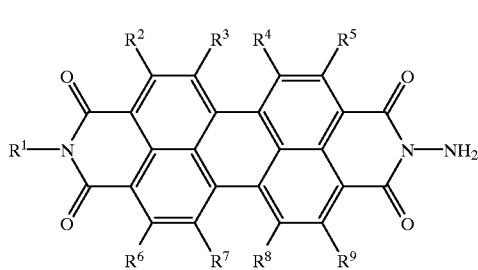

(I)

wherein $R^1$, $R^2$, $R^3$, $R^4$, $R^5$, $R^6$, $R^7$, $R^8$ and $R^9$ are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —$N=NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups; $C_3$- to $C_{24}$-cycloalkyl; $C_6$–$C_{10}$aryl or 5- to 7-membered heteroaryl; or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy; or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy.

2. A perylene hydrazone of the general formula II

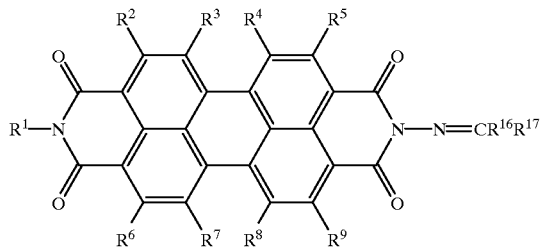

(II)

wherein $R^1$, $R^2$, $R^3$, $R^4$, $R^5$, $R^6$, $R^7$, $R^8$ and $R^9$ are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{12}$, —$SO_2NR^{11}R^{12}$, —$N=NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_1$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen: $C_1$–$C_{18}$alkyl that is unsubstituted or substituted by cyano or hydroxy groups; $C_3$- to $C_{24}$-cycloalkyl; $C_6$–$C_{10}$aryl or 5- to 7-membered heteroaryl: or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$ aryl or 5- to 7-membered heteroaryl, $R^{14}$ is hydrogen; $C_1$–$C_{18}$alkyl that is unsubstituted or substituted by cyano, hydroxy or $C_1$–$C_1$-alkoxycarbonyl; $C_3$- to $C_{24}$-cycloalkyl; $C_1$–$C_4$alkylaryl: $C_6$–$C_{10}$aryl that is unsubstituted or substituted by halogen. $C_1$–$C_4$alkyl or $C_1$–$C_4$alkoxy: or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy, wherein $R^{16}$ and $R^{17}$ are identical or different and have the meanings given for the radicals $R^2$ to $R^9$.

3. A process of the preparation of a perylene hydrazone II according to claim 2, which comprises reacting a perylene hydrazide imide I according to claim 1 with a carbonyl compound $R^{16}R^{17}C=O$.

4. A perylene-3,4:9,10-tetracarboxylic acid bisimide of formula III

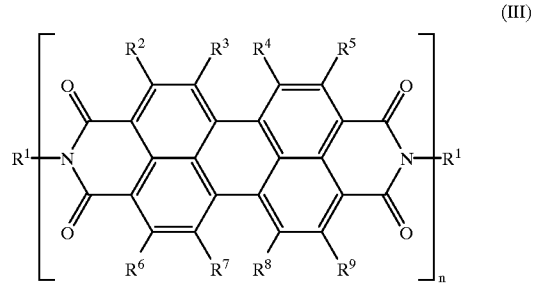

(III)

wherein the radicals $R^1$, $R^2$, $R^3$, $R^4$, $R^5$, $R^6$, $R^7$, $R^8$ and $R^9$ are as defined in claim 1 and n is 2 or 3, and wherein $R^1$ may alternatively be —$NH_2$.

5. A process for the preparation of a bifluorophoric perylene-3,4:9,10-tetracarboxylic acid bisimide of formula IIIa

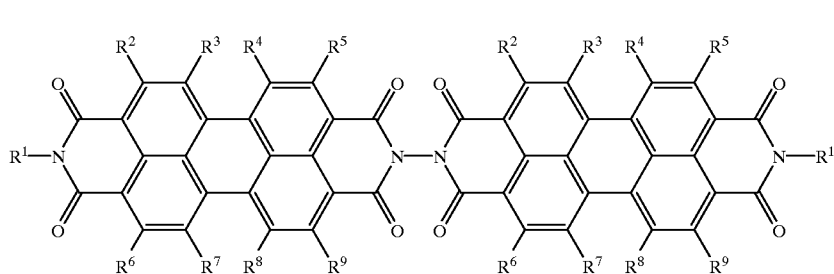
(IIIa)

by reaction of a perylenehydrazide imide I

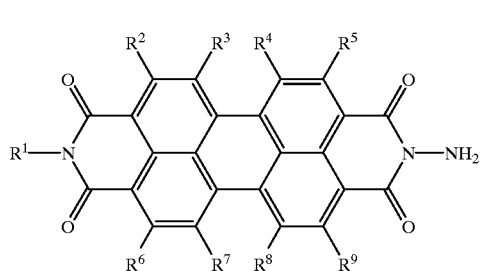
(I)

with an N-substituted perylene-3,4:9,10-tetracarboxylic acid 3,4-anhydride-9,10-imide V

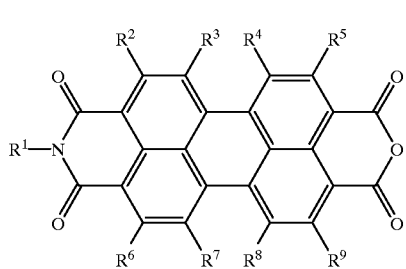
(V)

wherein $R^1$ to $R^9$ in formulae (IIIa), (I) and (V) are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$ $SO_2R^{13}$, —$SOR^{13}$, —$SO_2OR^{13}$, —$CONR^{11}R^{12}$, —$SO_2NR^{11}R^{12}$, —$N=NR^{15}$, —$OCOR^{13}$ and —$OCONHR^{13}$, it being possible for two adjacent radicals together to form a carbocyclic or heterocyclic ring wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen: $C_1$–$C_{18}$ alkyl that is unsubstituted or substituted by cyano or hydroxy groups: $C_3$- to $C_{24}$-cycloalkyl; $C_6$–$C_{10}$aryl or 5- to 7-membered heteroaryl: or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_2$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl: $C_1$–$C_4$alkylaryl: $C_6$–$C_{10}$aryl that is unsubstituted or substituted by halogen, $C_1$–$C_4$alkyl or $C_1$–$C_4$alkoxy: or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy.

6. A process for the preparation of a perylene derivative of formula IIIa

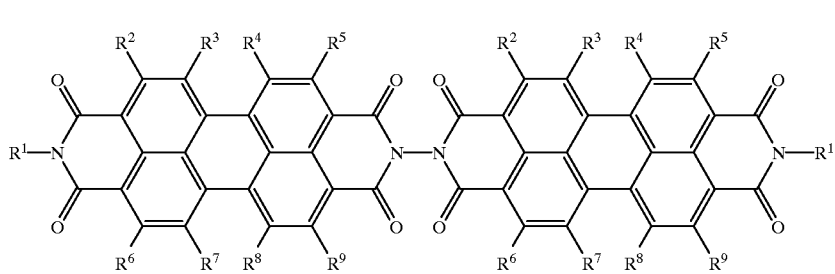
(IIIa)

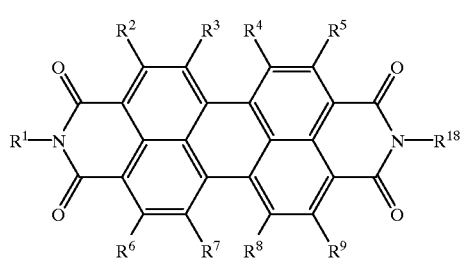

(VI)

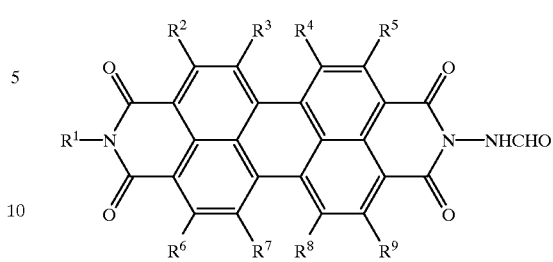

(Ia)

wherein $R^1$, $R^2$, $R^3$, $R^4$, $R^5$, $R^6$, $R^7$, $R^8$ and $R^9$ in formulae (IIIa) and (VI) are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —N=$NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups; $C_3$- to $C_{24}$-cycloalkyl: $C_6$–$C_{10}$aryl or 5- to 7-membered heteroaryl; or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$,alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy; or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy, wherein $R^{18}$ has the same meaning as $R^1$ but $R^1$ and $R^{18}$ need not necessarily carry the same substituents simultaneously.

7. A process for the preparation of a perylene derivative of formula IIIa with an N-substituted perylene-3,4:9,10-tetracarboxylic acid 3,4-anhydride-9,10-imide V

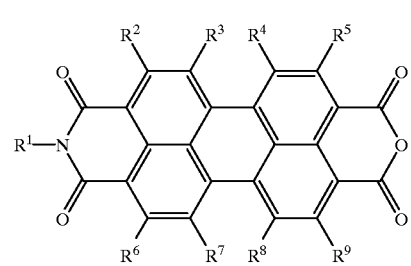

(V)

wherein $R^1$, $R^2$, $R^3$, $R^4$, $R^5$, $R^6$, $R^7$, $R^8$ and $R^9$ in formulae (IIIa), (Ia) and (V) are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —N=$NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups: $C_3$- to $C_{24}$-cycloalkyl; $C_6$–$C_{10}$aryl or 5- to 7-membered heteroaryl: or $R^{11}$ and $R^{12}$ together, or, optionally, with at least one of the other radicals $R^2$ to $R^9$ form a 5- or 6-membered heterocyclic ring, (IIIa)

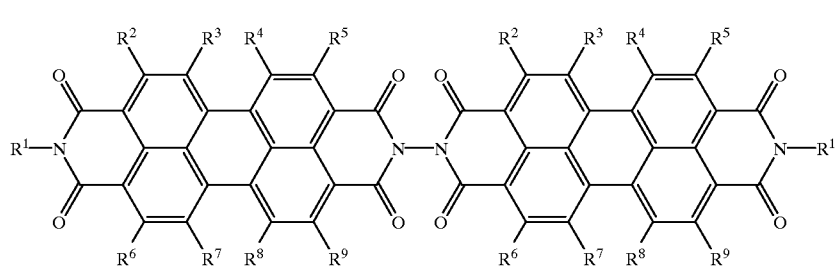

$R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy: or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy.

8. A formamide Ia

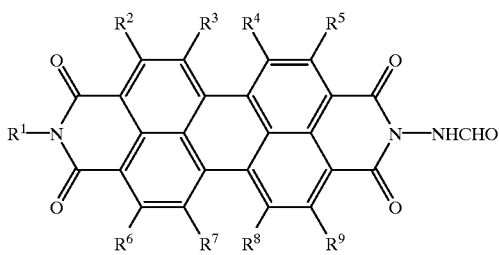

(Ia)

wherein the radicals $R^1$ to $R^9$ are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —N=$NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups; $C_3$- to $C_{24}$-cycloalkyl; $C_6$–$C_{10}$aryl or 5- to 7-membered heteroaryl; or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$-alkylaryl; $C_6$–$C_{10}$aryl that is unsubstituted or substituted by halogen, $C_1$–$C_4$alkyl or $C_1$–$C_4$alkoxy; or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy.

9. A process for the preparation of a formamide Ia according to claim 8 by reaction of a perylene hydrazide imide I

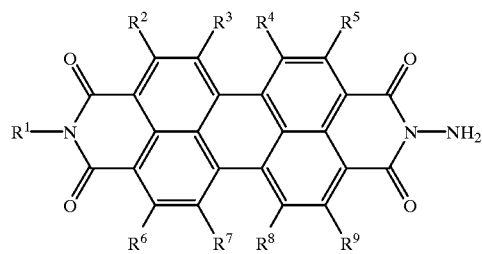

(I)

wherein $R^1$, $R^2$, $R^3$, $R^4$, $R^5$, $R^6$, $R^7$, $R^8$ and $R^9$ are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —N=$NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups; $C_3$- to $C_{24}$-cycloalkyl; $C_6$–$C_{10}$aryl or 5- to 7-membered heteroaryl; or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy; or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy, with formic acid or a formic acid derivative.

10. A process for the preparation of a trifluorophoric perylene-3,4:9,10-tetracarboxylic acid bisimide of formula IIIb

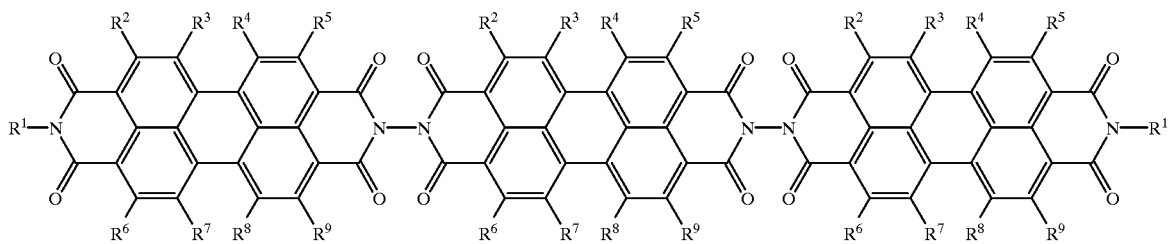

by reaction of a perylene hydrazide imide I

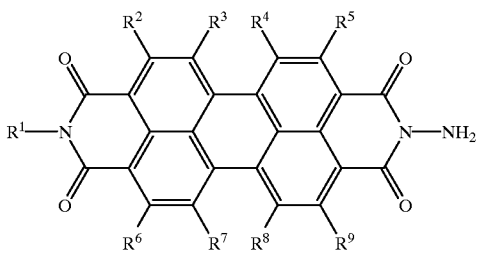

with a perylene-3,4:9,10-tetracarboxylic acid bisanhydride (VII)

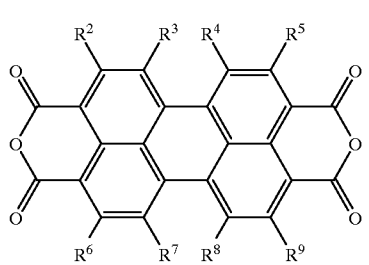

wherein $R^1$ to $R^9$ in formulae (IIIb), (I) and (VII) are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^3$, —$SO_2R^{13}$, —$SOR^{13}$, —$SO_2OR^{13}$, —$CONR^{11}R^{12}$, —$SO_2NR^{11}R^{12}$, —$N=NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups: $C_3$- to $C_{24}$-cycloalkyl; $C_6$–$C_{10}$aryl or 5- to 7-membered heteroaryl; or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy; or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy.

11. A process for the preparation of a perylene derivative of formula IIIb

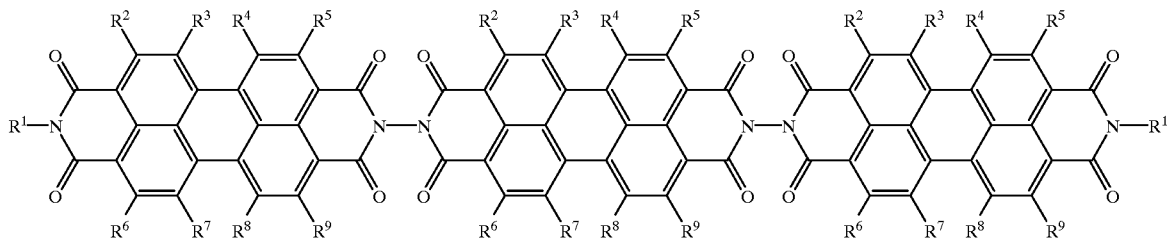

by reaction of a peryleneformamide (Ia)

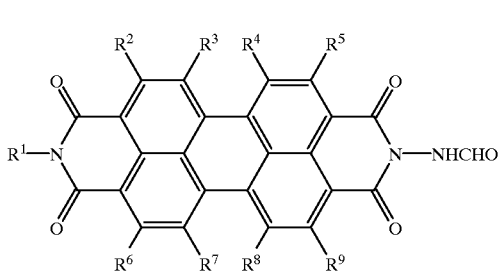

with a perylene-3,4:9,10-bisanhydride VII

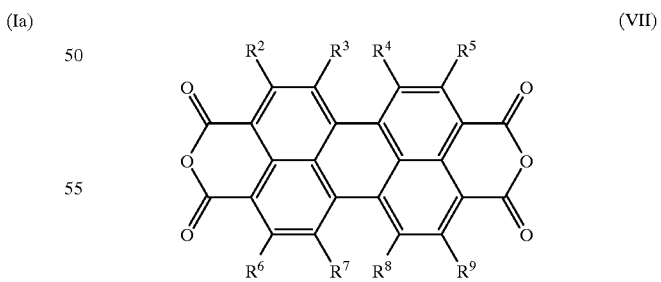

wherein the radicals $R^1$ to $R^9$ in formulae (III, (Ia) and (VII) are identical or different and are each hydrogen, or from one to nine of those radicals are a radical selected from the group consisting of an unsubstituted or substituted carbocyclic aromatic radical, an unsubstituted or substituted heterocyclic aromatic radical, halogen, unsubstituted or substituted $C_1$–$C_{18}$alkyl, —$OR^{10}$, —CN, —$NR^{11}R^{12}$, —$COR^{13}$, —$NR^{14}COR^{13}$, —$NR^{10}COOR^{13}$, —$NR^{10}CONR^{11}R^{12}$, —$NHSO_2R^{13}$, —$SO_2R^{13}$, —$SOR^{13}$, —$SO_2OR^{13}$, —$CONR^{11}R^{12}$, —$SO_2NR^{11}R^{12}$, —N=$NR^{15}$, —$OCOR^{13}$ and —$OCONHR^{13}$, it being possible for two adjacent radicals together to form a carbocyclic or heterocyclic ring, wherein $R^{13}$ is $C_1$–$C_{18}$alkyl, $C_6$–$C_{10}$aryl, or benzyl that is unsubstituted or substituted by halogen, $C_1$–$C_4$alkyl or by $C_1$–$C_4$alkoxy, or is a 5- to 7-membered heterocyclic radical, $R^{11}$ and $R^{12}$ are each independently of the other hydrogen; $C_1$–$C_{18}$alkyl that is unsubstituted or substituted by cyano or hydroxy groups; $C_3$- to $C_{24}$-cycloalkyl; $C_6$–$C_{10}$aryl or 5- to 7-membered heteroaryl; or $R^{11}$ and $R^{12}$ together, or, optionally, with at least one of the other radicals $R^2$ to $R^9$ form a 5- or 6-membered heterocyclic ring, $R^{10}$ is hydrogen, $C_1$–$C_{18}$alkyl, $C_3$- to $C_{24}$-cycloalkyl, $C_6$–$C_{10}$aryl or 5- to 7-membered heteroaryl, $R^{14}$ is hydrogen; $C_1$–$C_{18}$alkyl that is unsubstituted or substituted by cyano, hydroxy or $C_1$–$C_4$-alkoxycarbonyl; $C_3$- to $C_{24}$-cycloalkyl; $C_1$–$C_4$alkylaryl; $C_6$–$C_{10}$aryl that is unsubstituted or substituted by halogen, $C_1$–$C_4$alkyl or $C_1$–$C_4$alkoxy: or a 5- to 7-membered heterocycle, and $R^{15}$ is the radical of a coupling component or is $C_6$–$C_{10}$aryl that is unsubstituted or substituted by halogen, $C_1$–$C_4$alkyl or $C_1$–$C_4$alkoxy.

* * * * *